Dec. 29, 1942.    G. NELSON    2,306,894
CASH REGISTER
Filed April 16, 1937    17 Sheets-Sheet 1
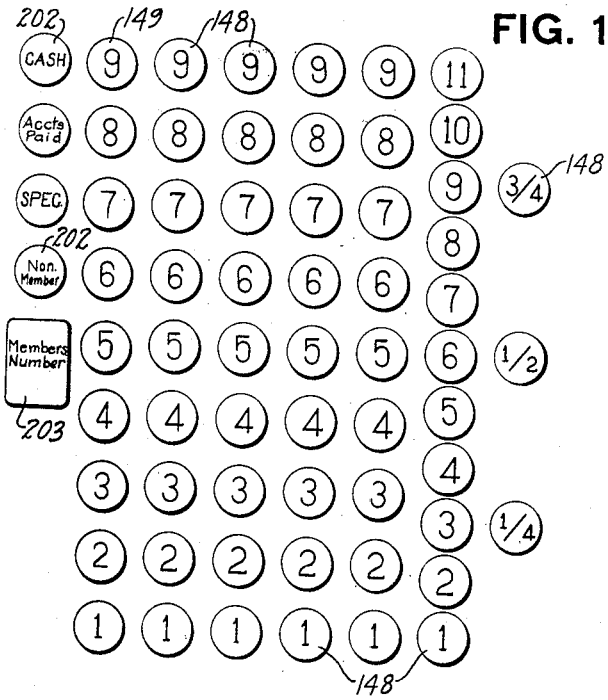
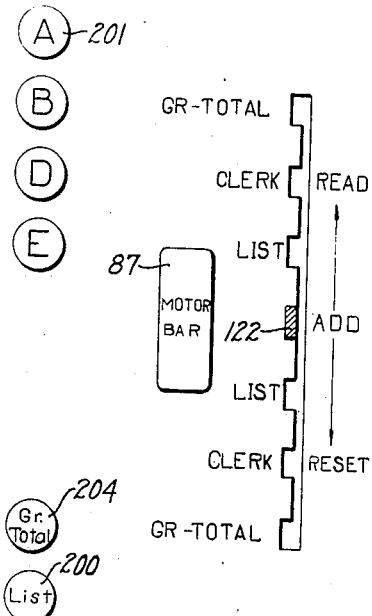
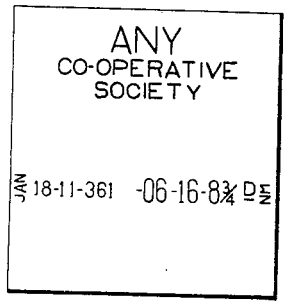
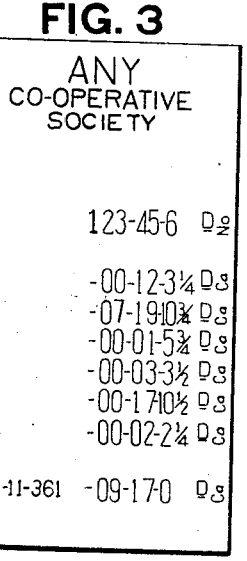
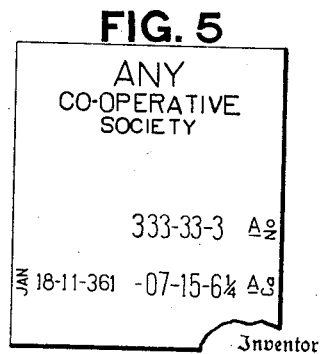
Inventor
Gunnar Nelson
By
*Earl Benst*
His Attorney Dec. 29, 1942.  G. NELSON  2,306,894
CASH REGISTER
Filed April 16, 1937  17 Sheets-Sheet 2

Inventor
Gunnar Nelson
By
*Earl Benst*
His Attorney

Dec. 29, 1942.　　　G. NELSON　　　2,306,894

CASH REGISTER

Filed April 16, 1937　　17 Sheets-Sheet 3

Inventor
Gunnar Nelson

By　*Earl Beust*

His Attorney

Dec. 29, 1942. G. NELSON 2,306,894
CASH REGISTER
Filed April 16, 1937 17 Sheets-Sheet 4
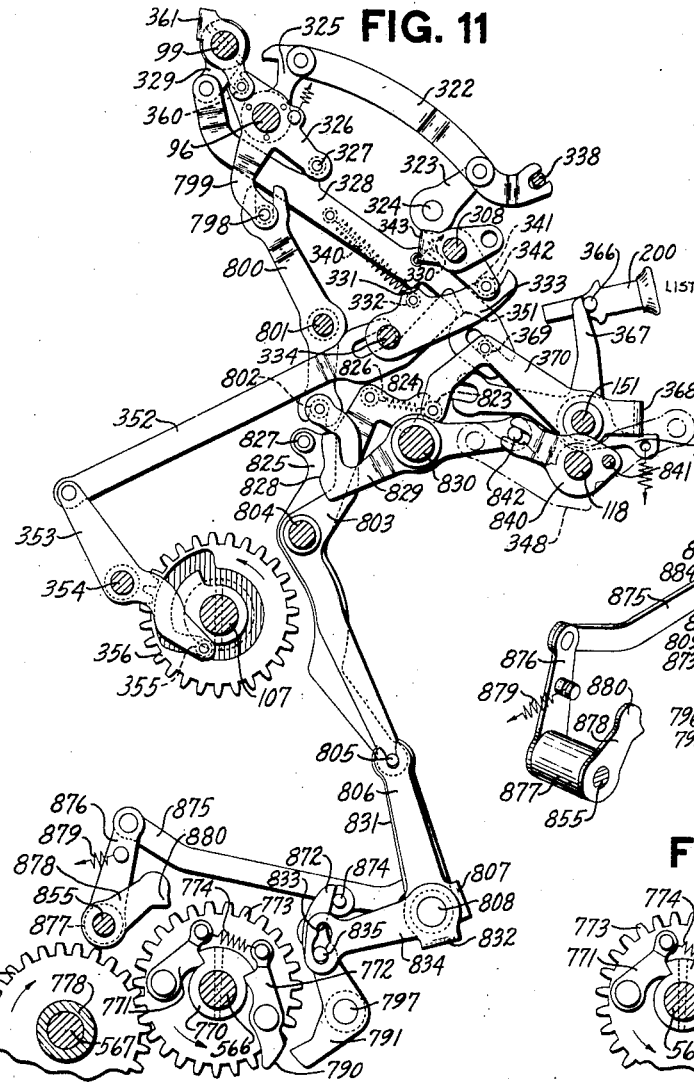
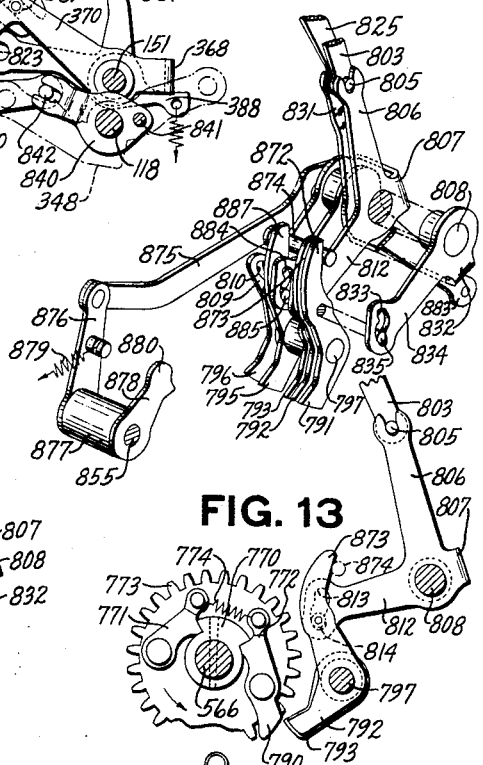
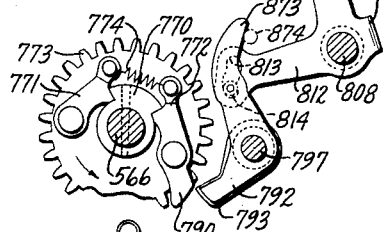
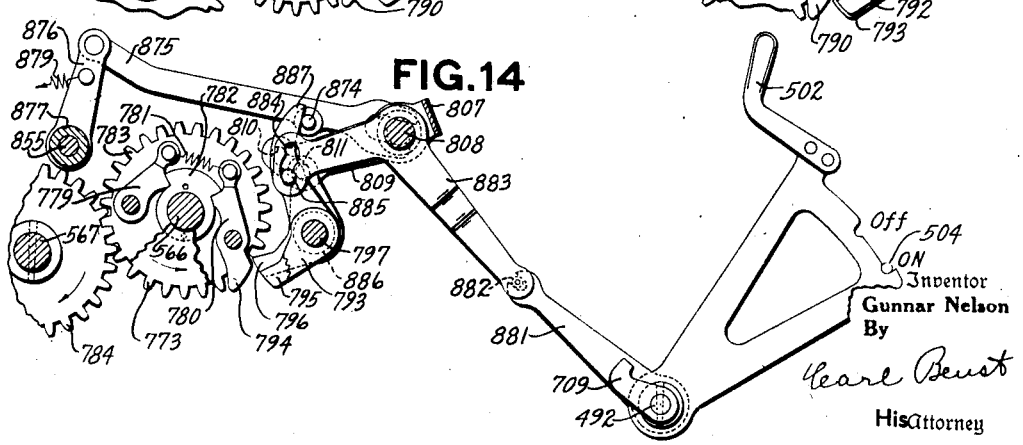
Inventor
Gunnar Nelson
By
Pearl Beust
His Attorney Dec. 29, 1942.   G. NELSON   2,306,894
CASH REGISTER
Filed April 16, 1937   17 Sheets-Sheet 5

Inventor
Gunnar Nelson
By
Earl Benst
His Attorney

Dec. 29, 1942.　　　　G. NELSON　　　　2,306,894
CASH REGISTER
Filed April 16, 1937　　　17 Sheets-Sheet 6
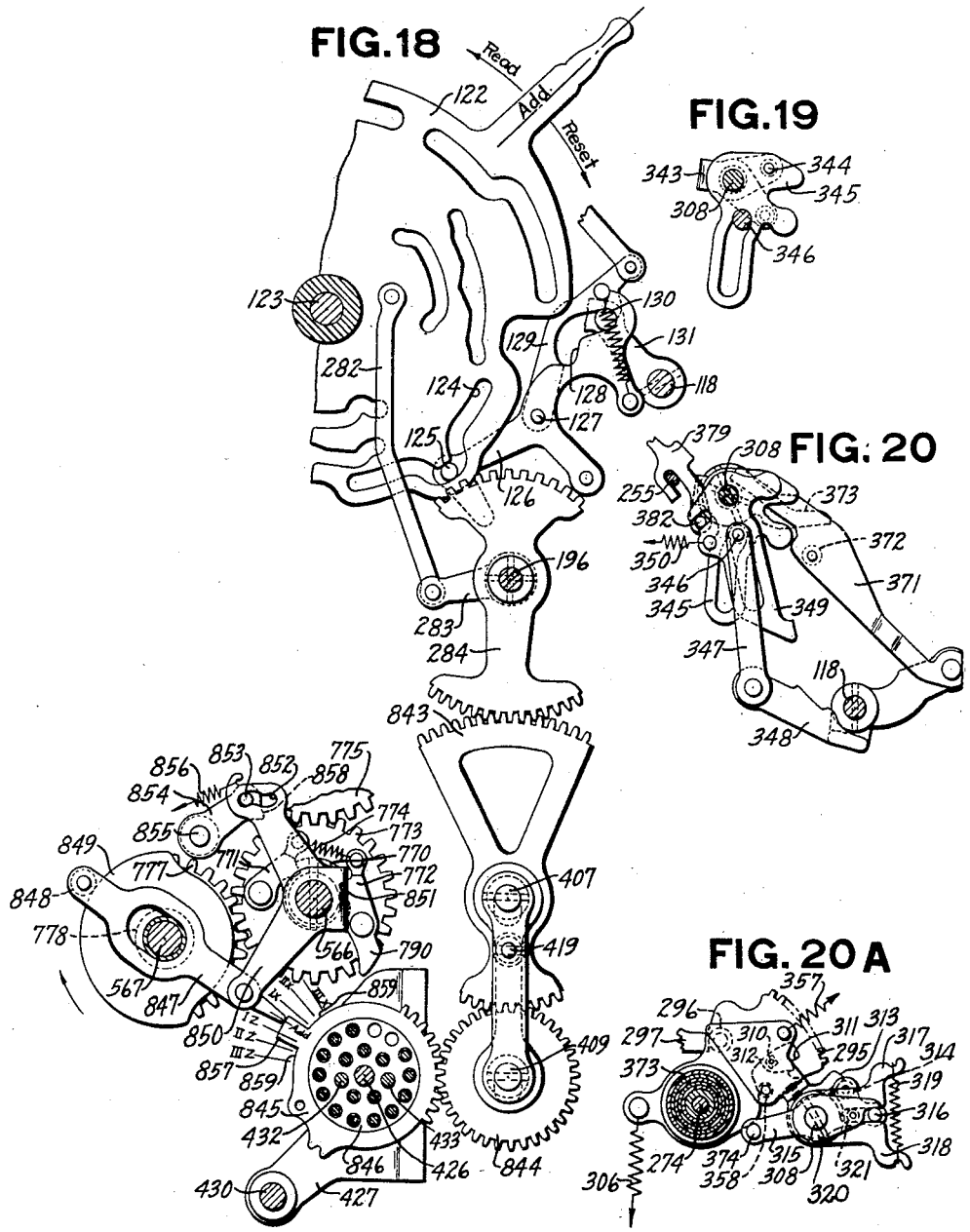
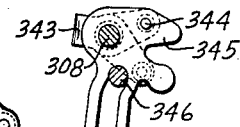
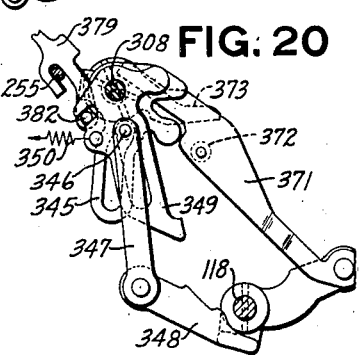
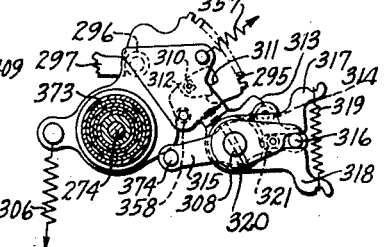
Inventor
Gunnar Nelson
By
His Attorney Dec. 29, 1942.    G. NELSON    2,306,894
CASH REGISTER
Filed April 16, 1937    17 Sheets-Sheet 7
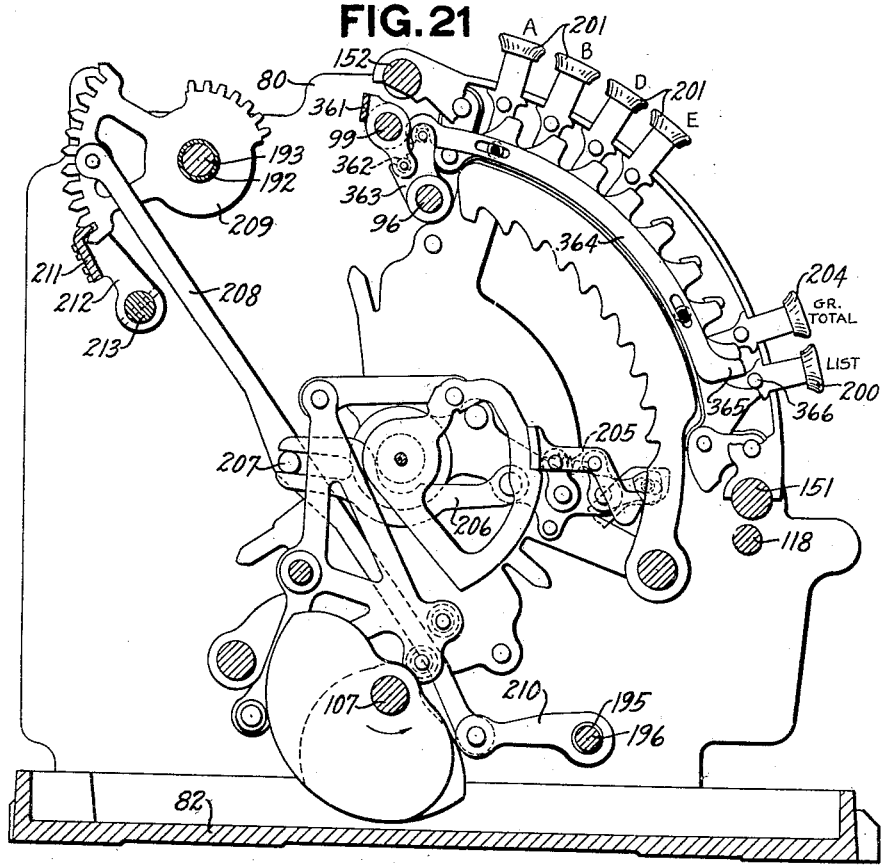
Inventor
Gunnar Nelson
By
Carl Benst
His Attorney Dec. 29, 1942.  G. NELSON  2,306,894
CASH REGISTER
Filed April 16, 1937     17 Sheets-Sheet 8
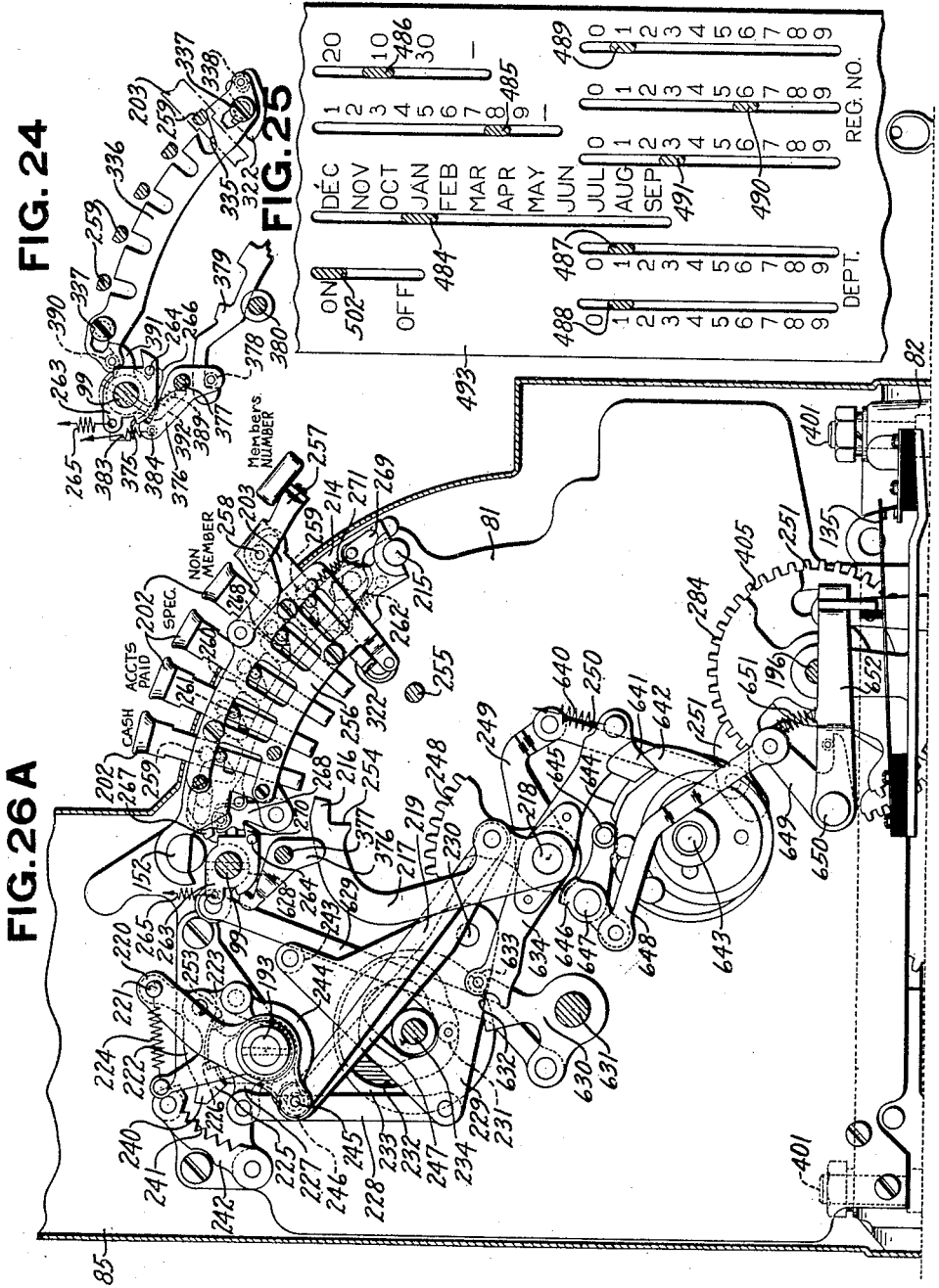
Inventor
Gunnar Nelson
By
Earl Beust
His Attorney Dec. 29, 1942.   G. NELSON   2,306,894
CASH REGISTER
Filed April 16, 1937   17 Sheets-Sheet 9

Inventor
Gunnar Nelson
By
Earl Beust
His Attorney

Dec. 29, 1942.　　　　G. NELSON　　　　2,306,894
CASH REGISTER
Filed April 16, 1937　　　17 Sheets-Sheet 10
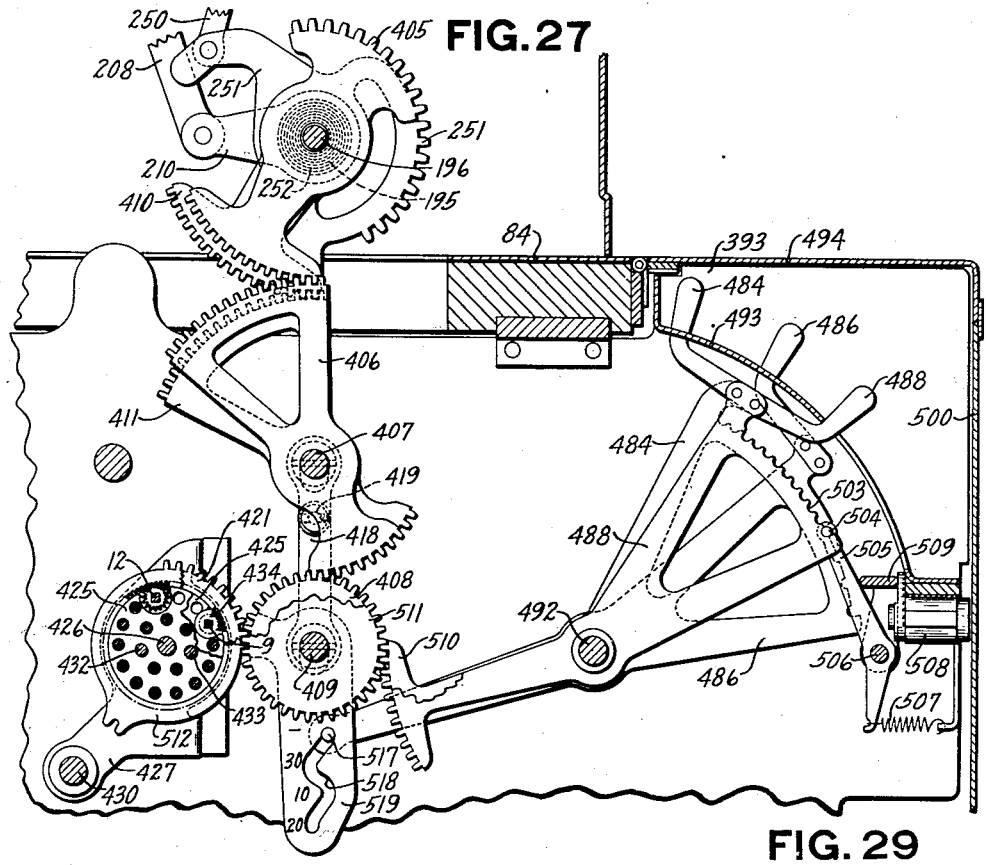
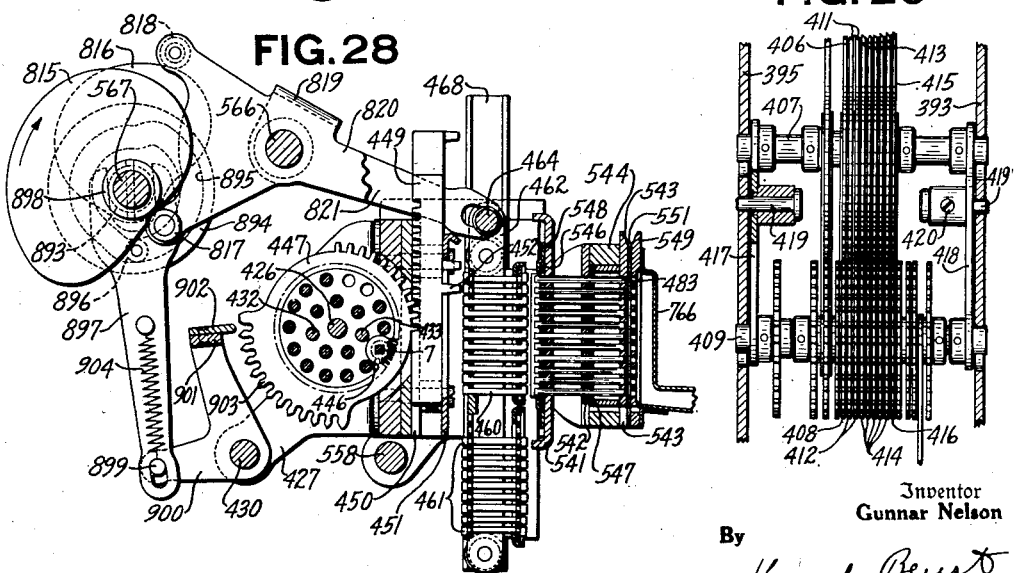
Inventor
Gunnar Nelson
By
Earl Benst
His Attorney Dec. 29, 1942.                G. NELSON                2,306,894
                              CASH REGISTER
                    Filed April 16, 1937        17 Sheets-Sheet 11
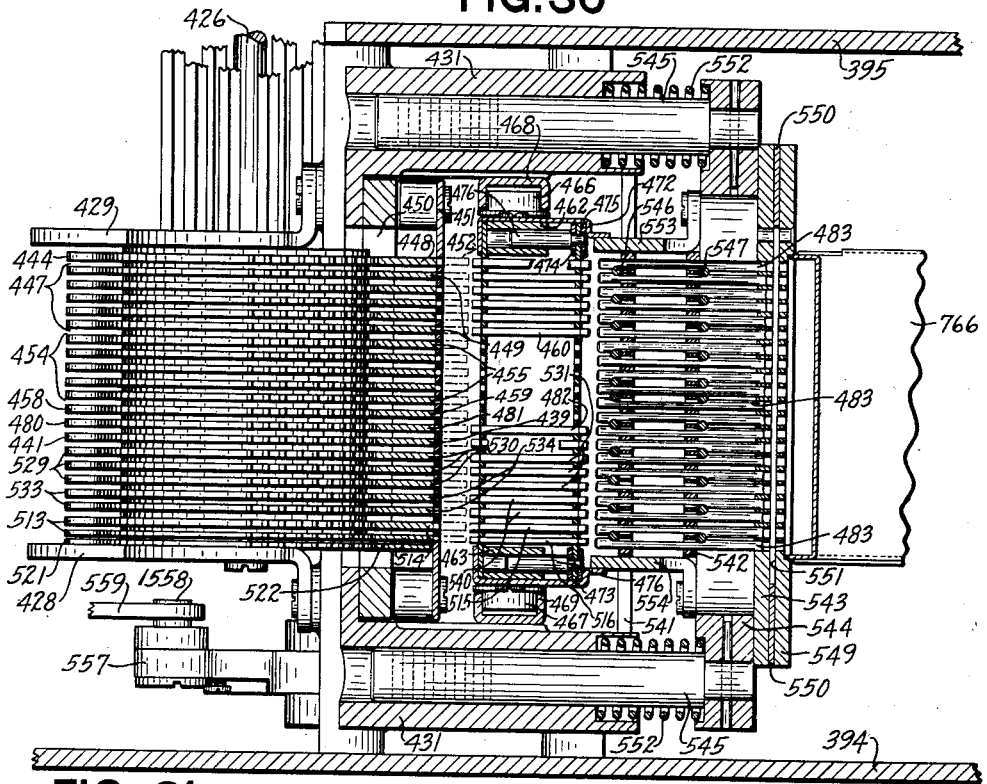
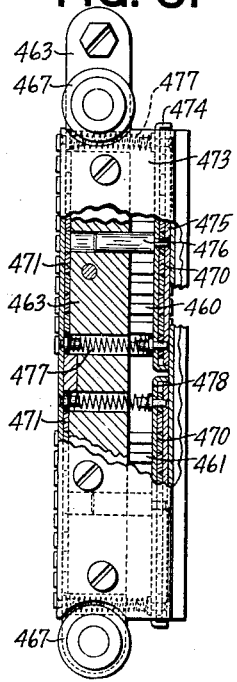
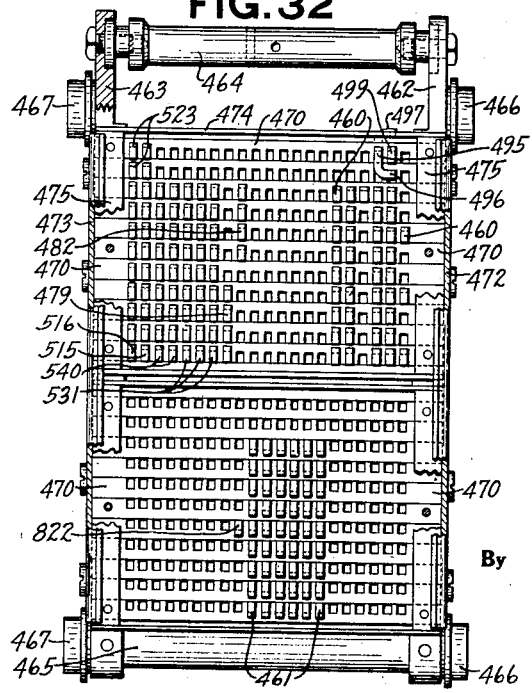
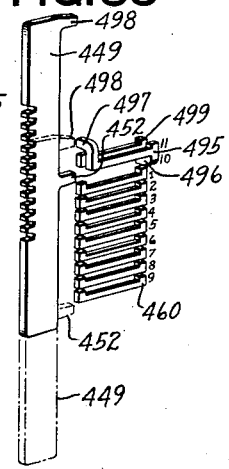
Inventor
Gunnar Nelson
By Earl Beust
His Attorney Dec. 29, 1942.   G. NELSON   2,306,894
CASH REGISTER
Filed April 16, 1937   17 Sheets-Sheet 12
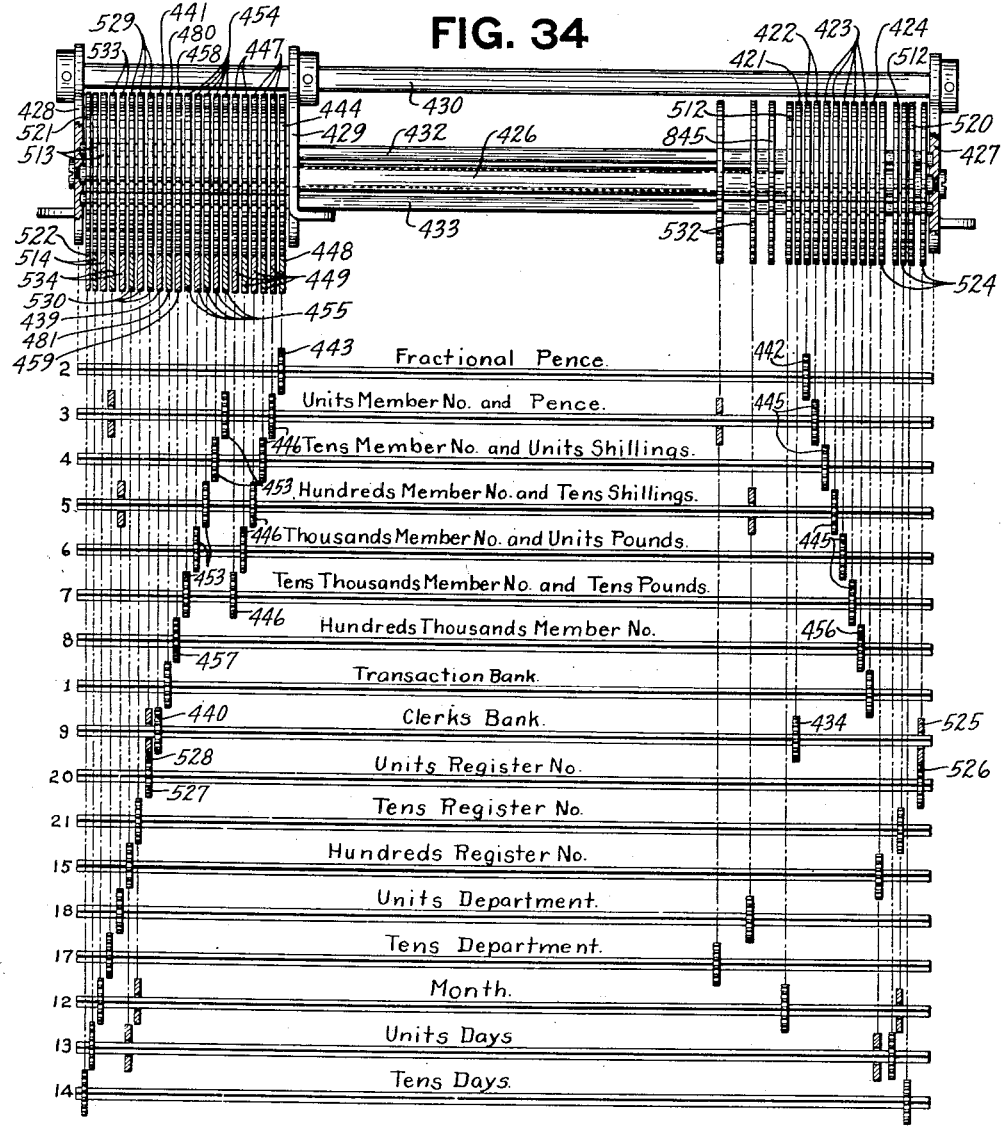
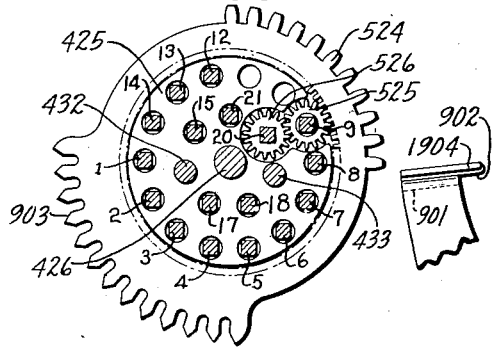
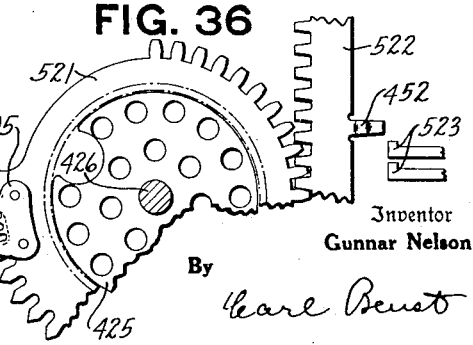
Inventor
Gunnar Nelson
By
Carl Benst
His Attorney Dec. 29, 1942.    G. NELSON    2,306,894
CASH REGISTER
Filed April 16, 1937    17 Sheets-Sheet 13
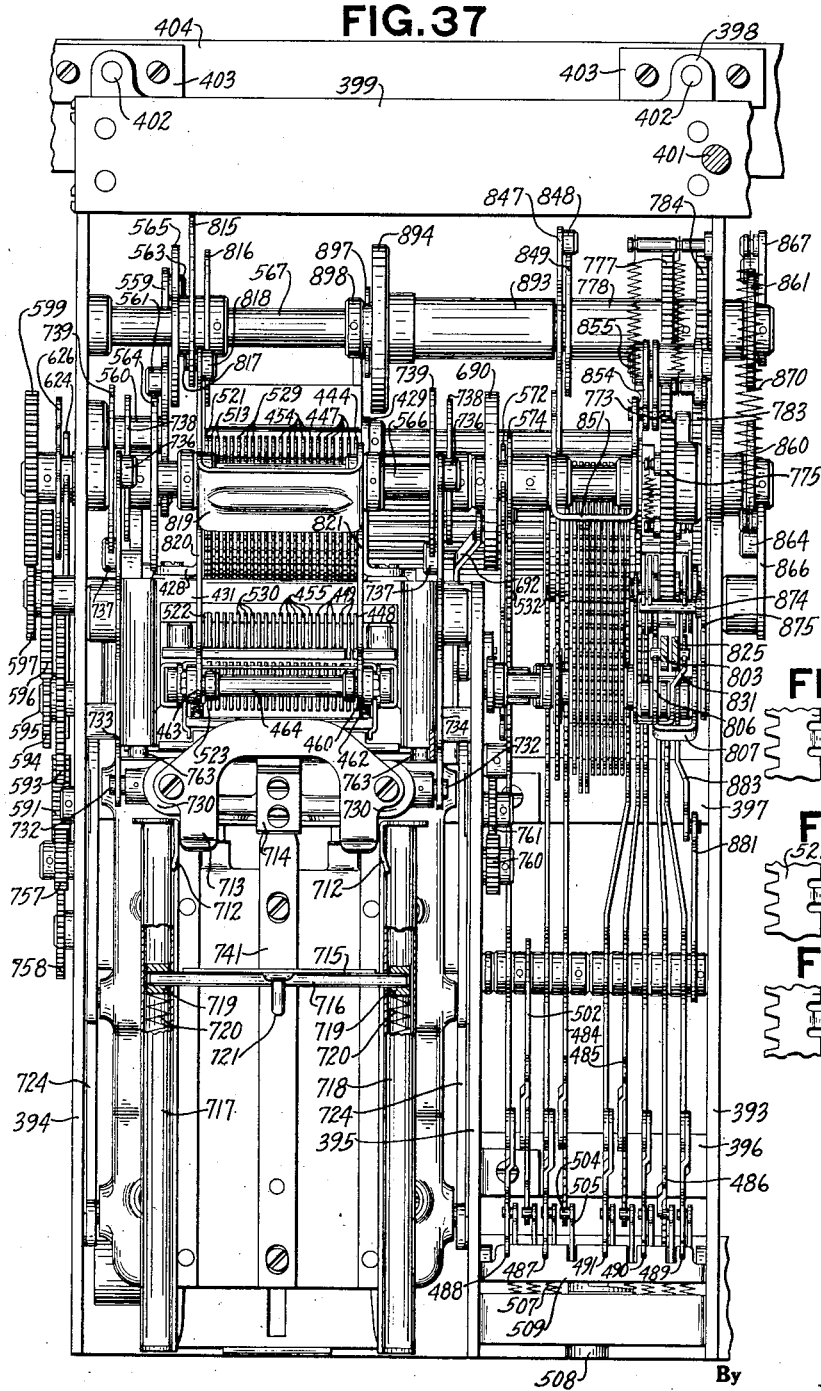
Inventor
Gunnar Nelson
By Carl Berst
His Attorney Dec. 29, 1942.    G. NELSON    2,306,894
CASH REGISTER
Filed April 16, 1937    17 Sheets-Sheet 14
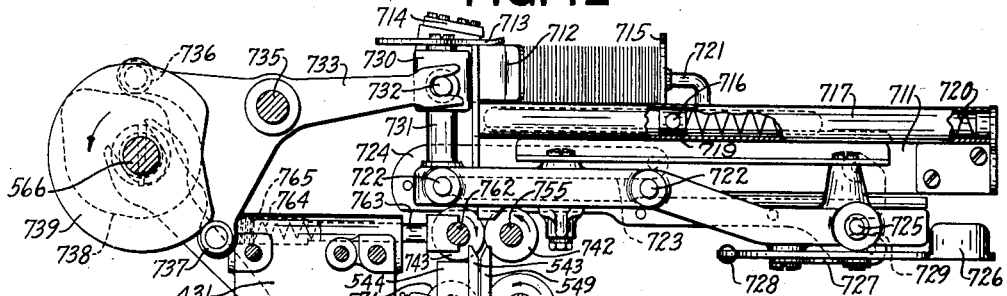
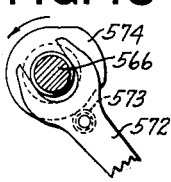
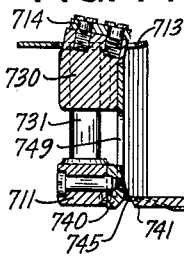
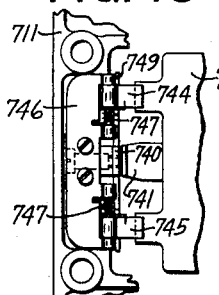
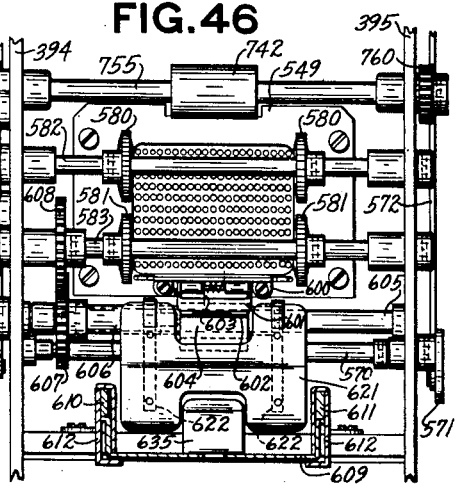
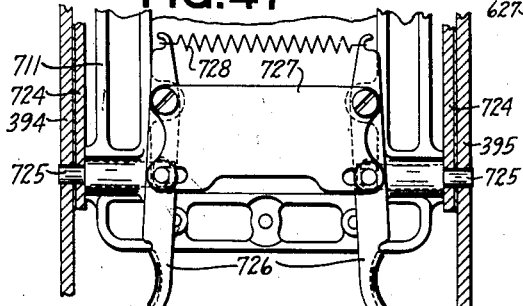
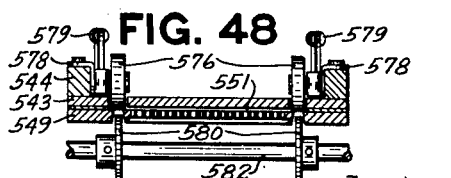
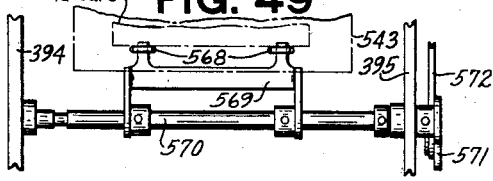
Inventor
Gunnar Nelson
By
Pearl Benst
His Attorney Dec. 29, 1942.     G. NELSON     2,306,894
CASH REGISTER
Filed April 16, 1937     17 Sheets-Sheet 15
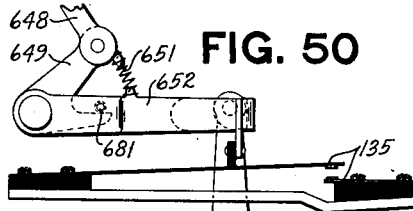
FIG. 50
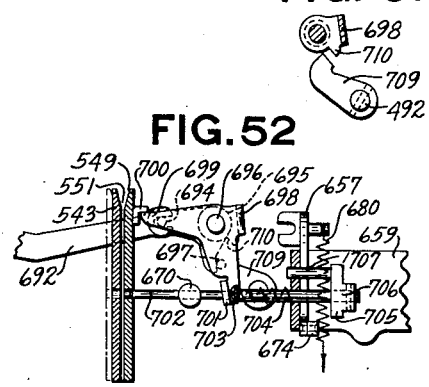
FIG. 51
FIG. 52
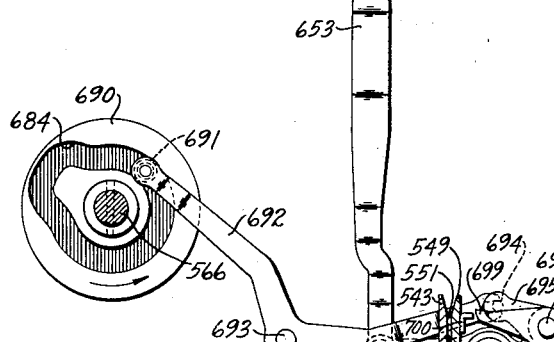
FIG. 53
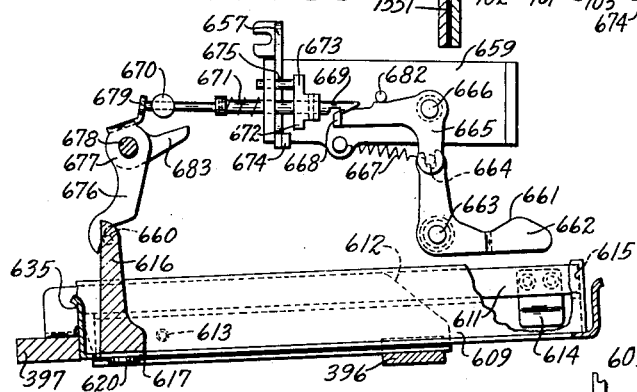
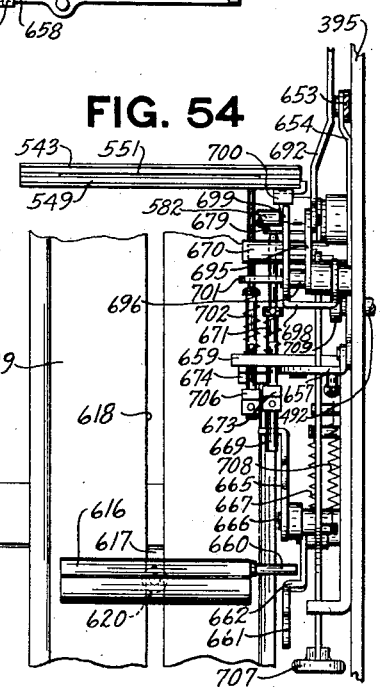
FIG. 54
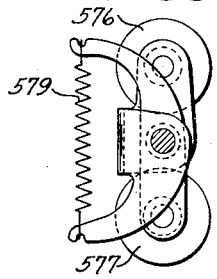
FIG. 55
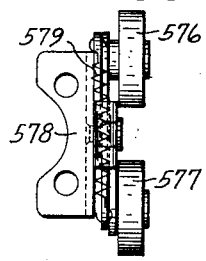
FIG. 56
Inventor
Gunnar Nelson
By Earl Benst
His Attorney Dec. 29, 1942.   G. NELSON   2,306,894
CASH REGISTER
Filed April 16, 1937   17 Sheets-Sheet 16

Inventor
Gunnar Nelson
By
Earl Benst
His Attorney

Dec. 29, 1942.   G. NELSON   2,306,894
CASH REGISTER
Filed April 16, 1937   17 Sheets-Sheet 17
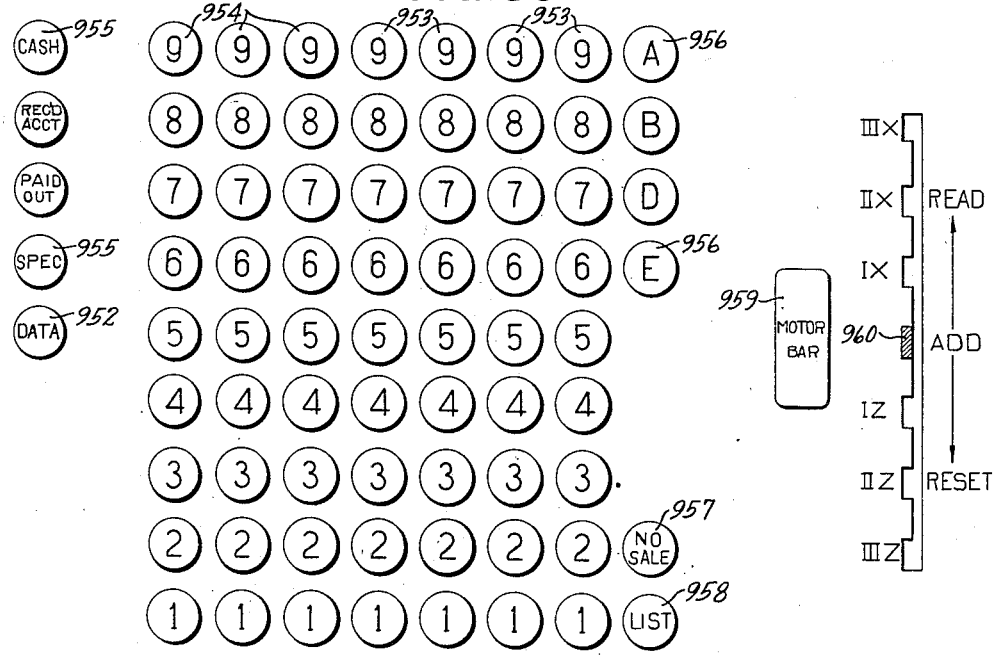
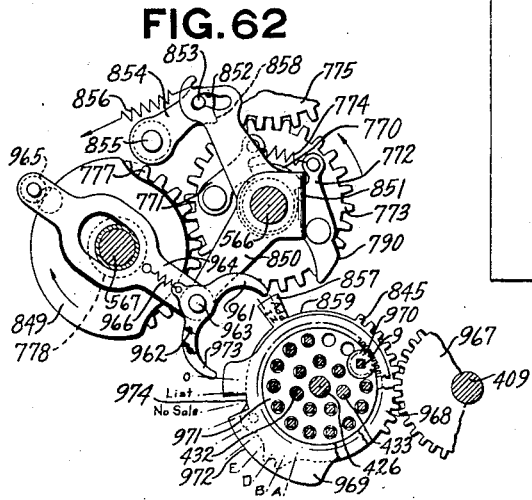
Inventor
Gunnar Nelson
By
Carl Benst
His Attorney Patented Dec. 29, 1942

2,306,894

UNITED STATES PATENT OFFICE 2,306,894

CASH REGISTER

Gunnar Nelson, Dayton, Ohio, assignor to The National Cash Register Company, Dayton, Ohio, a corporation of Maryland Application April 16, 1937, Serial No. 137,223

36 Claims. (Cl. 235—3)

This invention relates to cash registers or accounting machines, which, in addition to the usual recording media thereof, have incorporated therein means for punching records in tabulator or record cards.

The present invention is shown embodied in a machine for use by cooperative society stores, for punching sales and other data on record cards. Cooperative societies are quite popular in certain localities, and, as a consequence, have a large number of members. These cooperative societies operate stores for the benefit of their members, and in these stores a large variety of merchandise may be purchased. The members of these cooperative societies are entitled to a refund or dividend upon all the cash purchases made in the cooperative society stores.

Persons who are not members of the cooperative societies may purchase goods from their stores but they are not entitled to any refund or dividends. However, it is necessary to punch a record card for each non-member purchase as the dividends from these purchases may be distributed among the members of the cooperative societies or used for some other special purpose. Data punched in the member record card includes the member's number, the amount of the transaction, the number of the department in which the purchase was made, the number of the cash register, identification of the clerk making the transaction, and identification of the type of transaction performed.

As previously stated, a card is punched for each purchase made by a non-member, and these cards have exactly the same data as a member card, with the exception that no member number is punched therein.

Periodically, for instance, quarterly, semi-annually, or annually, as the case may be, these punched record cards are analyzed to determine the amount of dividends due each member.

Obviously, punched cards are admirably adapted for use in systems such as this, and provide an excellent means for quickly and accurately analyzing the account of each member. Heretofore it was necessary to transfer the records kept by cash registers or other means to the record cards by manual means, usually a hand-punch device, a system inherently slow and one into which many inaccuracies may creep, due to the human element involved. It is therefore obvious that a cash register that makes a printed record of all transactions and at the same time punches the desired data reative to the transactions in tabulator or record cards is an advance in the art and is a great asset to many types of business concerns.

It is therefore broadly an object of this invention to provide a card punching mechanism for cash registers that simultaneously punches certain data on record cards at the time the transaction is being recorded in the cash register.

Another object of this invention is to provide a cash register with card punching mechanism so arranged and interconnected with the cash register mechanism that an accurate and permanent record of all transactions entered in the machine, through the medium of the keyboard, will be punched in individual record cards as the transactions are registered and recorded by the cash register.

Another object is the provision of a novel card punching mechanism so arranged and controlled that it permits the keyboard of the machine, and particularly the amount keys, to be used for two distinct purposes, namely, for the registration and control of the punching of members' numbers and for the control of the punching of the values of goods purchased, either by members or non-members of the cooperative societies.

A more specific object is the provision of a novel device for connecting the punches to the punch selecting means, said device adapted to be controlled by the Member's Number key, so that only the proper punches will be operated during the member's number operation to perforate the member's number in the card and to simultaneously perforate a symbol opposite the member's number, identifying it as such.

Still another object of this invention is to provide a machine, adapted to punch record cards, with a receipt or check printing mechanism, to print all items and the totals of such items purchased by a member and to also print a record of the member's number, which number is simultaneously perforated in the record card made during this transaction. These printed receipts are retained by the member so that any discrepancy in said member's account or any questions he may have concerning his account may be quickly and accurately checked. The machine is also provided with an audit strip upon which is printed a duplication of the entries made upon the receipt.

A further object of this invention is to provide means under control of the List key, which renders the card punching mechanism ineffective when the List key is depressed for the entry of the several items of a multiple-item transaction.

A still further object of this invention is the provision of means whereby a Member's Number key controls the receipt feeding mechanism to cause the receipt to be fed a double space after the printing of the member's number and prior to the printing of the amount, so that these items will be readily distinguishable from each other. In multiple-item transactions, the above receipt feed controlling means causes a wide space to be fed between the member's number and the first item of a multiple-item transaction in order to make the member's number readily distinguishable.

Another object of this invention is to supply means to prevent the motor from operating the machine when the card magazine is empty.

Another object of this invention is to furnish means whereby refilling the empty magazine permits the initiation of a blank operation by means of a special manipulative member to automatically feed a card into the machine into position to be punched.

Still another object of this invention is the provision of manipulative means for rendering the card punching mechanism ineffective.

A further object of this invention is the provision of means for preventing operation of the machine when the card receptacle is filled to capacity.

A still further object is the supplying of novel means to retain the cards in the card magazine in vertical position at all times so that only one card will be fed into position to be punched during each transaction.

A further object of this invention is to provide novel means controlled by the List key to render the punching mechanism ineffective during the entry of all items of a multiple-item transaction and during the first cycle of operation of an item-total operation.

A still further object of this invention is the provision of means for locking the 2 to 9 keys inclusive in the 10 shilling bank when the keyboard is used for entering amounts and for unlocking the keys when the keyboard is used for setting up a member's number.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In the drawings:

Fig. 1 is a plan view of the keyboard of a preferred form of machine.

Fig. 2 is a facsimile of a fragmentary portion of the detail or audit strip printed by the machine of the present invention.

Fig. 3 is a facsimile of a multiple-item receipt issued by the machine of this invention.

Fig. 4 is a facsimile of a single-item receipt issued to a purchaser who is not a member of the cooperative society.

Fig. 5 is a facsimile of a single-item receipt issued to a purchaser who is a member of the cooperative society.

Fig. 6 is a time chart depicting graphically the movements of the various mechanisms of the machine of the instant invention.

Fig. 7 is a facsimile of a punched record card upon which is recorded a purchase made by a member of the cooperative society.

Fig. 8 is a facsimile of a punched record card upon which is recorded a purchase made by a non-member of the cooperative society.

Fig. 11 is a side elevation of a part of the controlling mechanism for the clutches that control the operation of the card punching device.

Fig. 12 is a perspective view of the control pawls for the clutch mechanism.

Fig. 13 is a detail view of one of the control clutches and some of its associated control pawls.

Fig. 14 is a detail view of the On-and-Off mechanism for the card punching device.

Fig. 18 is a side elevation of the mode of operation lever and mechanism operated thereby for controlling the operation of the card punching device.

Fig. 19 is a detail view of a part of the mechanism shown in Fig. 20.

Fig. 20 is a detail view of the mechanism operated by the mode of operation lever for controlling the receipt feed.

Fig. 20A is a detail view of the receipt feed controlling mechanism, showing the control plate therefor in long feed or normal position.

Fig. 21 is a cross-sectional view of the register portion of the machine taken just to the left of the clerk's bank of keys, illustrating said bank and the differential mechanism associated therewith.

Fig. 22 is a detail view of the receipt feeding mechanism, showing the control plate therefor in short feed position, as placed by depression of the List key.

Fig. 23 is a detail view of the receipt feed control plate in the position shown in Fig. 22.

Fig. 24 is a detail view of one of the control plates for the transaction bank and other mechanism associated therewith.

Fig. 25 is a plan view of the manipulative devices, in the preferred form of machine, for setting up various data to be punched in the record cards and printed on the detail and receipt strips.

Figure 26:
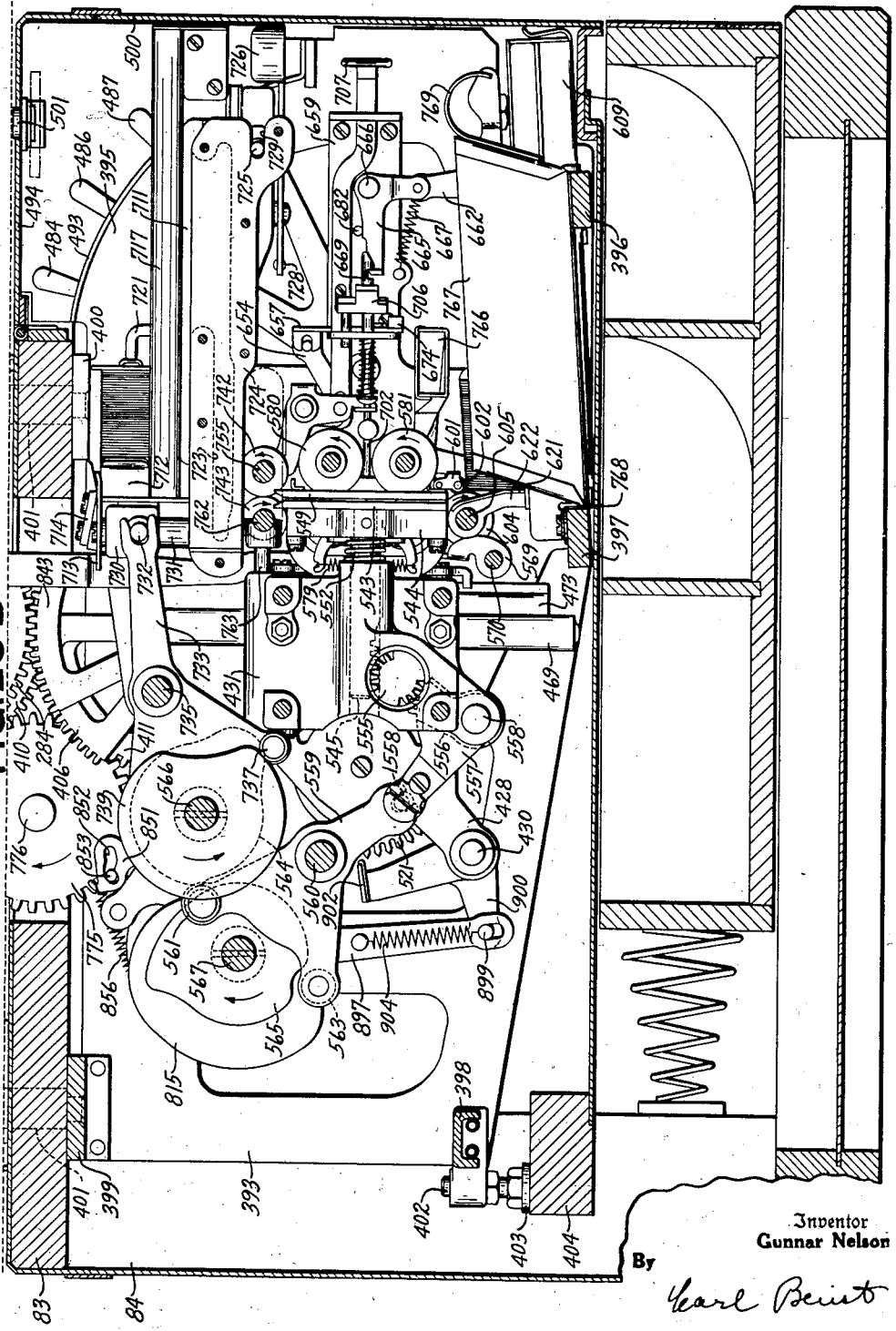

Figs. 26A and B combined, form a left side elevation of the entire machine illustrating the transaction bank and its differential mechanism and the card punching mechanism.

Fig. 27 is a left side elevation of the card punching device showing the connections between the machine keyboard and the card punching mechanism and also showing the manner in which the manipulative devices position their respective punch selecting racks.

Fig. 28 is a left side view of the selecting mechanism for the card punches.

Fig. 29 is a sectional view showing the manner in which the punch selecting segments are assembled to their corresponding segments in the register section of the machine.

Fig. 30 is a sectional plan view illustrating the card punches and their associated selecting mechanism.

Fig. 31 is a fragmentary end view of the reciprocating framework that carries the punch connector bars.

Fig. 32 is a front view of the framework shown in Fig. 31.

Fig. 33 is a perspective view of the selecting rack and connector bars for the pence denomination.

Fig. 34 is a combined plan and diagrammatic view of the internal-external gear mechanism for positioning the selecting racks for the punch mechanism.

Fig. 35 is a sectional view taken just to the left of the units register number drive gear showing the arrangement of the shafts for the internal gear mechanism.

Fig. 36 is a fragmentary detail view of the drive gear for the tens of days selecting rack.

Fig. 37 is a plan view of the card punching mechanism.

Fig. 38 is a perspective view of the tens of days selecting rack and the connector bars associated therewith.

Figs. 39, 40 and 41 illustrate the manner in which the tens of days selecting rack cooperates with the two connector bars associated therewith.

Fig. 42 is a left side elevation showing in particular the supply magazine in which the cards are stored prior to being acted upon by the punching mechanism, the tray for receiving the cards after they have been acted upon by the punching mechanism, and the card feeding and ejecting mechanisms.

Fig. 43 is a detail view of the cam and the pitman associated therewith for operating the card stop bars.

Fig. 44 is a sectional view of the mechanism that picks the cards out of the supply magazine and presents them to the card feeding mechanism.

Fig. 45 is a bottom view of a part of the card picker mechanism.

Fig. 46 is a front view of the card feeding mechanism and a section of the card receiving tray.

Fig. 47 is a detail view of the pinch lever mechanism for securing the card supply magazine in feeding position.

Fig. 48 is a detail view of one set of card feeding rollers and their associated pressure rollers.

Fig. 49 is a front view of the card stop device for locating the cards in punching position.

Fig. 50 is a left side elevation of the feeler mechanism that prevents operation of the machine when no card is in the throat of the punching mechanism.

Fig. 51 is a detail view of a part of the On-and-Off mechanism for the card punching device.

Fig. 52 is a detail view of the feeler mechanism shown in Fig. 50.

Fig. 53 is a detail view of the mechanism that renders the machine inoperative when the card tray is filled.

Fig. 54 is a plan view of the mechanisms shown in Figs. 50 and 53.

Figs. 55 and 56 are respectively side views and back views of one set of pressure rollers for the card feeding mechanism.

Figures 57, 58, 59:
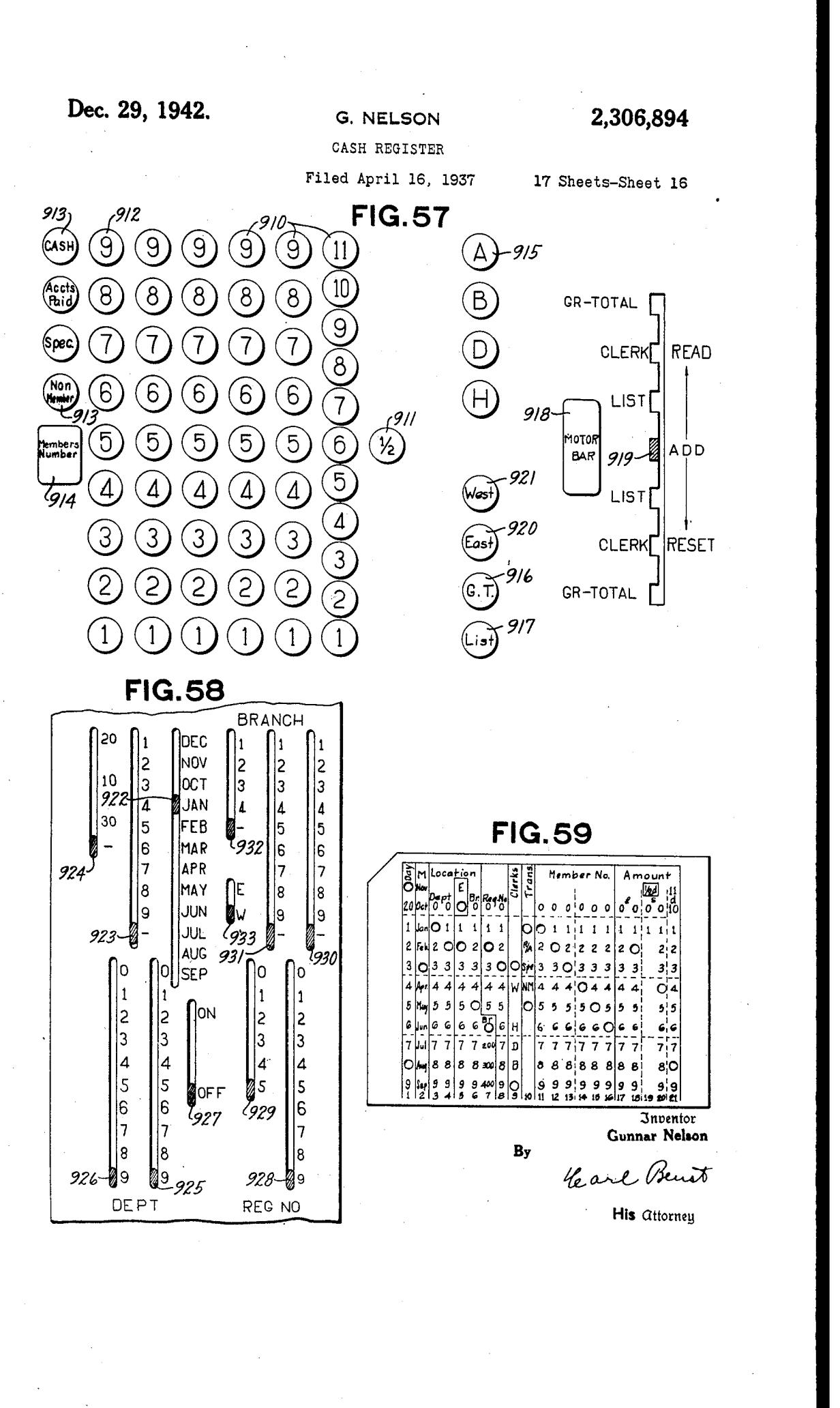

Fig. 57 is a diagrammatic plan view of the keyboard of a first modified form of machine.

Fig. 58 is a diagrammatic plan view of the settable levers for setting up various data for the first modified form of machine.

Fig. 59 is a facsimile of the type of card used in the first modified form of machine.

Fig. 60 is a diagrammatic plan view of the keyboard for a second modified form of machine.

Fig. 61 is a facsimile of the type of card used in the second modified form of machine.

Fig. 62 is a left side elevation of the punch controlling mechanism for the second modified form of machine.

GENERAL DESCRIPTION

For the purpose of illustration, the present invention is shown embodied in a machine of the type disclosed in Letters Patent of the United States No. 1,865,147, issued June 28, 1932, to Bernis M. Shipley. This machine has a plurality of rows of amount keys arranged for English currency and having a capacity of £99 19s 11¾d.

In the present adaptation, the amount keys serve a dual purpose. In a member's number operation, they are used to set up a member's number to be punched in its proper field of the record card, and in an immediately succeeding item operation, they are used to set up the amount of the transaction to be punched in its proper field of the record card. This dual use of the amount keys for punching numbers or other data and amounts widens the scope of the machine and provides a ready solution of many accounting problems. The amount keys also control the positioning of corresponding type wheels, which in turn print the member's number and the amount upon an issuing receipt and upon a detail strip which is retained in the machine.

The machine keyboard also comprises a row of transaction keys which control corresponding type wheels and indicators for identifying the type of transaction being performed, and in addition select a group totalizer for the accumulation of all transactions involving a payment of cash. The transaction keys also include a Non-Member and a Member Number key. Depressing the Non-Member key causes a corresponding indicator, type wheel and punch to indicate and record the fact that the purchaser is a non-member of the cooperative society. Depressing the Member Number key conditions the machine for a member number printing and punching operation and controls a corresponding indicator, type wheel and punch to indicate, record and perforate a symbol identifying this particular operation.

The keyboard of the present machine also includes a plurality of clerks' keys, depression of any one of which controls the positioning of a corresponding indicator, type wheel and punch selector to indicate and record a symbol identifying the clerk handling the transaction.

The machine embodying the present invention has three lines of totalizers: a clerk's line, a group total line, and a listing line. The clerk's totalizer line has a set of wheels for each clerk's key and said wheels are selected by said keys for engagement with the actuators to accumulate the totals of transactions handled by the individual clerks. The group totalizer line has a single set of wheels selected by the Cash, Account Paid, Special and Non-Member transaction keys to accumulate the group total of these items.

In multiple-item transactions, depressing the List key, which is located in the same row as the clerk's keys, selects the single set of wheels of the listing totalizer, for addition, to accumulate a total of all the items of a multiple-item transaction. The different lines of totalizers are conditioned for total and sub-total operations by means of a mode of operation lever located on the right-hand side of the keyboard. Normally the mode of operation lever is in adding position, which conditions the different lines of totalizers for adding operations. After all the items have been listed in a multiple-item transaction, moving the mode of operation lever to List Reset position causes the listing totalizer to be cleared and the total amount of the items to be printed upon the receipt and detail strip. During the item listing operations of a multiple-item transaction, it is necessary to depress one of the transaction keys in conjunction with the List key to cause the items to be accumulated in the group totalizer. A sub-total or reading operation of the listing totalizer may be had by moving the mode of operation lever to List-Read position. However, it is doubtful if there is ever a reason for reading or taking a sub-total from the listing totalizer. Moving the mode of operation lever to Group Total Reset position conditions the single set of wheels on the group totalizer line for a total taking operation and depressing the Group Total key causes the group totalizer wheels to be alined with the actuators. The group totalizer may be read or operated in a sub-total operation by moving the mode of operation to Group Total Read position and depressing the Group Total key.

Moving the mode of operation lever to Clerk's Reset position conditions the clerks' totalizers for total operation, and the different sets of wheels are alined with the actuators by depressing the clerk's key corresponding to the set of wheels that it is desired to take a total of. The clerks' totalizers may be read or operated in a sub-total operation by moving the mode of operation lever to Clerk's Read position and by depressing the different clerks' keys to select the clerks' totalizers for engagement with the actuators. The usual starting bar is provided to initiate a machine operation and in this particular machine it is necessary to depress a transaction key and a clerk's key before the machine can be released for operation.

The card punching mechanism is a compact unit located in a compartment in the left-hand side of the drawer cabinet and secured to the base of the register portion of the machine and the drawer cabinet. The card punching device has a supply magazine and a receiving tray, both of which are accessible through a closure in the front of the drawer cabinet. The supply magazine may be moved from feeding position to loading position to facilitate the insertion of new record cards. The supply magazine carries the picker mechanism which picks the record cards out of said supply magazine and advances them to the feed rollers which then carry said cards into the throat of the punching mechanism. The picker mechanism is adjusted to pick only one card out of the supply magazine at a time. The supply magazine may be readily removed from the machine to facilitate the adjusting of the picker mechanism and to correct any errors in the feeding of cards to the punching mechanism.

The receiving tray may be moved forwardly to a more accessible position for removing the punched record cards. The punchings from the record cards are directed by a chute into a suitable receptacle which may be removed through the opening in the front of the cabinet for emptying. The perforating punches are mounted in a horizontally shiftable framework, which also supports the die assembly, and are adapted to cooperate with a plurality of connector bars mounted in a vertically shiftable framework which moves said connector bars in relation to the punches and a plurality of selecting racks. Said racks are adapted to be differentially positioned in relation to the connector bars by means of a plurality of internal-external drive gears.

In the present machine the amount keys are used twice, first to punch the member's number in its proper location or field on the record card, and second, to punch the amount of the transaction in its proper location on the record card. To accomplish this there are two sets of punches, two sets of connector bars and two sets of selecting racks for each row of amount keys, and the connector bars are moved in relation to the punches and the racks, to punch the member's number and the amount in their proper locations on the record card. The internal-external drive gears, for the member's number and the amount punches, are connected by various gears and segments to the mechanism that positions their corresponding amount type wheels. The transaction symbol and the clerk's letter are also punched in the record card, and the selecting racks for these punches are positioned by the mechanism that positions the transaction and the clerk's type wheels.

A plurality of manually settable levers are provided for setting up data of a more or less permanent nature, to be punched in the record cards; for example, register number, department number, and date. These levers are accessible through the closure that gives access to the punching mechanism, as also is an On-and-Off lever for controlling operation of the punching mechanism.

The closure giving access to the punching mechanism and the settable levers may be locked to prevent unauthorized persons from having access thereto. A lock is also provided for locking the settable levers against manipulation by unauthorized persons.

A feeler mechanism is provided for rendering the machine inoperative when no record card is fed to the punching mechanism. This notifies the operator either that the supply magazine is empty or that the feeding mechanism has failed to advance the card to the punching mechanism. Means are also provided to render the machine inoperative when the receiving tray is filled with punched record cards. Emptying the tray and returning it and the card stacking weight, located therein, to extreme rearward positions renders the machine operative.

Mechanism is provided for agitating the punched record cards as they are deposited in the receiving tray to make them stack properly, and mechanism is also provided for squaring up the record cards before they are fed into the punching mechanism.

In addition to the On-and-Off lever, the operation of the punching mechanism is also controlled by a feeler mechanism in cooperation with a control disc positioned by the mode of operation lever.

The card punching mechanism is operated by two cam shafts and a sleeve driven by the cash register driving mechanism. The two shafts are driven through their respective clutch mechanisms which are controlled in various ways, later to be described in detail, to cause the punching mechanism to function properly.

In the ensuing pages, the mechanism outlined briefly above will be described in detail.

DETAILED DESCRIPTION

The punching mechanism, which is the gist of the present invention, is shown in cooperation with a well known type of cash register, fully disclosed in the Shipley Patent No. 1,865,147 referred to earlier herein, and for this reason mechanism of standard construction, which is not pertinent to the present invention, will be but briefly described.

*Cash register framework*

The mechanism of the cash register portion of the machine is supported between a right frame 80 and a left frame 81 (Figs. 9, 15, 21 and 26A), both of which are secured to a machine base 82 in turn attached to the top 83 of a drawer cabinet 84 (Fig. 26B). The entire machine is enclosed in a suitable case or cabinet 85, which is secured to the machine base and to various brackets attached to the top of the drawer cabinet. A back plate (not shown) and various cross rods, bars and shafts, extending between the frames 80 and 81, assist in supporting the machine mechanism and in holding said frames rigid.

Inasmuch as the printing mechanism of this particular machine is well known in the art and is fully disclosed in the Shipley Patent No. 1,865,147, it will be but briefly described hereinafter.

*Operating mechanism*

Figure 9:
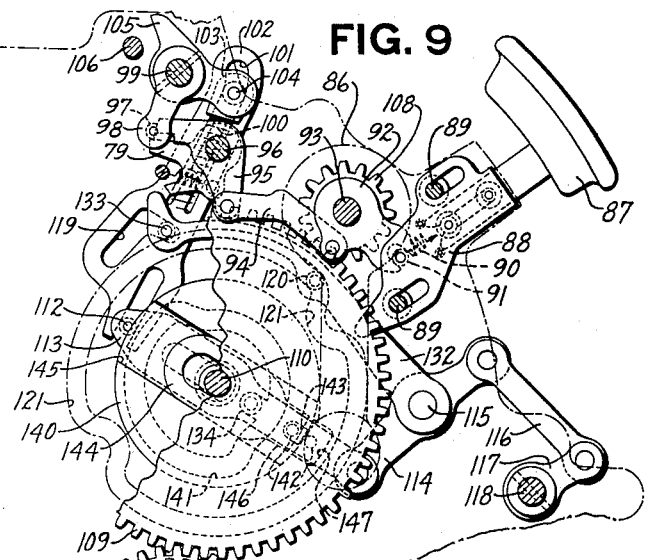
Fig. 9 is a side elevation as observed from the left of the machine, illustrating the mechanism for setting the machine in motion and the mechanism for driving the machine.

The present machine is preferaly operated by means of the usual electric motor (not shown). However, if desired, or if made necessary by failure of the electrical current, the machine may be manually operated by means of a crank 86, shown in dot and dash lines in Fig. 9. Whether the machine is operated electrically or manually, the operation is initiated by depression of a starting bar 87 (Fig. 9). Depressing the starting bar 87, which is removably connected to a plate 88 slidably mounted on the frame 80 by means of parallel slots therein, in cooperation with studs 89 secured in said frame, moves said plate 88 downwardly against the tension of a spring 90. Downward movement of the plate 88, by means of a stud 91 therein in cooperation with the bifurcated end of a crank 92, rocks said crank clockwise on its pivot 93 secured to the frame 80. Clockwise movement of the crank 92, by means of a connecting link 94, imparts similar movement to a release pawl 95 loosely supported on a shaft 96 journaled in the frames 80 and 81. Clockwise movement of release pawl 95 moves the rearward end thereof out of the path of an arcuate surface on a half-round stud 97 secured in the lower end of a crank 98 fast to a key lock shaft 99 journaled in the frame 80 and 81.

This releases the shaft 99 to the action of a compressible spring 100 which imparts a slight counterclockwise movement to said shaft 99. The spring 100 fits loosely over a tongue in the slot 101 in a key release link 102 and over a tongue on a link 103 the upper end of which is loosely supported on a stud 104 secured in one arm of a crank 105 fast on the right-hand end of the key lock shaft 99. It is therefore evident that when the release pawl 95 retains the key lock shaft 99 in untripped position, the spring 100 is compressed, and as soon as said release pawl is moved out of the path of the stud 97, by depression of the starting bar 87, the spring 100 immediately rocks the shaft 99 counterclockwise until such movement is arrested by an extension of the crank 105 contacting a stationary stud 106 in the frame 80.

The operating motor is connected to a main shaft 107 (Fig. 9) journaled in the frames 80 and 81, by a train of gears (not shown) and a clutch mechanism shown in Fig. 26A and later to be described. Counterclockwise movement of the shaft 99 closes a switch 135 (Fig. 50) for the motor and renders the clutch mechanism effective to cause the motor to be operatively connected to the main shaft 107 to rotate said shaft counter-clockwise one revolution in adding operations and two revolutions in total and sub-total operations. After the shaft 107 has completed the necessary number of revolutions to effect the type of operation being performed, the key lock shaft 99 is restored clockwise to untripped position, thus permitting the spring 90 to return the starting bar 87 upwardly and the release pawl 95 counterclockwise in the path of the stud 97 to restrain releasing movement of the shaft 99.

The crank 86 (Fig. 9) has integral therewith a gear 108, which meshes with a large gear 109 loose on a stud 110 in the right frame 80, and said gear 109 meshes with a gear 111 secured on the main shaft 107. Through this gearing, the main shaft 107 may be revolved by the crank 86 when it is desired to operate the machine by hand.

*Restoration of key lock shaft*

The key lock shaft 99 is restored at the end of operations in the following manner: The lower end of the link 102 is slotted to embrace a stud 112 in a pitman 113 having therein a slot which fits loosely over the stud 110. The lower end of the pitman 113 is pivotally connected to one end of a lever 114 loose on a stud 115 in the frame 80, and the upper end of said lever 114 is connected by a link 116 to a crank 117 fast on a zero stop throwout shaft 118 journaled in the frames 80 and 81. The zero stop throwout shaft 118 functions only in total and sub-total operations to cause the machine to operate through the two cycles necessary to perform these operations. The manner in which this is accomplished will be explained later herein. Loose on the stud 115 is a key release lever 132 carrying a stud 133 which cooperates with an inverted L-shaped slot 119 in the link 102. The lever 132 carries a roller 120 which engages a camming groove 121 cut in the face of the gear 109, said camming groove having diametrically opposed identical camming portions.

The functions of the machine including adding, sub-total or reading and total or resetting operations are controlled by a mode of operation lever 122 (Figs. 1 and 18) free on a stud 123 extending between two support plates (not shown) mounted on rods extending between the frames 80 and 81. The lever 122 has a camming slot 124 co-acting with a stud 125 in a lever 126 pivoted at 127. Part of a camming slot 128 is formed in the lever 126 and part in an arm 129 pivoted on the stud 127 and flexibly connected to said lever 126 by a spring. The slot 128 engages a stud 130 in an arm 131 secured on the shaft 118.

When the mode of operation lever is in adding position the train of mechanism just described positions the link 102, as shown in Fig. 9, to engage the substantially horizontal portion of the slot 119 with the stud 133. It will be recalled that adding operations consist of one cycle of movement or one counter-clockwise revolution of the main shaft 107, which, by means of the gear 111, drives the gear 109 one-half revolution in adding operations. Near the end of the one-half revolution clockwise of the gear 109, one of the diametrically opposed camming portions of the groove 121, in cooperation with the roller 120, rocks the lever 132 first counter-clockwise and back to normal position. Counterclockwise movement of the lever 132, by means of the stud 133 in cooperation with the slot 119, shifts the link 102 downwardly, causing the slot 101 in cooperation with the stud 104 to restore the key lock shaft 99 clockwise to untripped position. After the shaft 99 has been restored fully clockwise to normal position, the release pawl 95 is spring returned into the path of the stud 97 to retain said key lock shaft in restored position in the manner explained above.

*Non-repeat mechanism*

In case the starting bar 87 (Fig. 9) is accidentally or inadvertently retained depressed at the end of a machine operation, a repeat operation of the machine is prevented by means of a non-repeat pawl 79 fulcrumed on the shaft 96, said pawl being spring urged into the path of the stud 97 upon restoration of the key lock shaft, to obstruct further releasing movement of said shaft. This prevents the machine from functioning until the starting bar 87 is released and returned upwardly by the spring 90. When the starting bar 87 is restored to undepressed position, an extension of the pawl 95 which overlies the top surface of the non-repeat pawl 79 returns said pawl counter-clockwise to ineffective position as said pawl 95 moves into effective position. The non-repeat pawl 79 is slightly longer than the release pawl 95, which prevents said pawl 95 from stumbling on the stud 97, upon restoration of the starting bar 87, and causes said stud 97 to obstruct clockwise movement of the pawl 79, to prevent said pawl from interfering with the releasing movement counterclockwise of the key lock shaft 99. Restoring movement of the shaft 99 also releases the depressed amount, transaction and clerks' keys, opens the switch 135 for the electric motor, and disengages the clutch mechanism which connects the motor to the machine operating mechanism.

*Operating mechanism in two-cycle operations*

In reading or resetting operations, the main drive shaft 107 makes two counter-clockwise revolutions in order to operate the machine through the two cycles of movement necessary in such operations. This two-cycle movement is effected in the following manner: Moving the mode of operation lever 122 (Figs. 1 and 18) away from adding position to reading or resetting position causes the camming slot 124 therein, in cooperation with the stud 125, to rock the lever 126 clockwise. Clockwise movement of the lever 126 causes the camming slot 128, in cooperation with the stud 130, to rock the arm 131 and the shaft 118 counter-clockwise a slight distance. This counter-clockwise movement of the shaft 118 (Fig. 9) by means of the arm 117, the link 116 and the lever 114, shifts the pitman 113 forwardly, which in turn rocks the link 102 counterclockwise a slight distance, but not sufficient to disengage the forward portion of the slot 119 from the stud 133.

This forward shifting movement of the pitman 113 moves a roller 134 carried thereby out of engagement with a notch in the heart of a cam 140 loosely assembled in a recess in the face of the gear 109 and alines said roller 134 with a camming groove 141 in said cam. Forward shifting movement of the pitman 113, by means of two studs 142 carried thereby, which embrace a tongue 143 of a slide 144 mounted in a groove 145 in the cam 140, shifts said slide forwardly in unison therewith to engage a nose 146 thereof with a notch 147 in the gear 109. This fixedly connects the cam 140 to the gear 109 and consequently said cam moves in unison therewith.

Clockwise rotation of the cam 140 causes the groove 141, in cooperation with the roller 134, to shift the pitman 113 forwardly an additional distance near the end of the first cycle of operation. This rocks the link further counter-clockwise and disengages the forward branch of the slot 119 in the link 102 from the stud 133 and aligns the downward branch of said slot with said stud. It is, therefore, evident that when the camming portion of the groove 121 in the gear 109 rocks the lever 132 counter-clockwise, during the first cycle of operation, the stud 133 will move idly in the downward branch of the slot 119 to prevent restoration of the key lock shaft 99 to untripped position, thus causing the machine to enter a second cycle of operation. After the first cycle of operation has been completed and the second cycle is well under way, the cam groove 141 returns the pitman 113 rearwardly to engage the forward branch of the slot 119 with the stud 133 so that when one of the camming portions of the groove 121 rocks the lever 132 counter-clockwise, near the end of the second cycle of operation, the link 102 will move in unison therewith to restore the key lock shaft 99 to untripped position and terminate operation of the machine in the manner explained above.

*Amount keys and amount differential actuators*

Figure 15:
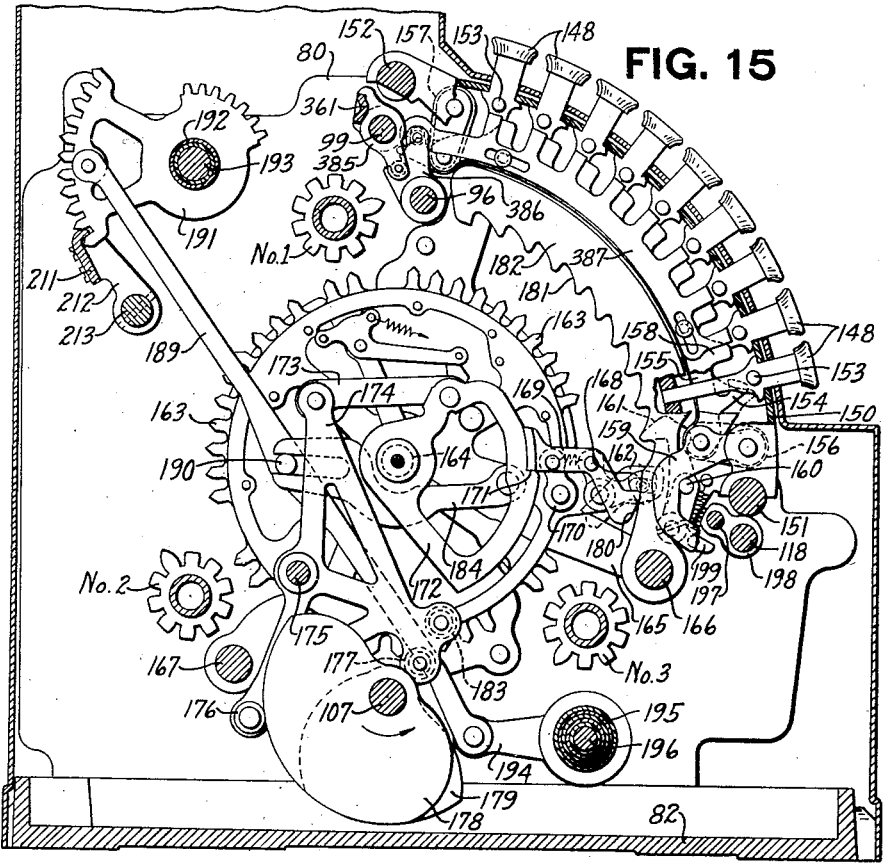
Fig. 15 is a cross-sectional view of the register portion of the machine taken just to the left of one of the amount banks, illustrating said amount bank and its associated differential mechanism.

Referring to Figs. 1 and 15, the machine embodying this invention has six rows of amount keys 148, including three fractional pence keys in the first row. A row of keys 149 in the highest amount order position are not used for setting up amounts, as this is an overflow bank, but are used in cooperation with the amount keys 148 in setting up members' numbers to be printed by the recording media of the register and punched in a record card. In the tens of shillings order, only the #1 key is used in setting up amounts, nevertheless, this bank contains a full complement of keys, which are used in setting up members' numbers. Inasmuch as the mechanism is substantially duplicated in each row of amount keys, it is believed that the explanation of one row of amount keys and its associated differential mechanism will be sufficient.

In Fig. 15, the tens of shillings keys and their associated differential mechanism are shown, and said keys are mounted in a frame 150 supported by rods 151 and 152 extending between the frames 80 and 81.

Each of the amount keys 148 carries a stud 153, adapted to cooperate with corresponding hooks 154 on a detent 155, opposite ends of which are pivoted to arms 156 and 157, which are in turn pivoted to the key frame 150. Depressing one of the amount keys 148 causes the stud 153 therein in cooperation with the angular surface of the corresponding hook 154 to rock the detent 155 downwardly against the action of a spring (not shown) until said stud moves beyond said hook, whereupon the detent 155 is spring returned upwardly to cause the hook 154 to latch over the stud 153 to retain the key depressed. Near the end of machine operations, an arm (not shown) on the key lock shaft 99, in cooperation with an extension of the arm 157, rocks the detent 155 downwardly to disengage the hook 154 from the stud 153, whereupon the released amount key is returned upwardly by means of a compressible spring (not shown) wound around the lower end of its stem.

The studs 153 in keys 148 also cooperate with angular camming projections on a control plate 158 mounted on the key frame 150 in a similar manner to the detent 155. Depressing one of the amount keys 148 causes the stud 153 to shift the control plate 158 downwardly against the action of a spring (not shown) which movement imparts counter-clockwise movement to an arm 159 that supports the lower end of said control plate. Counter-clockwise movement of the arm 159, in cooperation with a stud 160 in an arm connected to a zero stop pawl 161, rocks said stop pawl clockwise to remove the upper end thereof out of the path of a nose of a differential reset plate 162. This prevents the zero stop pawl 161 from engaging the nose of the plate 162 to break the differential latch in zero position and thus permits the plate 162 and the latch mechanism associated therewith to travel upwardly until said latch mechanism is broken by the depressed amount key in a manner later to be described. The reset plate 162 is associated with a differential actuator 163 for this particular amount bank and said actuator 163 is rotatably supported on a hub 164 extending between two similar plates 165, only one here shown, supported by rods 166 and 167 extending between the frames 80 and 81.

Depressing any one of the amount keys 148 (Fig. 15) moves the lower end of the stem thereof into the path of a latch arm 168 pivoted on the actuator 163 and connected to a latch bar 169 also connected by a link 170 to said actuator 163. When the actuator 163 is in home position, as here shown, a foot-shaped rearward extension of the latch bar 169 is spring-urged into engagement with a shoulder 171 of a differential operating segment 172 pivoted on the hub 164 and connected by a link 173 to an A-shaped lever 174 pivoted on a stud 175 secured in the plate 165. Downward extensions of the lever 174 carry rollers 176 and 177 which cooperate respectively with companion plate cams 178 and 179 secured on the main drive shaft 107.

It will be recalled that in adding operations, the main shaft 107 makes one counter-clockwise revolution which by means of the cams 178 and 179 rocks the lever 174 and the driving segment 172 first counter-clockwise and then back to normal position. By means of the shoulder 171, the segment 172 carries the latch bar 169 and the actuator 163 counter-clockwise in unison therewith until the latch arm 168 contacts the stem of the depressed amount key 148. This shifts the latch bar 169 forwardly to disengage the foot-shaped projection thereof from the shoulder 171 and to engage a nose 180 of said bar 169 with one of a series of arcuate notches 181 in a curved alining plate 182 secured to extended arms of the plate 165. The driving segment 172 completes its initial movement counter-clockwise independently of the latch bar 169, and an arcuate surface of said segment, in co-operation with the sole of the foot-shaped extension of said latch 169, retains the nose 180 in the proper notch in the plate 182 to lock the actuator 163 and its associated mechanism in set positions. After the amount actuator 163 has thus been positioned commensurate with the value of the depressed amount key, the corresponding wheel of the selected totalizer is engaged therewith under the influence of the transaction and the clerks' keys, as will be described later.

When the lever 174 (Fig. 15) is at the terminus of its initial movement counter-clockwise, a roller 183 carried thereby engages the arcuate lower surface of a beam 184 pivoted to the actuator 163 and forces a curved recess in the upper surface of said beam into contact with the hub 164 of the actuator 163. This positions the beam 184 in proportion to the depressed amount key and said positioning is transmitted to a link 189 by means of the bifurcated end of said beam 184 in cooperation with a stud 190 in said link 189. The upper end of the link 189 is connected to an indicator segment 191 integral with one of a series of nested tubes 192 supported by a shaft 193 journaled in the frames 80 and 81. The lower end of the link 189 is connected to an arm 194, connected to one of a series of nested tubes 195 rotatably mounted on a shaft 196 journaled in the frames 80 and 81. The link 189, by means of the segment 191, positions the front and back indicators for this particular amount bank in proportion to the value of the depressed amount key and said link 189, by means of the arm 194 and associated mechanism, positions a corresponding printing wheel to the value of the depressed amount key.

In reading and resetting operations, the main shaft 107 makes two counter-clockwise revolutions or two cycles of movement as explained above, and consequently the differential latch operating segment 172 makes two complete excursions. The first cycle of a reading or resetting operation is utilized to aline the wheels of the selected totalizer with the differential actuators, and during this cycle the zero stop pawls 161 (Fig. 15) remain effective and break all the amount latches in zero position. Near the end of the first cycle of a reading or resetting operation, the cam 140 (Fig. 9) shifts the pitman 113 forwardly to rock the lever 114, arm 117 and the zero stop throwout shaft 118 counter-clockwise. Counter-clockwise movement of the shaft 118 (Fig. 15) causes a rod 197, supported parallel thereto by means of similar arms 198 integral with said shaft 118, in cooperation with a forward extension 199 of the zero stop pawl 161, to rock said stop pawl clockwise out of the path of the plate 162. Immediately thereafter, the corresponding wheel of the selected totalizer is engaged with the actuator 163 and in the beginning of the second cycle of operation, initial movement counter-clockwise of said actuator 163 reversely rotates said totalizer wheel until a long tooth thereon, in cooperation with mechanism, not shown but well known in the art, stops the totalizer wheels at zero and causes the actuator 163, the indicator mechanism, and the printing means, for this particular bank to be stopped in positions commensurate with the amount on said totalizer wheel.

In resetting or total taking operations the totalizer wheels are disengaged from the actuators before said actuators are returned clockwise and consequently said wheels remain at zero. In reading or sub-total taking operations, the totalizer wheels remain engaged with the actuators during their return movement and are consequently returned to their original positions. The manually positioned mode of operation lever 122 (Figs. 1 and 18) controls the selecting and engaging of the different totalizer lines with the amount actuators in reading and resetting operations.

Totalizers

In its present arrangement, the machine embodying this invention has three lines of totalizers (Fig. 15), a #1 or listing totalizer line having a single set of wheels which accumulate a total of all the listed items in a multiple item transaction, a #2 or clerk's totalizer line having a set of wheels for each of the four clerks' keys and selected under control of said keys to accumulate individual totals of all transactions handled by the different clerks, and a #3 or group totalizer line having a single set of wheels selected under control of the four transaction keys to accumulate a grand total of all transactions involving cash. In multiple-item transactions, the single set of wheels on the #1 totalizer line (Figs. 15 and 21) are selected for addition under control of a list key 200 in the clerks' bank of keys. The four sets of wheels on the #2 or clerks' totalizer line are selected under control of four corresponding clerks' keys 201 and the single set of wheels on the #3 or group totalizer line is selected under control of four transaction keys 202, including Cash, Account Paid, Special and Non-Member keys.

Located in the same row as the transaction keys 202 is a Member's Number key 203, depression of which conditions the machine for a member's number printing and punching operation. In member's number operations, the keys 149 and the amount keys 148, with the exception of the fractional pence keys, are used to set up the member's number and when so used do not add in any of the totalizers. Depressing the Member's Number key 203 positions the totalizer selecting plate for the transaction bank so that none of the totalizers will be selected for addition at this time. Depressing the Member's Number key 203 locks the transaction keys 202 and the List key 200 against depression. Likewise, depressing the transaction keys 202 or the List key 200 locks the Member's Number key 203 against depression. Depressing the Member's Number key unlocks the 2 to 9 keys inclusive in the tens of shillings row so that these keys may be used for setting up the member's number. As previously explained, these keys are normally locked against depression as they are never used in setting up amounts. The manner in which the Member's Number key 203 controls the punching mechanism will be explained later.

Moving the mode of operation lever 122 away from adding position to Clerk's Read or Clerk's Reset position conditions the machine for a two-cycle total-taking operation and selects the clerk's totalizer line for engagement with the actuators. The different clerks' totalizers are selected for reading and resetting by depressing the corresponding clerk's keys in conjunction with the movement of the mode of operation lever 122, to Clerk's Read or Clerk's Reset position. The group or #3 totalizer is read or reset by moving the mode of operation lever 122 to Group Total Read or Reset position as the case may be, and depressing a group total key 204 located in the same row as the clerk's keys 201. The Group Total key 204 is not used for selecting the group totalizer for adding operations, as this totalizer is selected by means of the transaction keys 202 in this case.

In multiple-item transactions, depressing the List key 200 (Fig. 1) selects the #1 or listing totalizer for addition, and in turn renders mechanism effective that causes the depressed transaction key 202 and the depressed clerk's key 201 to remain depressed during the succeeding item-entering operations of said multiple-item transaction. After all the individual items have been entered, moving the mode of operation lever 122 to List Reset position causes the listing totalizer to be reset to zero and the total of the items printed upon the record material. The List key 200 is a stay-down key and remains depressed during the item-entering operations. However, this key and the depressed transaction and clerk's keys are released during the List Reset operation. When the mode of operation lever is in adding position, an interlocking mechanism between the transaction keys 202 (Fig. 1), the Member's Number key 203, the clerks' keys 201, and the machine releasing mechanism, compels the depression of a transaction key and a clerk's key or the depression of the Member's Number key and a clerk's key before the machine can be released for operation. Moving the mode of operation lever away from adding position renders this interlocking mechanism ineffective.

Clerks differential actuator mechanism

Depressing one of the clerk's keys 201 (Figs. 1 and 21) moves the lower end of the stem thereof into the path of a differential actuator device 205, similar in many respects to the amount differential 163 explained above, and upon operation of the machine the depressed clerk's key breaks or releases the latch of the clerk's differential in a position corresponding to said key. The clerk's differential device 205 has a beam 206 bifurcated to engage a stud 207 in a link 208, the upper end of which is pivotally connected to an indicator segment 209 connected by one of the tubes 192 to a similar segment (not shown) said segment being utilized to position the clerk's indicator mechanism. The lower end of the link 208 is pivotally connected to an arm 210 secured to one of the tubes 195, said tube being loose on the shaft 196, said arm 210 being connected, by mechanism not shown, to a device that shifts the clerk's totalizer line in relation to the amount differentials 163 (Fig. 15). After the clerk's differential 205 has been positioned under control of the depressed clerk's key 201, the beam 206, segment 209 and the arm 210 are positioned in proportion thereto in the same manner as corresponding parts of the amount differential mechanism shown in Fig. 15. The segment 209 positions the indicators corresponding to the depressed clerk's key and the arm 210 aligns the set of totalizer wheels on the #2 line, corresponding to the depressed clerk's key, with the amount differential. Th tube 195 connects the arm 210 to a clerk's type wheel and said arm in addition to selecting the clerks' totalizers also positions the clerk's type wheel to print a letter corresponding to the depressed clerk's key.

An alining bar 211, (Figs. 15 and 21) mounted on arms 212 secured on a shaft 213 journaled in the frames 80 and 81, cooperates with alining teeth in the amount and clerk's indicator segments 191 and 209 and a similar segment for the transaction bank. At the beginning of a machine operation, the bar 211 is moved out of engagement with the teeth in the segments and after said segments are positioned said bar is reengaged with said teeth to hold the segments and parts connected thereto against displacement during a machine operation.

When the mode of operation lever 122 is in adding position, the clerks' keys 201 are used in conjunction with the transaction keys 202, the Member's Number key 203 and the amount keys 148 (Fig. 1) to accumulate individual clerks' totals. When the lever 122 is in Clerk Read or Clerk Reset position, the clerks' keys 201 are used in conjunction therewith to select the different clerks' totalizers for reading or resetting. The selecting of the clerk's totalizer occurs during the first cycle of a Clerk Read or a Clerk Reset operation and during the second cycle of said operations the wheels of the selected totalizer are engaged with the amount differential actuators prior to their initial movement, which movement returns said wheels to zero and positions the amount differentials in proportion thereto. The amount differentials in turn position the amount printing mechanism so that the total amount in the clerk's totalizer is recorded. In resetting operations, the wheels of the selected clerk's totalizer are disengaged from the amount actuators prior to the return movement of said actuators, thus leaving the wheels standing at zero. In reading operations, the wheels of the selected totalizer remain engaged with the amount actuators during their return movement and are returned thereby to their original positions.

*Transaction differential actuator mechanism*

The transaction keys 202 (Figs. 1 and 26A) and the Member's Number key 203 are mounted in a frame 214 supported by the rod 152 and a stud 215 in the left frame 81. Depressing one of the keys 202 or 203 moves the lower end of the stem thereof into the path of a differential control lever 217 pivoted on a stud 218 in the frame 81. The lever 217 is connected to a link 219 which is pivoted at 245 to a latch operating arm 220 loose on the indicator shaft 193 and said arm is connected by a stud 221 to an upward extension of a differential latch 222, pivotally connected to a latch support plate 223 loose on the shaft 193. A spring 224, tensioned between the stud 221 and an extension of the plate 223, urges the latch 222 counter-clockwise to normally maintain a projection 225 thereof in engagement with a notch in the periphery of a latch operating plate 226 loose on the shaft 193. Integral with the plate 226 is a crank 227 connected by a link 228 to a cam lever 229 rotatably mounted on a stud 230 in the frame 81. The lever 229 carries a stud 231 which engages a camming groove 232 in a box cam 233 secured on a short shaft 234 journaled in the frame 81 and the printer back frame (not shown).

In adding operations, the shaft 234 and the cam 233 are driven one clockwise revolution and in total and sub-total operations said shaft is driven two clockwise revolutions in the usual and well known manner. When the shaft 234 and the cam 233 rotate (Fig. 26A), configuration of the groove 232 causes the lever 229, the crank 227, and the latch operating plate 226 to rock first counter-clockwise and then back to normal position for each revolution of the cam 233. In its initial movement counter-clockwise, the plate 226, by means of the notch therein in cooperation with the projection 225, carries the latch 222, the plate 223 and the lever 220 in unison therewith. This counter-clockwise movement of the lever 220, by means of the link 219, rocks the lever 217 clockwise until the projection 216 thereof contacts the stem of the depressed transaction key 202. This obstructs further counter-clockwise movement of the lever 220, the plate 223 and the latch 222, whereupon, continued movement of the plate 226 moves the projection 225 of said latch 222 out of engagement with the notch therein, and forces an alining tooth 240 formed on said latch 222 into one of a series of V-shaped notches 241 in a curved alining plate 242 secured on the frame 81. The periphery of the plate 226 in cooperation with an arcuate surface on the projection 225 locks the tooth 240 in the notch 241 corresponding to the depressed transaction key. This differentially positions the plate 223 commensurate with the value of the depressed transaction key and this differential positioning is transmitted to the clerk's type carrier and indicating mechanism in a manner now to be described.

When the lever 229 (Fig. 26A) nears the terminus of its initial movement counter-clockwise, a roller 243 carried thereby engages a rounded surface on a differential beam 244 pivoted to the plate 223 and forces an arcuate surface on the upper edge of said beam into contact with a collar on the shaft 193 to differentially position said beam 244 commensurate with the value of the depressed transaction key. The left-hand end of the beam 244, as here viewed, is slotted to receive a stud in a crank 246 secured to the indicator shaft 193, and it is therefore evident that the shaft 193 is also positioned in accordance with the depressed transaction key to cause the proper transaction indicator to be displayed. The stud in crank 246 fits loosely in a recess in one end of a link 247, the other end of which is pivotally connected to a segment 248 loose on the stud 218. An arm 249 integral with the segment 248 is connected by a link 250 to an extension of a printer positioning segment 251 connected by one of a series of tubes 252 (Fig. 27) loose on the shaft 196 to a similar segment that positions the punching mechanism for the transaction keys. The segment 248 also positions the transaction type wheel to print a symbol corresponding to the transaction key 202 depressed. Mechanism connected to the indicator shaft 193 and controlled by the transaction keys, selects the single set of wheels on the #3 or group totalizer line for engagement with the differential actuators.

During its return movement clockwise, the plate 226 (Fig. 26A) engages a stud 253 carried by the plate 223 and returns said plate, the latch 222 and the lever 220 to home positions. When no key is depressed in the transaction bank, as in clerk's and group total-taking operations, the lever 217 and associated parts of the transaction differential move to a neutral position, which position is determined by a surface 254 on said lever 217 contacting a stud 255 in the printer back frame. In total and sub-total operations the cam 233 makes two revolutions, and as a consequence the lever 217 and associated parts make two excursions of movement, the second of which is an idle movement.

Member's Number key

Depressing the Member's Number key 203 (Fig. 26A) actuates several trains of mechanism connected thereto and naturally makes this key harder to depress than the other transaction keys. In order to overcome this hard action, the Member's key 203 is provided with a lever 257 pivotally connected to a plate 256 integral with the frame 214 and carrying a stud 258 which cooperates with a slot in the top of the key 203. A touch plate on the end of the lever 257 provides a means of depressing the Member's Number key 203. The keys 202 and 203 carry pins 259, which cooperate with corresponding hook-shaped projections 260 on a locking detent 261, slidably mounted in the key frame 214. Depressing one of the transaction keys 202 or the Member's key 203 causes the pin 259 therein, in cooperation with an angular surface on the corresponding hook 260, to shift the detent 261 rearwardly against the action of a spring 262. When a flat surface on the pin 259 moves beyond the hook 260 the spring 262 returns the detent forwardly to latch the key in depressed position.

Free on the key lock shaft 99 (Figs. 24 and 26A) is a locking plate 263 urged clockwise by a spring 265 to normally maintain a stud 264, which projects from both sides thereof, in contact with a finger 266 secured on the key lock shaft 99. When one of the transaction keys or the Member's key is partially depressed an extension 267 of the detent 260 is held in the path of a corresponding projection on the plate 263 and obstructs releasing movement counter-clockwise of the key lock shaft 99, thereby preventing release of the machine when a key is partially depressed. When the key 202 or 203 has been fully depressed, the extension 267 moves forwardly out of the path of the projection on the plate 263.

As previously explained, releasing the machine for operation causes the key lock shaft 99 and the finger 266 to rock counter-clockwise and said finger 266 carries the plate 263, in unison therewith, against the action of the spring 265, to move the projection on said plate 263 into the path of the extension 267 to lock the depressed transaction or Member's key against release and to lock undepressed keys in the transaction bank against depression during operation of the machine. Near the end of an operation, restoring movement clockwise of the shaft 99 and the plate 263 causes the stud 264 in said plate in cooperation with a lever (not shown) to shift the locking detent rearwardly to disengage the corresponding hook 260 thereof from the pin 259 in the depressed key to permit said key to be spring returned upwardly to undepressed position.

When the machine is at rest, it is necessary to depress one of the transaction keys 202 or the Member's Number key 203 before the machine can be released for an adding operation. A latch 268, the lower end of which is pivoted to an extension of the key frame 214 and the upper end of which has a slot which engages a stud in a control plate 269 slidably mounted on the frame 214, engages a tooth 270 of the plate 263 (Figs. 24 and 26A) to prevent counter-clockwise releasing movement of said plate and the shaft 99. The control plate 269 has an angular camming projection for each of the transaction keys 202 and the Member's Number key 203, which cooperates with the pins 259 in said keys. Depression of any one of the transaction keys or the Member's Number key causes the pin 259 in said depressed key, in cooperation with the corresponding angular camming projection on the control plate 269, to shift said control plate forwardly against the action of a spring 271 to disengage the latch 268 from the tooth 270 to permit counter-clockwise releasing movement of the plate 263 and the key lock shaft 99. Upon release of the depressed key near the end of a machine operation, the control plate 269 and the latch 268 are returned to effective positions, as here shown, by the spring 271.

Printing and receipt feeding mechanism

Directing attention to Fig. 22, each amount bank has a printing wheel 272 connected to a corresponding one of a series of nested tubes 273 rotatable on a shaft 274 journaled in the printer frame. The tubes 273 are connected by gears and segments to the corresponding tubes 195 (Fig. 15), which as previously stated, are driven by the amount actuators 163. The amount type wheels 272 have two sets of identical numbers thereon, one set of which is adapted to print on the web 275 of an issuing receipt and the other set upon the web 276 of a detail strip, which is retained in the machine. The web 275 of the receipt is unwound from a supply roll (not shown), threaded around various studs and rollers which guide said receipt web between the type wheels 272 and an upper impression hammer 277, thence between a receipt feed roller 278 and its associated pressure roller 279, and finally beneath a serrated tearing knife 280 mounted on the printer back frame. The web 276 of the detail strip is unwound from a supply roll (not shown) guided by various rolls and studs between the type wheels 272 and a lower impression hammer 281 and thence to a receiving roll (not shown). The receipt and detail strip mechanisms are not fully disclosed herein, as they are old and well known in the art.

The clerk's bank (Fig. 21) controls the positioning of a type wheel on the shaft 274 similar to the wheel 272 for recording an identifying letter, on the receipt and detail strip, for the clerk making the transaction. Likewise the transaction bank (Fig. 26A) controls the positioning of a type wheel on the shaft 274 (Fig. 22), similar to the wheel 272, for printing an identifying symbol, on the receipt and detail strip, corresponding to the transaction key depressed. The mode of operation lever 122 (Fig. 18) is connected by a link 282 to a crank 283 secured on the right-hand end of the shaft 196, said shaft having secured on the left end thereof a segment 284. Moving the mode of operation lever 122 from one position to another, by means of the link 282 and crank 283, positions the shaft 196 and the segment 284 in proportion thereto. The segment 284, by means of teeth in the upper portion thereof in cooperation with associated segments and gears, positions a type wheel on the shaft 274 (Fig. 22), similar to the amount wheels 272, in proportion to the position of the mode of operation lever 122 to print a symbol on the detail strip identifying the position of said mode of operation lever 122 and the type of operation being performed.

It is necessary to feed the web of the receipt material different distances in different kinds of operations. For example, in single item operations a receipt such as that shown in Fig. 4 is issued and in this case, after the impression has been made, the receipt web is given a long feed in order to secure the desired margin at the bottom of the receipt. In single item member operations, where the member's number is first printed upon the receipt in one operation and other data in another operation, it is desirable to double line space the record material as shown in Fig. 5, in order to distinguish these two recordings. In multiple-item member transactions, a receipt such as that shown in Fig. 3 is issued. In this case the spacing between the member's number and the first item is the same as that shown in Fig. 5.

During the listing of the various items of a multiple-item transaction it is desirable to single line-space the receipt material after the entry of each item. After all of the items have been listed the listing totalizer is reset in order to record a total of the items. Prior to the recording of the multiple-item total, the receipt material is double line-spaced in order to separate the total from the last item. In multiple-item non-member operations a receipt similar to that shown in Fig. 3 is issued with this exception: the member's number is omitted.

All the data recorded upon the receipts are also simultaneously recorded on the web 276 of the detail strip (Fig. 2). All the different entries on the detail strip are uniformly spaced with the exception of total items, in which case the detail strip is double spaced to leave a noticeable space between the last item and the total.

The spacing of the different items on the receipts is accomplished by means of the feed roller 278 (Fig. 22), the feeding movement of which is controlled in a manner now to be described. The receipt roller 278 is rotatably mounted upon a rod 290 secured in the printer back frame, and said feed roller has integral therewith a ratchet wheel 291 the teeth of which cooperate with the tooth of a feed pawl 292 pivotally mounted on an arm 293 loose on the rod 290 and having integral therewith a pinion 294. The pinion 294 meshes with the teeth of a feed sector 295 which is rotatably mounted upon the largest of the nested tubes 273.

The sector 295 carries a roller 296 which cooperates with the end of a pitman 297 slotted to embrace a stud 298 in the printer back plate and is pivotally connected to the upper arm of a lever 299 loose on a stud 300 fast in the left frame 81. The lever 299 carries rollers 301 and 302 which cooperate respectively with the peripheries of companion plate cams 303 and 304 secured on a shaft 305 journaled in the frame 81 and the printer back frame.

The shaft 305 is driven one counter-clockwise revolution each adding operation to shift the pitman 297 first rearwardly and then forwardly to normal position, as here shown. The roller 296 in cooperation with the forward end of the pitman 297 permits the sector 295 to move rearwardly or counter-clockwise in unison with the pitman 297 under the influence of a spring 306. This rearward movement of the sector 295 is variable and determines the length of feed given the receipt material 275. Initial movement counter-clockwise of the sector 295 rotates the feed pawl 292, while the ratchet 291 and the feed roll 278 are held stationary by a pawl 307 having a fixed pivot point. After the hammers 277 and 281 have completed their printing strokes, the pitman 297 returns the sector 295 forwardly or clockwise, which in turn drives the pawl 292 counter-clockwise to rotate the ratchet 291 and the feed roll 278 counter-clockwise in unison therewith to feed the receipt material 275 forwardly past the edge of the tearing blade 280 and through an aperture or throat in the front of the cabinet.

Referring to Figs. 20A, 22 and 23, a receipt feed control shaft 308, journaled in the left frame 81 and the printer back frame, rotatably supports a receipt feed control plate 309 carrying a flattened stud 310, which cooperates with steps 311 and 312 cut in the feed sector 295. The plate 309 is spring urged clockwise to normally maintain an extension 313 thereof in engagement with a stud 314 in an arm 315 loose on the shaft 308. The arm 315 carries a stud 316 resiliently engaged by symmetrical pinch arms 317 and 318 loose on the shaft 308 and urged together in scissors fashion by a spring 319. Secured on the shaft 308 is an arm 320 carrying a stud 321, which is also resiliently engaged by the arms 317 and 318.

In single-item non-member operations, during which a receipt such as is shown in Fig. 4 is issued, the shaft 308, the arm 315 and the plate 309 are in their counter-clockwise position, as shown in Fig. 20A, in which position the stud 310 is out of the path of the steps 311 and 312 and in a clearance opening formed by said steps. This permits the sector 295 to move full distance counter-clockwise under influence of the pitman 297 to effect maximum pickup of the pawl 292. After the printing stroke of the hammer 277 has been completed, return movement forwardly of the pitman 297 rotates the feed roll 278 maximum distance counter-clockwise to feed the receipt material 275 to properly space the printing of the amount and other data on the receipt in relation to the knife 280 to obtain the desired margin on the bottom of said receipt.

Control of receipt feed by member's number key

In single-item member transactions a receipt such as is shown in Fig. 5 is issued. It will be noted that, first the member's number is printed and then the receipt is double line-spaced, next the amount and other data is printed and finally the receipt is given a full feed to properly space the last recording from the bottom thereof.

Depressing the Member's Number key 203 (Fig. 24) causes the stud 259, in cooperation with an angular camming slot 335 in a control bar 336 shiftably mounted by means of slots therein cooperating with screws 337 threaded in the frame 214, to shift said bar 336 forwardly. A stud 338 in the bar 336 engages a slot in an upturned extension of a curved link 322 pivotally connected to arms 323 and 325 (Fig. 11) rotatably supported respectively by a stud 324 in the frame 81 and the shaft 96. Through the above connection, the bar 336 rocks the link 322, the arm 325 and a three armed lever 326, integral with said arm 325, clockwise in unison therewith. Clockwise movement of the lever 326 causes a stud 327 in an extension of said lever 326 to cooperate with a raised surface of a pitman 328 pivoted on a crank 329 secured on the key lock shaft 99 to shift said pitman 328 downwardly to cause a shoulder 331 thereon to move downwardly against the tension of a spring 330 into the path of a stud 332 in an arm 333 loose on a stud 334 in the frame 81. A spring 340 urges the arm 333 counterclockwise to maintain a notch 341 in said arm in engagement with a stud 342 in one arm of a yoke 343, free on the shaft 308. A hole in the other arm of the yoke 343 (Figs. 19 and 20) engages a stud 344 in an arm 345 loose upon the shaft 308 and having therein an irregular slot which embraces a floating stud 346 in a link 347 pivoted to one arm of a lever 348 secured on the shaft 118. The stud 346 also extends through a straight slot in an arm 349 secured on the shaft 308 and urged clockwise by a spring 350.

After the member's number has been set up on the amount keys, the Member's Number key 203 and the proper clerk's key depressed, depressing the starting bar 87 (Fig. 9), releases the key lock shaft 99 to the action of the spring 100, which rocks said shaft counter-clockwise in the manner explained hereinbefore, to release the machine for operation. Counter-clockwise movement of the shaft 99 and the crank 329 (Fig. 11) shifts the pitman 328 forwardly and downwardly in unison therewith, causing the shoulder 331 in cooperation with the stud 332 to disengage the notch 341 from the stud 342 to release the yoke 343, the arm 345 (Fig. 19), the arm 349 (Fig. 20) and the shaft 308, to the action of the spring 350, which immediately rocks said shaft 308 and the connected parts thereon clockwise until the stud 342 (Fig. 11) engages the end 351 of a pitman 352, bifurcated to straddle the stud 334 and pivotally connected to a lever 353, free on a stud 354 in the frame 81. The lever 353 carries a roller 355 which cooperates with a camming groove in the face of a gear 356 secured on the main drive shaft 107. The gear 356 makes one counter-clockwise revolution during adding operations, and at the beginning of said revolution the camming groove therein, in cooperation with the roller 355, rocks the lever 353 clockwise to shift the pitman 352 forwardly to restore the yoke 343 and parts connected thereto, including the shaft 308, counter-clockwise to normal position, as shown in Figs. 11 and 20A. However, as the depressed Member's Number key 203 retains the notch 341 in the arm 333 out of the path of the stud 342, the yoke 343 and connected mechanism under influence of the spring 350 (Fig. 20) follows the pitman 352 in its return movement rearwardly. The arm 315 (Figs. 20A, 22 and 23) being operatively connected to the shaft 308 by means of the pinch arms 317 and 318 and the crank 320, moves in unison with said shaft. A spring 357 causes the plate 309 to move in unison with the arm 315 until a stud 358, carried by said plate, contacts a block 359 secured on the end of the Member's Number key 203 to position the stud 310 in the path of the step 312.

During a machine operation, the sector 295 moves in unison with the pitman 297 until the step 312 contacts the stud 310. After impression is effected, return movement forwardly of the pitman 297 drives the sector 295 from its set position back to normal position (as shown in Fig. 22) to rotate the feed roller 278 counter-clockwise to double line-space the receipt material to separate the member's number from the amount, which is printed in a succeeding operation.

At the end of the member's number operation all keys including the Member's Number key 203 (Figs. 11, 20A and 22) are released, and releasing the Member's Number key 203 permits the pitman 328 to return upwardly until the shoulder 331 is above the stud 332, as here shown. In the succeeding amount operation, initial movement forwardly of the pitman 352 restores the yoke 343 and connected parts, including the shaft 308, upwardly to normal position as shown in Fig. 20A, and the notch 341 in the arm 333 engages the stud 342 to retain said yoke and said shaft 308 in their normal positions. This counter-clockwise restoring of the shaft 308 (Figs. 22 and 23) through the arm 315 moves the plate 309 in unison therewith to move the stud 310 out of the path of the step 312 and into the clearance opening provided therefor, so that the sector 295 may receive full movement to properly space the amount from the bottom of the receipt (Fig. 5).

In a Member's Number operation, clockwise movement of the lever 326 (Figs. 11, 21 and 24) upon depression of the Member's Number key 203, causes a bifurcated extension of said lever, in cooperation with a stud 360 in an arm of a yoke 361 fulcrumed on the shaft 99, to rock said yoke counter-clockwise. Counter-clockwise movement of the yoke 361 causes a stud 362 in another arm thereof, in cooperation with a slot in a crank 363, loose on the shaft 96, to rock said crank clockwise. The crank 363 is connected to a locking plate 364 shiftably mounted in the clerk's key frame and consequently, clockwise movement of said crank 363 shifts the plate 364 clockwise to move a projection 365 thereof under a stud 366 in the List key 200 to lock said List key against depression during a member's number operation.

It will be recalled that in amount transactions only the one key in the tens of shilling bank is used, the two to nine keys inclusive being locked against depression. In member's number operations, counter-clockwise movement of the yoke 361 (Fig. 15), in cooperation with arms 385 and 386 free respectively on shafts 99 and 96, shifts a locking plate 387, mounted on the frame 150, clockwise. Clockwise movement of the plate 387 moves projections thereon out of the path of the studs 153 in the two to nine keys 148 inclusive to unlock these keys so that they may be used to set up the member's number.

In multiple item member operations, a receipt such as that shown in Fig. 3 is issued. The member's number operation prints the member's number and spaces the receipt in exactly the same manner as explained in connection with the receipt shown in Fig. 5. After the member's number has been printed and the receipt has been properly spaced, the machine is conditioned for a multiple-item transaction by depressing the List key 200 (Figs. 11 and 21). This selects the listing totalizer to accumulate a total of the listed items, and as a multiple-item transaction consists of a series of item listing operations followed by an item total operation, depressing the List key causes the depressed Clerk's and Transaction keys to remain depressed during the item listing operations and until the end of the item total operation. Obviously the List key 200 also remains depressed until the end of the item total operation. Depressing the List key 200 (Fig. 11) causes the stud 366 therein to rock an arm 367, free on the rod 151, counter-clockwise, whereupon an extension 368 of said arm, which underlies a bail of a yoke 368, also turnably mounted on the rod 151, carries said yoke counter-clockwise therewith. Counter-clockwise movement of the yoke 368 causes a stud 369 in another arm 370 thereof, in cooperation with the bifurcated forward end of the pitman 328, to rock said pitman downwardly to move the shoulder 331 into the path of the stud 332.

Counter-clockwise movement of the key lock shaft 99, upon release of the machine for operation, shifts the pitman 328 downwardly to rock the notch 341 in the arm 333 out of engagement with the stud 342 to release the yoke 343 and connected parts, including the shaft 308 and arm 315 (Figs. 20, 20A, 22 and 23) to the action of the spring 350, which immediately moves said parts clockwise in exactly the same manner as when the Member's Number key 203 is depressed. The plate 309, under influence of the spring 357, moves in unison with the arm 315 to position the stud 310 therein in the path of the step 311 on the sector 295, as shown in Fig. 22. During operation of the machine, the sector 295 travels counter-clockwise in unison with the pitman 297 until the step 311 engages the stud 310. After the printing mechanism has functioned, to print the first item upon the receipt, return movement forwardly of the pitman 297 returns the sector 295 from its set position clockwise to normal position to rotate the feed roller 278 to single line-space the receipt material, to properly space the items of a multiple-item transaction as they are listed.

After all the items of a multiple-item transaction have been listed in the manner explained above, moving the mode of operation lever 122 (Fig. 1) from add position to List Reset position conditions the machine for an item-total operation during which the listing totalizer is cleared and a total of the items printed upon the receipt.

In order that the recording of the item total will be readily distinguishable from the listed items, the receipt shown in Fig. 3 is double line-spaced during the item-total operation to properly separate said total from said items. Moving the mode of operation lever 122 (Figs. 1 and 18) from adding to list reset position, by means of the slot 124 and cooperating mechanism, rocks the shaft 118 counter-clockwise a slight distance in the manner explained previously. Counter-clockwise movement of the shaft 118 (Fig. 20) and the lever 348 shifts a pitman 371, the lower end of which is pivotally connected to said lever 348, upwardly. The upper end of the pitman 371 rests on a collar on the shaft 308. Upward movement of the pitman 371 causes a roller 372 carried thereby to engage the sole of a foot-shaped arm 373 secured on the shaft 308 and rocks said shaft counter-clockwise from the position shown in Fig. 22 to a position where the stud 310 will be in the path of the step 312 on the sector 295. During the first cycle of the item-total operation, in which the printing mechanism is idle, operation of the sector 295 (Fig. 22) rotates the feed roller 278 to double line-space the receipt shown in Fig. 3 to separate the last item thereon from the item total, which is printed in the last cycle of said item-total operation.

Near the end of the first cycle of an item-total operation, the mechanism shown in Fig. 9 and explained earlier herein gives an added counter-clockwise movement to the shaft 118 and the pitman 371 (Fig. 20) causing the roller 372 in cooperation with the arm 373 to rock the shaft 308 and the arm 320 (Fig. 22) the full distance counter-clockwise. This movement of the shaft 308 by the shaft 118 occurs before the sector 295 has completed its feeding movement and in order to retain the stud 310 in the path of the step 312 an obstruction not shown but well known in the art and disclosed in the Shipley Patent 1,865,147 is moved under a stud 374 in the arm 315.

The pinch arms 317 and 318 permit movement of the shaft 308 independently of the arm 315. After the sector 295 completes its feeding movement, the obstruction is moved from beneath the stud 374, permitting the spring 319 to immediately rock the arm 315 and the plate 309 to a position where the stud 310 is out of the path of the steps 311 and 312, and in alinement with the clearance opening formed by said step. This permits the sector 295 to move full distance counter-clockwise in unison with the pitman 297 to obtain a maximum pickup of the feed pawl 292, whereupon return movement clockwise of said sector 295, after the total of the items has been printed on the receipt, feeds said receipt full distance to properly position the item total from the bottom of said receipt. The only difference between a member's and a non-member's multiple-item transaction is that in the latter the member's number is not printed.

The printing of the member's number requires a separate operation of its own that is identical in all cases, regardless of what type of transaction is involved in connection therewith.

All entries printed upon issuing receipts are duplicated upon the detail strip 276 (Fig. 2). All items printed on the detail strip, during single cycle operations are spaced equally. In two-cycle operations the detail strip receives a feeding movement each cycle of operation and as there is only one printing stroke of the hammer, a space is left between the last item and the totals being printed.

*Control of release of transaction keys*

The transaction keys 202 (Figs. 1 and 26A) and the Member's Number key 203 are normally released at the end of each machine operation. However, in multiple-item transactions it is desirable that the depressed transaction key 202 remain depressed during the item listing operations and during the final List Reset operation. The locking plate 263 (Figs. 24 and 26A) has a shoulder 375 which cooperates with a latch 376 loose on a stud 377 in the frame 81. A downward extension of the latch 376 carries a stud 378 which cooperates with the hook-shaped rearward end of a bar 379 shiftably mounted by means of a stud 380 in a bracket (not shown) secured to the frame 81 and by means of a stud 255 (Fig. 20) in cooperation with a bifurcated portion of said bar 379. A stud 382 in the forward end of the bar 379 is engaged by a bifurcated extension of the arm 349, which, it will be recalled, is secured on the shaft 308 and is connected to the arm 345 loose on said shaft by the stud 346 cooperating with slots in arms 345 and 349.

When the shaft 308 and parts assembled thereon, are in single-item or normal position, as shown in Figs. 19, 20 and 20A, the arm 349 positions the bar 379 (Fig. 24) so that the hook thereon, in cooperation with the stud 378, retains the latch 376 in counter-clockwise position, contrary to the action of a spring 383, one end of which is connected to a stud 384 in said latch 376. This holds the latch 376 out of engagement with the shoulder 375 when the plate 263 is rocked counter-clockwise by releasing movement of the key lock shaft 99.

Depressing the List key 209 (Fig. 11) rocks the shoulder 331 on the pitman 328 into the path of the stud 332 in the arm 333, whereupon counter-clockwise movement of the shaft 99, upon release of the machine for operation, rocks the arm 333 clockwise out of engagement with the stud 342 in the yoke 343. This releases the yoke 343 to the action of the spring 350 (Fig. 20), which immediately rocks said yoke, the arm 349 and the other parts assembled on the shaft 308 clockwise to multiple-item or single space position, as shown in Fig. 22. Clockwise movement of the arm 349 (Figs. 20 and 24) shifts the bar 379 rearwardly to release the latch 376 to the action of the spring 383, which immediately engages said latch with the shoulder 375 when the plate 263 moves counter-clockwise in unison with the shaft 99. This retains the plate 263 in moved position when the shaft 99 is restored clockwise near the end of machine operation, thereby preventing the stud 264 from releasing the depressed transaction key and causing the shoulder on said plate 263, in cooperation with the projection 267 of the locking detent 261, to prevent the depression of another transaction key 202 until the multiple-item transaction has been completed.

Movement of the shaft 118 (Fig. 20), near the end of the first cycle of a multiple-item List Reset operation, returns the shaft 308 and parts assembled thereon, including the arm 345, counter-clockwise to normal position, as here shown, which movement returns the bar 379 forwardly (Fig. 24) causing the hook thereon, in cooperation with the stud 378, to disengage the latch 376 from the shoulder 375 to permit the plate 263 to return clockwise in unison with the shaft 99, under influence of the spring 265, to release the depressed transaction key 202.

Depressing the Member's Number key 203 (Figs. 11, 24 and 26A) accomplishes the same result as depressing the List key 200, that is, causes the arm 333 to be rocked out of engagement with the stud 342 to release the yoke 343 and connected parts to the action of the spring 350 (Fig. 20) which shifts the bar 379 rearwardly to render the hook 376 effective. However, in this case it is not desirable that the plate 263 be latched in counter-clockwise position, as it is necessary for the Member's Number key 203 to be released at the end of the member's number operation. Depressing the Member's Number key 203 (Fig. 24) causes the stud 259 therein, in cooperation with the camming notch 335, to shift the control bar 336 forwardly or clockwise in the manner explained earlier herein. This clockwise movement of the bar 336 causes a stud 390 in the upper end thereof, in cooperation with an angular camming surface on a lever 391 loose on the shaft 99, to rock said lever clockwise in unison therewith, against the action of a spring 389. Clockwise movement of the lever 391 moves an extension 392 thereof into the path of the stud 384 in the latch 376 to obstruct clockwise movement of said latch to effective position when the bar 379 is rendered ineffective by depression of the Member's Number key. It is, therefore, obvious that in this instance the plate 263 remains effective and returns clockwise in unison with the shaft 99 to release the depressed Member key 203 near the end of the Member's Number operation. When the key 203 is released the lever 391 is returned to ineffective position by the spring 389.

PUNCHING MECHANISM

In addition to the recording of the various transactions upon the issuing receipt and the detail strip, all transactions involving the payment of cash by a member or a non-member customer of the Cooperative Society are punched in record cards of the type shown in Figs. 7 and 8. The data punched in the record cards includes member's number and symbol therefor, amount, transaction symbol, clerk's letter, register number, department number, and date. The member's number and symbol are punched in a separate preliminary operation of the machine and all other data, involved in a member's transaction, is punched during the succeeding amount operation of the machine. The punches for the register number, department number, and date, are selected by means of manipulative devices conveniently located at the front of the machine and certain of these manipulative devices may be locked in set positions to prevent unauthorized persons from changing the positions thereof.

The card shown in Fig. 7 was punched during a member's transaction, and consequently, has the member's number and the symbol therefor, punched in their respective fields. The card shown in Fig. 8 was punched during a non-member transaction and the only difference between this type of transaction and a similar member's transaction is that the operation in which the member's number and the symbol therefor are punched in the card is omitted, and consequently this data is not punched in the card issued during a non-member transaction.

The card punching mechanism will now be described in detail.

*Framework for punching mechanism*

The punching mechanism is mounted on and between a right frame 393, a left frame 394, and an intermediate frame 395 (Figs. 26B, 30 and 37), spaced and maintained in proper relation to each other by means of cross bars 396, 397, 398, 399 and 400. The punching mechanism is mounted in a compartment in the left-hand side of the drawer cabinet 84. The framework for the punching mechanism is connected to the machine proper by means of threaded studs 401 (Figs. 26A and B) secured in the cross bars 399 and 400, and extending through the top 83 of the drawer cabinet. The threaded upper ends of said studs 401 extend through holes in the machine base 82 and are secured in place by means of nuts. Bolts 402 (Figs. 26B and 37), threaded in extensions of the cross bar 398, have tenons on the lower ends thereof, which, in cooperation with holes 403 secured on the top surface of a cross member 404 of the drawer cabinet, assist in locating and maintaining the punching mechanism in proper relation to the cash register portion of the machine.

*Connections between the differential mechanism of the machine proper and the punching mechanism*

The positioning of the clerk's differential 205 (Fig. 21) under influence of the Clerks' keys 201 is transmitted to the punching mechanism by means of a gear sector 405 (Fig. 27) connected to the left end of the tube 195 for the clerk's bank, which, it will be recalled, is positioned by the arm 210 and the link 208. The gear sector 405 (Figs. 27 and 29) meshes with a corresponding gear sector 406 loose on a rod 407. Sector 406 meshes with a gear 408 loose on a rod 409.

The differential mechanism for the fractional pence and pence banks are connected by their respective tubes 195 to gear sectors 410 (Figs. 27 and 29) which mesh with corresponding sectors 411, loose on the rod 407, sectors 411 meshing with corresponding gears 412 on the rod 409. The other amount banks are connected by segments, similar to the segment 410, to corresponding segments 413 (Fig. 29), which in turn mesh with corresponding gears 414 on the rod 409. The gear sector 410 (Fig. 27), for the pence bank, is longer than the corresponding sectors for the higher order amount banks. The reason for this is that the pence bank has twelve denominational divisions in the same space that the higher order banks have only ten, and in order to get sufficient movement to select the punches for the pence bank, it is necessary to increase the diameter of the associated sector 410.

The gear sectors for the higher order banks, similar to the sectors 410, mesh with corresponding sectors 413 (Fig. 29), which in turn mesh with corresponding gears 414 on the rod 409. The segment 251, (Figs. 27 and 29) for the transaction bank meshes with a sector 415 loose on the rod 407, which in turn meshes with a gear 416 loose on the rod 409.

The rods 407 and 409 (Figs. 27 and 29) are connected in fixed relation to each other by means of plates 417 and 418 secured to either end thereof, and the ends of said rods fit snugly in vertical slots in the frames 393 and 395. This forms a shiftable assembly of the rods 407 and 409 and the gear sectors and gears mounted thereon. The gear sectors on the rod 407 are maintained in mesh with their corresponding sectors 405, 410 and 251 by means of pins 419 loosely mounted in hubs in the plates 417 and 418, in cooperation with holes in the frames 393 and 395, said pins 419 being secured against displacement by means of set screws 420 in their respective hubs. Prior to the assembling of the punching mechanism to the machine proper, the screws 420 are loosened and the pins 419 are withdrawn from the plates 393 and 395, permitting the rods 407 and 409 and the gear sectors and gears mounted thereon to be shifted downwardly so that said gear sectors on the rod 407 do not mesh with their corresponding sectors fulcrumed on the shaft 196. After the punching mechanism has been connected to the machine and the gear sectors are properly alined, the assembly comprising the rods 407 and 409 is shifted upwardly to mesh the related gear sectors, after which the pins 419 are engaged with their respective holes and secured in place by the set screws 420.

Directing attention to Figs. 27, 29 and 34, the gear 408, for the clerk's bank, meshes with a corresponding gear 421 and the two gears 412, for the pence and fractions of pence denominations respectively, mesh with corresponding gears 422, the gears 414, for the higher order denominations, mesh with corresponding gears 423, and the gear 416, for the transaction bank, meshes with a corresponding gear 424. The gears 421 to 424 inclusive are known as double gears, having external and internal teeth, and the internal teeth of said gears, in cooperation with the periphery of corresponding discs 425, form the means for rotatably supporting said double gears. The discs 425 are loosely mounted upon a rod 426 extending between plates 427 and 428, and through a recess in an intermediate plate 429, and together with a companion rod 430, secured to the plates 427, 428, and 429, form a framework for supporting the internal gear driving mechanism, which is of the well known type fully disclosed in Letters Patent of the United States, No. 1,693,279, issued November 27, 1928, to W. J. Kreider. The plate 427 (Figs. 34 and 37) is connected to the right frame 393, and the plates 428 and 429 are connected to a punch supporting frame 431 assembled between the frames 394 and 395. Inasmuch as the internal gear driving mechanism is well known in the art, it will be but briefly described in connection with a diagrammatic view of said mechanism shown in Fig. 34, and the end view shown in Fig. 35.

The discs 425 are maintained in fixed relation to each other by means of the rod 426 and associated rods 432 and 433, which pass through holes in all the discs, and the plate 429, and are supported in counter borings in the plates 427 and 428. The discs 425 have an outer circle of equally spaced holes, which loosely support square shafts 1 to 9 inclusive and 12 to 14 inclusive, and said discs have an inner circle of equally spaced holes which rotatably support shafts 15, 17, 18, 20 and 21. The disc 425 (Fig. 27), which rotatably supports the gear 421 for the clerk's bank, has a recess therein which rotatably supports a gear 434 fast on the square shaft 9 (see also Fig. 34). The square shaft 9 drives a gear 440 similar to the gear 434 which meshes with the internal teeth on a double gear 441 similar to the gear 421 and mounted in exactly the same manner upon a corresponding disc 425 (Fig. 35). External teeth on the gear 441 mesh with a clerk's punch selecting rack 439. The gear 422 for the fractional pence bank is connected by a pinion 442, the shaft 2, and a pinion 443, to a corresponding rack drive gear 444.

The gear 422 for the units of pence bank, and the gears 423 for the units shillings, tens shillings, units pounds and tens pounds banks have meshing with the internal teeth thereof gears 445 which drive respectively square shafts 3, 4, 5, 6 and 7, and said shafts in turn drive gears 446, which, in cooperation with the internal teeth of their corresponding gears 447, differentially position said gears in proportion to the value of the depressed keys 148 (Fig. 1). External teeth on the gear 444 and the gears 447 (Figs. 28, 30 and 34) mesh with teeth in corresponding racks 448 and 449 for selecting the amount punches. The racks 439, 448 and 449 are mounted to slide vertically by means of grooves in a plate 450 in cooperation with the rearward edge of said racks, and by means of slots in a plate 451, in cooperation with selecting noses 452 on said racks. The plates 450 and 451 are assembled to the framework 431.

In addition to positioning the amount punch selecting racks 449, the shafts 3 to 7 inclusive carry gears 453, similar to the gears 446, which drive gears 454, similar to the gears 447, which in turn position racks 455 for selecting the punches for the member's number. By referring to Fig. 1 it will be recalled that the row of keys 149 is not used for setting up amounts, but is used only for setting up the member's number, and the differential mechanism controlled by this row of keys is connected to the gear 423 (Fig. 34) and positions said gear in proportion to the movement of said differential. The internal teeth of the gear 423 mesh with a drive gear 456, which drives a shaft 8 and a gear 457 mounted thereon. The gear 457 meshes with the internal teeth of a gear 458 and external teeth on said gear 458 positions a punch selecting rack 459 commensurate with the value of the depressed key 149. In Fig. 28 a side elevation is shown of the gear 447 and the punch selecting rack 449 for the tens of pounds amounts, and the 10,000 members' numbers. All the gears shown in Fig. 34 and their associated discs 425 are spaced laterally by means of separating discs (not shown) between each of said gears and by means of sleeves upon the rod 426.

The nose 452 on each of the amount punch selecting racks 448 and 449 (Figs. 28 and 30) cooperates with its respective row of punch connector bars 460 (Figs 31, 32 and 33) and the member's number punch selecting racks 455 and 459 cooperate with their respective connector bars 461 (Fig. 32). The connector bars 460 are mounted in the upper section and the connector bars 461 are mounted in the lower section of a framework composed of side bars 462 and 463 connected at the top by a bail 464 and at the bottom by a rod 465. The connector framework thus formed is mounted to slide vertically by means of rollers 466 and 467, mounted on the bars 462 and 463, respectively, cooperating with channel rails 468 and 469 assembled to the side members for the framework 431. The connector bars 460 and 461 are undercut to form shoulders or heads on either end thereof, and the undercut portions fit snugly in notches formed in front cross pieces 470 and back cross pieces 471. The pieces 471 are mounted in horizontal alinement adjacent each other in undercut portions of the bars 462 and 463 and are retained in said undercut portions by transverse bent-over portions of side plates 472 and 473 secured respectively to the bars 462 and 463.

The front cross pieces 470 comprise an upper and a lower group, and the upper group of cross pieces is mounted in a spring-pushed frame composed of a back plate 474 and two transverse strips 475, (Fig. 31) said cross pieces 470 being secured between said back plates 474 and said transverse strips 475. The notches in the cross pieces 470 and 471, which support the connector bars 460, are maintained in alinement by means of guide pins 476 secured in the assembly consisting of the plate 474 and the transverse strips 475, said pins being adapted to fit loosely in holes in the side bars 462 and 463. Compressible springs 477 urge the plate 474 and parts secured thereto outwardly into contact with bent-over shoulders of the plates 472 and 473. The cross pieces 470 for the lower group of connector bars 461 are assembled in a spring-pushed framework 478 exactly like the framework 474 for the upper group of connector bars.

The punch selecting rack 439 for the clerk's bank (Figs. 32 and 34) cooperates with a series of connector bars 479 mounted in the framework 474 supporting the upper group of connector bars. The differential positioning of the gear 424 for the transaction bank is transmitted by means of gears on a #1 shaft to a rack positioning gear 480, which in turn meshes with and positions a punch selecting rack 481. The punch selecting rack 481 cooperates with connector bars 482 for the transaction bank, said bars being located in the upper group. The connector bars shown in Fig. 32 are arranged to cooperate with corresponding punches 483 (Figs. 28 and 30) to punch data set up on the keyboard in the record cards.

*Pence connector bars*

By referring to Figs. 7 and 8, it will be seen that in the present system the zeros are not punched when no key is depressed in a corresponding amount bank, and this is due to the fact that no connector bars are located in zero positions. However, in the pence column the zero position is used for ten pence and the position above zero position is used for eleven pence. In order to punch ten pence and at the same time provide clearance for the nose 452 (Figs. 32 and 33) of the pence punch selecting rack 449 when said rack is in zero position, an offset connector bar 495 has been provided, which is located in the uppermost position of the units row of shilling connector bars 460. The bar 495 has a bent-over ear 496 which is in the path of the zero or ten punch for the pence bank, and a bent-over ear 497 which cooperates with a nose 498 on the upper end of the pence punch selecting rack 449. When the pence punch selecting rack 449 is in the ten pence position, as shown in dot and dash lines in Fig. 33, the nose 452 is in the clear below the nine connector bar 460 and the nose 498 is disposed opposite the ear 497 of the connector bar 495; consequently the punch corresponding to the ten position of the rack 449 will be effective.

When the eleven key is depressed in the pence bank, the nose 498 is positioned opposite a connector bar 499 in the eleven pence position and upon operation of the punching mechanism renders the corresponding punch effective to punch a hole in the record card corresponding to the eleven pence key.

*Manipulative punch selecting devices*

In addition to the connector bars controlled by the keyboard there is also another series of connector bars controlled by manipulative devices for punching various data of a descriptive, explanatory or identifying nature in their respective fields in the record cards. The manipulative devices for setting up this various data include a month lever 484 (Figs. 25, 26B and 27), a units of days lever 485, a tens of days lever 486, a units department number lever 487, a tens department number lever 488, and a units, a tens, and a hundreds register number levers 489, 490 and 491. These settable levers are rotatably mounted on a shaft 492 journaled in the frames 393 and 395 and the upper ends of said levers, which form fingerpieces, protrude through corresponding slots in a cover plate 493 secured to cross pieces between the frames 393 and 395.

The settable levers are accessible through closures 494 and 500 of the drawer cabinet 84. The closure 500 is hinged on its right-hand side and the top edge thereof is overlapped by the lower edge of the closure 494, which is hinged at its top. A lock 501 (Figs. 14 and 26B), mounted on the closure 494, renders the compartment containing the settable levers and other mechanism of the machine accessible only to the person having the key to said lock. Secured on the shaft 492 is an On-and-Off lever 502, manipulation of which renders the punching mechanism operative or inoperative, and the upper end of this lever, which forms a fingerpiece, protrudes through a slot in the cover plate 493, the same as the other settable levers.

The settable levers are located and retained in their various positions by means of arcuate notches 503 in the periphery of segmental portions thereof in cooperation with studs 504 in a series of levers 505, loose on a rod 506 supported by the frames 393 and 395. Springs 507, connected between downward extensions of the levers 505 and a bracket secured to the frames 393 and 395, urge said levers 505 counter-clockwise to maintain the studs 504 in engagement with the notches 503. It is therefore evident that when the settable levers are positioned, their respective studs 504 ride in and out of the notches 503 therein and retain said levers in set positions. A lock 508 (Fig. 27) mounted on a cross-bar between the frames 393 and 395 and accessible through the closure 500, provides a means for locking the settable levers, with the exception of the date levers, against manipulation by unauthorized persons. The lock 508 controls the movement of a yoke 509, downwardly extending arms of which are loosely mounted on the rod 506. Turning the lock 508 to effective position moves the bail of the yoke 509 counter-clockwise into cooperative relationship with the levers 505 to lock the settable levers against manipulation, and returning said lock 508 to ineffective position releases the yoke 509, thus permitting manipulation of the settable levers. It will be noted, by observing Fig. 37, that the bail of the yoke 509 is notched to provide clearance for the levers 505 for the date levers 484, 485 and 486 so that these levers may be positioned irrespective of the lock 508. Obviously the bail of the yoke 509 may be notched as desired to obtain the desired control of the settable levers.

The date levers 484 and 485 (Figs. 25 and 27) have teeth in segmental portion 510 thereof, which mesh with gears 511 free on the rod 409. Said gears in turn mesh with corresponding double gears 512 (see also Fig. 34), which are mounted in the same assembly and are exactly like the amount gears 422 and 423, explained earlier herein. The internal teeth of the gears 512 are connected by shafts 12 and 13 and gears fast thereon to corresponding double gears 513, having external teeth which mesh with corresponding punch selecting racks 514, said gears 513 and racks 514 being mounted in the same assembly and in exactly the same manner as the amount gears 447 and amount punch selecting racks 449, explained earlier herein. The nose 452 on the punch selecting rack 514, for the month lever, cooperates with a row of connector bars 515 (Fig. 32) and the punch selecting rack 514 for the units of days lever cooperates with a row of connector bars 516, said connector bars being located in the upper group with the amount, the clerks' and the transaction keys connector bars.

Tens of days lever

The tens of days lever 486 (Figs. 25 and 27) has a stud 517 in a rearward extension thereof, which extends through an irregular camming slot 518 in a lever 519 loose on the rod 409. The lever 519 has teeth in a segmental portion thereof which mesh with the outer teeth of an internal gear 520, connected by a square shaft 14 (Figs. 32 and 34) and gears thereon to a corresponding internal gear 521, which drives a punch selecting rack 522 the nose 452 of which cooperates with two connector bars 523 in the same row as the units of days connector bars 516.

By referring to Figs. 25, 27 and 37 to 41 inclusive, it will be seen that the tens of days lever 486 has four positions, namely, a blank position and 10, 20 and 30 day positions, and by means of the cam 519 the gear 520 (Figs. 34 and 36) and the gear 521 positions the punch selecting rack 522 in proportion to the position of said lever 486. When the lever 486 is in its lower or blank position, as shown in Fig. 27, the punch selecting rack 522 is positioned as shown in Fig. 38 so that the nose 452 thereof is in a blank position above the connector bars 523, which, it will be recalled, are in the same row as the units of days connector bars 516. When the lever 486 is in ten day position the punch selecting rack 522 is positioned as shown in Fig. 39, so that the nose 452 is opposite the upper connector bar 523 to select the ten day punch. When the lever 486 is in 20 day position the punch selecting rack 522 is positioned as shown in Fig. 40 so that the nose 452 is opposite the lower connector bar 523 to select the 20 day punch. When the lever 486 is in 30 day position the punch selecting rack 522 is positioned as shown in Fig. 41 so that the nose 452 will engage both the upper and the lower connector bars 523 to cause both the ten and twenty day punches to function to punch two holes corresponding thereto in the record card, which is later interpreted as thirty days. The punch selecting rack 522 is mounted adjacent the units of days punch selecting rack 514 and the nose 452 of said rack 522 is offset so that it is in alinement with the connector bars 523, which, as previously stated, are in the same row as the connector bars 516 for the units of days.

The settable levers 489, 490 and 491 (Figs. 25, 27 and 34) for the units, tens and hundreds register number have segmental portions thereon, similar to the month lever 484, having teeth therein which mesh with gears, similar to the gears 511 on the rod 409, and said gears in turn mesh with and drive corresponding double gears 524 on the right-hand end of the rod 426. The internal teeth of the units register number gear 524 (Figs. 34 and 35) mesh with and drive an idler gear 525, loose on the shaft 9, which meshes with a similar gear 526 fast on the units register number shaft 20. Also fast on the shaft 20 is a gear 527 which meshes with an idler gear 528 free on the shaft 9, which idler gear 528 in turn meshes with the internal teeth of a units register number gear 529 free on the left end of the rod 426. The gear 529 meshes with a units register number punch selecting rack 530 and, through the medium of the gearing described above, positions said rack in proportion to the position of the units register number lever 489. From the foregoing description it is clear that in order to transmit power through the shafts 15, 17, 18, 20 and 21, of the inner circle (Figs. 34 and 35), it is necessary to use idler gears loose on the shafts of the external circle, which idler gears mesh with corresponding double gears.

The tens and hundreds register number gears 524, through the medium of corresponding idler gears and gears fixed on their respective shafts 21 and 15, drive the tens and hundreds register number gears 529, which in turn position the corresponding punch selecting racks 530 in proportion to the positions of the corresponding register number levers. The noses 452 on the punch selecting racks 530 (Figs. 30 and 32) cooperate with corresponding rows of connector bars 531 in the upper group, which, in cooperation with corresponding rows of the punches 483, cause the register number to be punched in the record cards.

The units and the tens department number levers 487 and 488 (Figs. 25 and 27) are connected to and position their corresponding double gears 532 (Fig. 34) in the same manner as the month lever 484, explained earlier herein. The gears 532, through the medium of idler gears on the shafts 5 and 3, in cooperation with fixed gears on shafts 19 and 17, position corresponding double gears 533. The external teeth of the gears 533 mesh with and position corresponding punch selecting racks 534 in proportion to the position of the department number levers and said racks in cooperation with corresponding rows of connector bars 540 (Figs. 30 and 32) select the proper punches 483 to punch the department number in the record card.

Mounting of punches

Referring to Figs. 28, 30 and 32, each of the connector bars of the upper and lower groups has a corresponding punch 483 and said punches are mounted in relation to said connector bars by means of a fixed guide plate 541 secured to the frame 431, and movable guide plates 542 and 543, mounted on a die support plate 544 having secured thereto two guide pins 545 slidable in holes in the frame 431. The punches 483 fit freely in holes in the guide plates 541, 542 and 543, and are retained in proper position by means of undercut portions thereof in cooperation with wires 546 and 547 secured respectively to the guide plates 541 and 542 by retaining clips 548. The right-hand end of the punches 483 are in alinement with corresponding holes in a die plate 549 integral with the guide plate 543 and spaced therefrom by strips 550 to form an aperture or throat 551 into which the record cards are fed, preparatory to punching.

After the punch selecting racks have been positioned, the punch and die unit, including the plates 542, 543, 544 and 549, is moved rearwardly or toward the left, as viewed in Fig. 30, against the action of compressible springs 552 coiled around the guide pins 545, by mechanism presently to be described. As the punch and die assembly moves rearwardly, the wires 547 move in unison therewith to free the punches, and the record card inserted in the throat 551 engages the ends of the punches 483 and carries said punches in unison with the die assembly.

Before the punches 483 are moved into contact with the forward ends of the connector bars in the framework 462 and 463 (Figs. 30 and 32), parallel bars 553 and 554 secured to the plate 544 simultaneously engage the cross pieces 475 of the pressure plate assembly for the group of connector bars in alinement with the punches, and carry said pressure plate in unison with the die assembly to free the connector bars for rearward movement in unison with the punches 483. Continued movement of the punch and die assembly causes the ends of the punches to engage the connector bars and carry said connector bars rearwardly in unison therewith until the noses 452 on the punch selecting racks interrupt the rearward movement of the connector bars corresponding to the position of said racks, which in turn interrupt the rearward movement of the punches corresponding to the position of the racks, and continued movement rearwardly of the punch and die assembly forces the punches, which have thus been stopped, through the record card contained in the throat 551 to punch the data relating to the transaction in said record card. The mechanism that moves the punch and die assembly rearwardly to punch the record card will now be described.

Directing attention to Figs. 26B, 30 and 37, the guide pins 545 have teeth cut in the lower surfaces thereof which mesh with partial gears 555, rotatably supported in apertures in the frame 431. The gears 555 in turn mesh with gear sectors 556 and 557 secured on a shaft 558 journaled in downwardly extending ears of the frame 431. An extension of the sector 557 carries an adjustable eccentric stud 1558 embraced by the bifurcated downward extension of a lever 559 loose on a stud 560 secured in the frame 394. Angular extensions of the lever 559 carry respectively rollers 561 and 563, which cooperate respectively with the peripheries of plate cams 564 and 565 secured on corresponding shafts 566 and 567 journaled in the frames 393 and 394. The shaft 567 and the cam 565 (space 3, Fig. 6) operate the punching mechanism in member's number operations and the shaft 566 and cam 564 (space C, Fig. 6) operate the punching mechanism in all other operations of the machine, as will be described later.

The shafts 566 and 567 never work in unison. When one rotates the other is stationary, and vice versa, and said shafts perform respectively one counter-clockwise and one clockwise rotation during adding operations. Rotation of the cams 564 and 565, in cooperation with their respective rollers 561 and 563, rock the lever 559 (Fig. 26B) counter-clockwise to rock the sector 557, the shaft 558 and the sector 556 clockwise. Clockwise movement of the sectors 556 and 557, by means of their associated partial gears 555 in cooperation with the teeth in the guide pins 545, shifts the punch and die assembly rearwardly against the action of the springs 552 to perforate the card in the manner explained above.

Card feeding and ejecting mechanism

When the record card is fed into the throat 551 (Figs. 42 and 49) between the plates 543 and 549, it is stopped in relation to the punches by two stop bars 568 which fit snugly in slotted openings in the plates 544, 543 and 549. The rearward ends of the stop bars 568 have openings therein through which extend similar prongs formed on the bail of a yoke 569 secured on a shaft 570 journaled in the frames 394 and 395. Fast on the right-hand end of the shaft 570 is an arm 571 having pivotally connected thereto the lower end of a pitman 572, the upper end of which is bifurcated to straddle a collar on the shaft 566. The pitman 572 (Fig. 43) carries a roller 573 which is maintained in contact with the periphery of a plate cam 574, fast on the shaft 566, by a spring 575, one end of which is connected to an extension of the arm 571. After the card has been punched and while the punch and die assembly is being returned to card feeding and ejecting position, the node on the cam 574 engages the roller 573 and shifts the pitman 572 downwardly to rock the shaft 570 and the yoke 569 rearwardly to move the stop bars 568 in unison therewith to a position where they will not obstruct the throat 551, so that the punched card may be ejected therefrom.

The card feeding and ejecting mechanism includes two sets of pressure rollers 576 and 577 (Figs. 26B, 42, 46, 48, 55 and 56) pivotally mounted on arms, in turn pivoted to bent-over ears on brackets 578 secured to the plate 544. A spring 579, tensioned between extensions of the arms that support the rollers 576 and 577, urges said rollers forwardly so that when the punch and die assembly is in feeding position, said rollers yieldingly engage corresponding feed rollers 580 and 581, mounted respectively on shafts 582 and 583 journaled in the frames 394 and 395.

Figure 16:
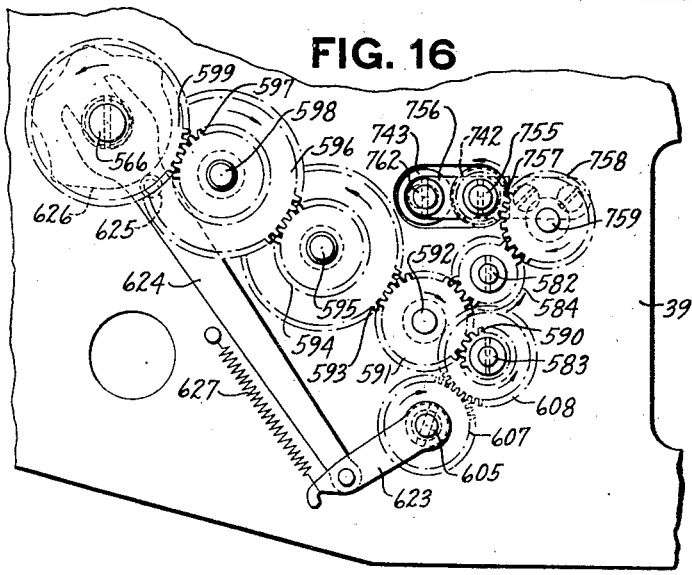
Fig. 16 is a detail view of the gears that drive the card feeding and ejecting mechanism for the card punching device.

Referring to Figs. 16, 37 and 46, the shafts 582 and 583 have secured thereon, respectively, gears 584 and 590, both of which mesh with a gear 591 loose on a stud 592 secured in the frame 394. The gear 591 meshes with a gear 593, integral with a gear 594, both of said gears being pivoted on a stud 595 in the frame 394. The gear 594 meshes with a gear 596 having secured thereto a gear 597, both of said gears being rotatably supported by a stationary stud 598 in the frame 394, and the gear 597 meshes with a gear 599 secured on the shaft 566. As previously explained, in adding operations and in List Reset operations, the shaft 566 makes one revolution, and through the train of gears just described rotates the card feeding shafts 582 and 583.

An ejector roller and its associated pressure roller are provided to assist the four sets of rollers just described in ejecting and stacking the punched cards. Secured on the die plate 549 (Figs. 26B, 42 and 46) is a bracket 600 which rotatably supports a yoke 601, having pivotally mounted between the arms thereof a pressure roller 602. A spring 603 urges the yoke 601 and the roller 602 clockwise to normally maintain said roller in yielding engagement with an ejector roller 604 rotatable on a shaft 605 journaled in the frames 394 and 395. The ejector roller 604 is clutched to a sleeve 606 loose on the shaft 605 and said sleeve has secured to the left end thereof a gear 607 meshing with a gear 608 secured on the shaft 583, through the medium of which the ejector roller 604 is rotated in a clockwise direction.

The cam 564 (Fig. 26B and spaces C and D Fig. 6) which operates the punching mechanism, has three camming surfaces, namely, a punching surface, a feeding surface, and a non-feeding surface. After the record card has been punched, the feeding surface of the cam 564 comes into play and moves the punch and die assembly forwardly full distance to cause the pressure rollers 576 and 577 (Figs. 42, 43 and 46) to grip the record card between said rollers and the feed rollers 580 and 581. During the movement of the punch and die assembly to feeding position, the cam 574 rocks the pitman 572 downwardly to shift the stop bars 568 rearwardly out of the path of the record card, whereupon rotation of the rollers 580 and 581 ejects the punched record card downwardly into engagement with the ejector rollers 602 and 604, which continue to eject the record card downwardly after it has moved beyond the feed rollers 577 and 581 and stacks said cards in a receiving tray 609.

Card receiving tray

The tray 609 is slidably mounted by means of flanged ways on either side thereof (Figs 42, 46 and 53) in cooperation with inclined rails 610 and 611 integral with similar brackets 612 secured to the cross bars 396 and 397. The tray 609 is available through the closure 569 (see also Fig. 26B) and may be slid forwardly, when said closure is opened, to a more accessible position for removing the punched record cards. The extent of forward movement of the tray 609 is determined by a stud 613 in the right side thereof in cooperation with a depending bracket 614 secured to the rail 611, and said tray 609 is located in its rearward card receiving position by bent-over edges 615 on the forward end of said tray 609 in cooperation with the forward ends of the rails 610 and 611.

As the cards are ejected from the punching mechanism, they are stacked in sequential order, one in back of the other, in the tray 609 between a bent-up back piece 635 of said tray and a slidable weight 616 similar to a book-end, and having a tongue 617 which fits loosely in a slot 618 in the bottom of the tray 609 (Figs. 42, 53 and 54), said tongue 617 being retained in said slot by a large headed screw 620 threaded in the weight 616. As the punched cards are ejected into the tray, the weight 616 is pushed forwardly. The inclination of the tray 609, combined with the friction between the different parts, provides sufficient resistance against forward movement of the weight 616 to cause the punched cards to be stacked correctly in the tray 609.

A card pushing or vibrating mechanism is provided to assist in properly stacking the ejected record cards in the tray 609. This mechanism includes a combined guide and vibrator plate 621 (Figs. 42 and 46) secured to similar arms 622 fast on the shaft 605. Secured on the left-hand end of the shaft 605 (Figs. 16 and 46) is an arm 623, having connected thereto a pitman 624, the upper end of which is bifurcated to straddle a collar on the shaft 566. The pitman 624 carries a roller 625 maintained in contact with the periphery of a plate cam 626, fast on the shaft 566, by a spring 627, one end of which is connected to an extension of the arm 623. The cam 626 has a series of nodes thereon which in cooperation with the roller 625 imparts a series of oscillations or vibrations to the plate 621, initial movement of said plate 621 being in a counter-clockwise direction, as viewed in Fig. 42. This oscillation of the plate 621 tends to move the previously ejected record cards and the weight 616, up the inclined bottom of the tray 609, to provide room at the back of the stack for the next card to be ejected. This oscillating movement of the guide plate 621 also agitates or jiggles the cards at the back of the stack to insure that they stack properly in the tray 609. After the bottom edge of the card being ejected is guided by the plate 621 beyond the top edge of the last card in the tray 609, said plate 621 is rocked clockwise to release the pressure on the cards stacked in the tray, to facilitate the entrance of the card being ejected into the tray. By referring to Fig. 46 it will be observed that the guide plate 621 is cut away at the top to clear the ejecting roller 604, and said plate is also cut away at the bottom to clear the back piece 635 of the tray 609.

Control of the operation of the machine by the card receiving mechanism

Referring to Fig. 9, it will be recalled that depressing the starting bar 87 releases the key lock shaft 99 to the action of the spring 100, which immediately rocks said shaft counter-clockwise, to render the clutch mechanism effective and close the circuit to the operating motor. This counter-clockwise movement of the shaft 99 causes an arm 628 (Fig. 26A) secured thereon in cooperation with a link 629, connected between said arm and an arm 630 loose on a shaft 631, journaled in the frame 81 and the printer frame, to rock said arm 630 counter-clockwise in unison with said shaft 99. Counter-clockwise movement of the arm 630 withdraws an arcuate surface 632 thereon from beneath a stud 633 in a switch arm 634 loose on the shaft 218 and releases said switch arm to the action of a spring 640 which immediately rocks said arm counter-clockwise. Counter-clockwise movement of the arm 634 disengages a nose 641 thereof from a shoulder on a clutch control disc 642, forming a part of the clutch assembly which is rotatably supported by a stationary stud 643. Withdrawing the nose 641 from the shoulder of the disc 642 releases said disc to the action of a tensioned torsion spring (not shown), which rotates a disc 644 integral therewith, counter-clockwise.

Counter-clockwise rotation of the disc 644 moves a recess in the periphery thereof out of the path of a roller 645 on an arm of a yoke 646 loose on a shaft 647, journaled in the printer framework, causing said periphery to rock said yoke 646 counter-clockwise. Counter-clockwise movement of the yoke 646, by means of a link 648, connecting an arm of said yoke to an arm 649 loose on a fixed stud 650, rocks said arm 649 clockwise. A compressible spring 651 connects the arm 649 to a switch operating lever 652, also loose on the stud 650, so that clockwise movement of the arm 649 is transmitted to the switch operating lever 652, causing said lever to close the switch, to start the motor. Counter-clockwise movement of the disc 642, when the nose 641 is disengaged therefrom, renders the clutch mechanism effective and connects the motor to the machine operating mechanism.

Near the end of a machine operation, the lever 634 is restored clockwise, by mechanism not here shown but well known in the art, which causes the nose 641 thereof to engage the shoulder of the disc 642 to disengage the clutch mechanism and stop the disc 644 so that the recess in the periphery of the disc 644 is opposite the roller 645 to permit the spring blades of the switch 135, which are tensioned upwardly, to break the circuit to the electric motor, to stop operation thereof. Before the mechanism that returns the lever 634 clockwise by-passes said lever, restoration of the key lock shaft 99, by the mechanism shown in Fig. 9, moves the arcuate surface 632 of the arm 630 into the path of the stud 633 to retain the lever 634 in its clockwise position, as here shown.

Mechanism associated with the switch operating lever 652 (Figs. 26A, 50 and 53) is provided to prevent operation of the machine when the card receiving tray 609 is filled with cards. The switch operating lever 652 is connected by a link 653 to one arm of a lever 654 loose on a hub 655 in the frame 395 said hub forming a bearing for one end of the shaft 582. A forward arm of the lever 654 carries a stud 656 which is embraced by a slot in a bent-over ear of a slide 657 shiftably mounted on a bracket 659 by means of parallel slots therein in cooperation with studs 658 in a bent-over portion of a bracket 659 secured to the frame 395. Clockwise movement of the lever 652 to close the switch 135, by means of the connections just described, moves the slide 657 upwardly in unison therewith, and it is readily seen that any obstruction placed in the path of said slide 657, to prevent this upward movement, would also block clockwise movement of the lever 652, thus preventing closing of the switch 135 and thereby forestalling operation of the machine.

As the tray 609 (Figs. 50 and 53) is filled with cards, the weight 616 is forced toward the right, as viewed in Fig. 53, causing a stud 660 carried thereby, in cooperation with a camming surface 661 on a lever 662 free on a stud 663 in the frame 395, to rock said lever 662 clockwise. Clockwise movement of the lever 662, through a slotted upward extension thereof in cooperation with a stud 664 in a lever 665 loose on a stud 666 in the bracket 659, rocks said lever 665 counter-clockwise contrary to the action of a spring 667. Counter-clockwise movement of the lever 665 disengages a bent-over projection 668 thereof from a shoulder on a plunger 669, slidable in alined holes in the bent-over portion of the bracket 659 and a stud 670 secured in the frame 395 (see also Fig. 54).

When the plunger 669 is thus released, a compressible spring 671, encircling said plunger and confined between the bent-over portion of the bracket 659 and a collar secured on said plunger, shifts said plunger 669 rearwardly. Rearward movement of the plunger 669 causes a downward portion 672 of a block 673, integral therewith, to move over a block 674 secured to a left-hand extension of the slide 657. A guide pin 675 secured in the block 673 slides freely in a hole in the bent-over portion of the bracket 659 and maintains the portion 672 of said block in proper alinement with the block 674 and also maintains the locking shoulder on the plunger 669 in proper relation with the projection 668. When the block 673 moves into the path of the block 674, movement of the slide 657 and the lever 652 is obstructed. Therefore the switch 135 will not be closed upon depression of the starting bar and operation of the machine is thus prevented.

Before the machine will operate it is necessary to remove the punched cards from the tray 609 and return said tray and the weight 616 to their extreme left-hand positions, as shown in Fig. 53. Returning the weight 616 to its extreme left-hand position causes the stud 660, in cooperation with an extension 676 of a yoke 677 loose on a stud 678 in the frame 395, to rock said yoke clockwise. Clockwise movement of the yoke 677, by means of an upward extension 679 thereof, pushes the plunger 669 forwardly to disengage the block 673 from the block 674 and to reengage the locking shoulder on said plunger with the projection 668 of the lever 665. When the block 673 is thus moved out of the path of the block 674, the spring 651 immediately rocks the lever 652 clockwise to close the switch 135 to cause the machine to operate.

A spring 680 (Fig. 52), connected between the slide 657 and the frame 395, assists the spring blades of the switch 135 in returning the lever 652 and the slide 657 to normal positions, as shown in Fig. 50, at the end of a machine operation. A stud 682 in the bracket 659 (Fig. 53) in cooperation with the lever 665 limits the movement of said lever under influence of the spring 667 to maintain the projection 668 in proper relation to the plunger 669 and to maintain the camming surface 661 on the lever 662 in proper relation to the stud 660. An extension 683 of the yoke 677, in cooperation with the stud 670, maintains the extension 676 of said yoke in the path of the stud 660 and limits the rearward movement of the plunger 669.

*Card feeler mechanism*

If for any reason a new card is not fed into the throat 551 (Fig. 50) during an operation in which a new card should be fed into said throat, a card feeler device prevents the switch 135 from closing and thereby prevents operation of the machine, thus calling the operator's attention to this fact so that the condition may be remedied. Among the things that cause failure of a new card to be fed into the throat 551 are: emptying of the card supply magazine, failure of the card feeding mechanism, jamming of a card in the throat 551, etc.

After the trouble has been ascertained and remedied it is necessary to perform a blank machine operation in order to feed a new card into the throat 551, as this feeding takes place at the end of an operation instead of the usual practice of feeding said card at the beginning of an operation. Depression of the starting bar 87 (Fig.

9) and consequent releasing of the key lock shaft 99 makes it impossible to recall the operation already initiated, whether the switch 135 closes or not. Therefore it is necessary to carry through this operation without the punching of a record card, and the general practice is for the operator to make a note of this fact so that a record card for this transaction may be later punched by hand. A manipulative device is provided for closing the switch 135 to cause the operation of the machine to be completed after the feeler mechanism has obstructed such closing of said switch.

It will be recalled that the shaft 566 (Fig. 50) makes one counter-clockwise revolution in all operations in which a punched card is issued. Rotation of the shaft 566 causes a caming groove 684 in a cam 690, secured thereon, in cooperation with a roller 691 on a lever 692 fulcrumed on a stud 693 in the frame 395, to rock said lever 692 clockwise near the end of a machine operation and then back to normal position, space J Fig. 6. Clockwise movement of the lever 692 causes a bifurcated forward extension thereof, in cooperation with a stud 694 in an arm 695 loose on a stud 696 in the frame 395 (Figs. 50, 52 and 54) to rock said arm 695 counter-clockwise. Counter-clockwise movement of the arm 695, by means of a downward extension thereof in cooperation with a stud 697 in a yoke 698 fulcrumed on the stud 696, rocks said yoke counter-clockwise to move a rearward extension 699 thereof beneath a bent-over ear 700 of an angle bar secured to the die plate 549.

A bent-over portion 701 of a downward extension of the yoke 698 is slotted to straddle a reduced portion of a feeler pin 702 slidable in holes in the bent-over portion of the bracket 659 and the stud 670. The rearward end of the pin 702 is adapted to slide freely in alined openings in the plates 543 and 549. When the yoke 698 is rocked counter-clockwise, the extension 701 in cooperation with a collar 703, integral with the pin 702, shifts said pin forwardly against the action of a spring 704, encircling said pin 702 and confined between the bent-over portion of the bracket 659 and the collar 703, to move the rearward end of the feeler 702 out of the throat 551.

While the lever 692 and the arm 695 are dwelling in their clockwise and counter-clockwise positions, respectively, the die assembly, including the plates 543 and 549, are returned from punching position to feeding position, as shown in Fig. 52, see also space C Fig. 6. This moves the projection 700 over the extension 699 of the yoke 698 to obstruct clockwise movement of said yoke when the cam 690 (Fig. 50) returns the lever 692 and the arm 695 to normal position, as here shown. Obstructing the clockwise movement of the yoke 698 causes the extension 701 thereof, in cooperation with the collar 703, to hold the feeler pin 702 in ineffective position, to prevent it from interfering with the ejecting and feeding of the record cards.

After the punched card has been ejected from the throat 551 and a new card has been fed therein, the die assembly, including the plates 543 and 549, is moved to a neutral position, as indicated by dot and dash lines in Fig. 52, which moves the projection 700 out of engagement with the extension 699 to release the yoke 698 and the feeler 702 to the action of a spring 704, which immediately moves said feeler rearwardly to feel the throat 551 for the presence of a record card. If, through failure of the feeding mechanism to function properly, or some other cause, a new card is not carried into the throat 551, rearward movement of the feeler 702 is unobstructed and such movement carries a projection 705 of a block 706, secured on the right-hand end of said feeler 702, into the path of the block 674 to obstruct upward movement of the slide 657 and clockwise movement of the lever 652 (Fig. 50) when an attempt is made to operate the machine.

The block 706 carries a guide pin 707 which slides freely in a hole in the bent-over portion of the bracket 659 to maintain the projection 705 of said block in proper alinement with the block 674. The presence of a card in the throat 551 (Fig. 52) obstructs rearward movement of the feeler 702 and holds the projection 705 of the block 706 out of the path of the block 674 where it will not interfere with operation of the machine.

If the feeler mechanism has disabled the switch 135 the operator will be notified of this fact when an attempt is made to operate the machine, and in such a case the operator usually makes a note to the effect that no card will be issued for this particular transaction, so that a card may be made for said transaction later in some other way. After the starting bar has been depressed, it is impossible to recall or cancel this operation, and in order to complete said operation, the operator pulls a switch release bar 707 (Figs. 50 and 54), mounted in parallel slots in the bent-over ends of the bracket 659 and available after unlocking the closure 500, causing a horizontal slot in the rearward end of said bar, in cooperation with the stud 697 in the downward extension of the yoke 698, to rock said yoke counter-clockwise. Counter-clockwise movement of the yoke 698 shifts the feeler pin 702 forwardly to move the block 706 out of the path of the block 674 to permit the switch mechanism to operate, whereupon operation of the machine is completed. When the bar 707 is released, a spring 708 returns said bar rearwardly to normal position, as shown in Fig. 50, and during operation of the machine the feeler 702 again feels for the presence of a card in the throat 551.

Shown in Figs. 14, 25 and 51 is the On-and-Off lever 502 which is provided for enabling or disabling the card-punching mechanism. In Fig. 14 this lever is shown in "on" position, and as said lever is secured on the shaft 492, moving said lever clockwise to "off" position rocks an arm 709 secured on the shaft 492 in unison therewith to move a raised surface on said arm into the path of a nose 710 on the yoke 698. This obstructs clockwise movement of the yoke 698 and prevents the feeler 702 from disabling the switch 135 when no card is in the throat 551 and the lever 502 is in "off" position.

*Card supply magazine*

A supply magazine 711 (Figs. 26B, 37 and 42) for the record cards has a framework, the sides and bottom of which form a receptacle for the blank record cards. The supply magazine 711 has flared side plates 712 and a flared top plate 713 which guide the record cards to the blade 714 of a picker device, which is also supported by the frame of the supply magazine 711. The cards are advanced through the guide plates 712 and 713 to the picker blade 714 by a spring-pushed pressure plate 715, having fixed thereto a rod 716, opposite ends of which extend through slots in tubular side members 717 and 718, mounted between the plates 712 and brackets secured to the forward end of the magazine, and said ends of the rod 716 fit loosely in holes in bearings 719, loose in the tubes 717 and 718. Compressible springs 720, confined between the bearings 719 and screw plugs in the ends of the tubes 717 and 718, urge the pressure plate 715 rearwardly to advance the record cards to the picker blade 714. A bail 721 connected to the pressure plate 715 provides means for pulling said plate forwardly and holding said plate against the action of the springs 720, when it is desired to insert new cards in the magazine 711.

The supply magazine 711 is accessible through the closure 500, and when said closure is opened, said magazine may be slid forwardly to a more accessible position for inserting new cards. The magazine 711 is slidably mounted by means of horizontal trunnions 722 thereon (Figs. 26B, 37, 42 and 47), in cooperation with horizontal slots 723 in plates 724 secured to the frames 394 and 395. The magazine 711 is locked in feeding position by means of spring-pushed pins 725, in cooperation with corresponding holes in the frames 394 and 395. The pins 725 are connected to respective companion pinch levers 726 pivotally mounted between a plate 727 and the frame of the magazine 711. A spring 728 tensioned between extensions of companion levers 726 urges the pins 725, which are slidably mounted in holes in the frame of the magazine 711, into their respective locking holes in the frames 394 and 395. The pins 725 are guided into their respective locking holes by notches 729 in the plates 724.

To move the supply magazine 711 from feeding position, in which it is shown in Fig. 42, to loading position, it is necessary to compress the companion levers 726 to remove the pins 725 from their respective holes in the frames 394 and 395, whereupon the magazine 711 may be moved forwardly through the closure 500 to loading position, which position is determined by the forward trunnions 722 contacting the forward ends of the slots 723. The magazine 711 may be easily removed from the machine for repair or adjustment by moving said magazine forwardly from feeding position to a position where the trunnions 722 are in alinement with an opening in the forward ends of the slots 723 in the plates 724, whereupon said magazine may be tilted upwardly and slid forwardly until disengaged from the plates 724.

The picker blade 714 (Figs. 37, 42 and 44) is adjustably mounted upon an angular surface on the top of a cross-head 730 mounted for vertical sliding movement upon two guide pins 731 secured in the framework of the magazine 711. Protruding from opposite sides of the cross-head 730 are trunnions 732 embraced respectively by the bifurcated forward extensions of levers 733 and 734 pivoted on stationary studs 735 in the frames 394 and 395. Each of the levers 733 and 734 has mounted thereon rollers 736 and 737 which cooperate respectively with the peripheries of companion plate cams 738 and 739 secured on the shaft 566. Counter-clockwise rotation of the shaft 566 and the cams 738 and 739 (space G, Fig. 6) causes said cams, nears the end of a machine operation, to rock the levers 733 and 734 clockwise to shift the cross-head 730 and the picker blade 714 downwardly. Downward movement of the picker blade picks the first card out of the magazine and forces said card downwardly through a restricted aperture, wide enough to admit only one card at a time and formed by a block 740 (Fig. 45) and an adjustable rail 741, both of which are secured to the framework of the magazine 711.

The picker blade 714 carries the card 1551 between feed rollers 742 and 743, which revolve in opposite directions and feed the record card into the throat 551 and into engagement with the upper set of feed rollers 580 and their corresponding pressure rollers 576, which, in cooperation with their associated feed rollers 581 and pressure rollers 577, carry the card downwardly into contact with the stop bars 568, while the punched card is being deposited in the tray 609 (space E, Fig. 6). It will be understood that when the card is being fed into the punching mechanism by the picker blade 714 and the feed rollers, the throat 551 is in alinement with the rollers 742 and 743 and the pressure rollers 576 and 577 are in yielding contact with their respective feed rollers 580 and 581.

After the new card has been fed into contact with the stop bars 568, the die assembly, including the plates 543 and 549, is moved from feeding position to normal position, as shown in Fig. 42. This separates the pressure rollers 576 and 577 from their respective feed rollers and causes said rollers to resiliently hold the new card against the plate 549 (Fig. 48) to retain said card in proper location in the throat 551 (see spaces C and D, Fig. 6).

Sometimes due to unequal pressure and friction the cards may become cocked, as they are advanced through the aperture, formed by the block 740 (Fig. 44) and the rail 741, by the picker blade 714. In order to overcome this difficulty, spring-pushed fingers 744 and 745 (Figs. 44 and 45) are pivoted on pins supported by a plate 746 secured to the framework of the supply magazine 711. The fingers 744 and 745 are urged upwardly by torsion springs 747 into contact with corresponding projections of the bottom plate 748 of the supply magazine 711, and the spring pressure thereon retains the first few cards in the magazine in proper alinement with the card feeding mechanism. As the picker blade 714 moves downwardly, downward extensions of a back plate 749 secured to the cross-head 730, engage the fingers 744 and 745 and push said fingers downwardly out of the path of the card being advanced from the supply magazine to the feed rolls. The fingers 744 and 745 (Figs. 42, 44 and 45), in cooperation with the extensions of the plate 749, also retain the trunnions 732 in alinement with the bifurcated extensions of the levers 733 and 734 (see also Fig. 37) when the supply magazine 711 is shifted forwardly to loading position or removed from the machine, so that said trunnions 732 will readily engage their corresponding levers when the magazine is returned to feeding position.

Figure 17:
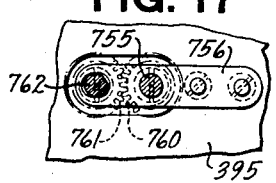
Fig. 17 is a detail view of the gears and shafts that drive one set of record card feed rolls.

The feed roller 742 (Figs. 16, 17, 42 and 46) is integral with a shaft 755, opposite ends of which are journaled in identical bearing blocks 756 secured to the frames 394 and 395. Fast on the left-hand end of the shaft 755 is a gear 757 which meshes with a gear 758, rotatable on a stationary stud 759 in the frame 394, and said gear 758 meshes with the gear 584, which it will be recalled drives the shaft 582 for the upper set of feed rollers 580. Fast on the right-hand end of the shaft 755 is a gear 760, which meshes with a similar gear 761, secured on the right-hand end of a shaft 762 journaled in horizontal slots in the bearing blocks 756, and said shaft has integral therewith the feed roller 743. The roller 743 (Figs. 26B, 37 and 42) is urged into yielding engagement with its associated roller 742 by spring-pushed plungers 763, the heads of which form half-round bearings for the shaft 762 and the tenons of which fit freely in holes in the frame 431. Compressible springs 764, for the plungers 763, are assembled in the holes for said plungers and are confined between the ends of the tenons of said plungers 763 and screw plugs 765 threaded in the holes for said tenons. The screw plugs 765 provide means for adjusting the pressure of the roller 743 to cause the cards to be properly fed into the throat 551. The gears shown in Figs. 16 and 17, and described above, rotate the feed rollers 742 and 743 counter-clockwise and clockwise, respectively, to feed the record cards, advanced there between by the picker mechanism, into the throat 551.

The slugs that are punched from the record cards are guided by a chute 766 (Figs. 26B, 28 and 30) secured to the die plates 549, into a receiving tray 767 which fits in a pocket formed by the frame 394, the bracket 612 which supports the left-hand side of the tray 609, and a plate 768 secured to the cross-bars 396 and 397. Like the supply magazine 711 and the receiving tray 609 for the record cards, the slug tray 767 is accessible through the closure 500 and may readily be removed for emptying by means of a curved fingerpiece 769 on the forward end thereof.

*Driving mechanism for the punching device*

It will be recalled by referring to Figs. 26B and 37 that the punching device is operated and controlled by a main shaft 566 and an auxiliary shaft 567 journaled in the frames 393 and 394. Secured on the shaft 566 (Figs. 9, 11, 13, 14 and 37) is a clutch disc 770, a segmental portion of which cooperates with clutch dogs 771 and 772 pivoted on studs secured in a gear 773 loose on the shaft 566. A spring 774 tensioned between the dogs 771 and 772 urges said dogs toward each other into engagement with the segmental portion of the disc 770. The gear 773 meshes with a gear 775, mounted on a stationary stud 776 in the frame 393, and the gear 775 in turn meshes with the gear 356, which, it will be recalled, is secured to the main drive shaft 107 for the machine proper.

It will also be recalled that the shaft 107 is driven one counter-clockwise rotation during adding operations and two counter-clockwise rotations in total and sub-total recording operations. The gear 773 also meshes with a gear 777 fixed to a sleeve 778 loose on the shaft 567 and it is therefore obvious that the gear 773, the gear 777 and the sleeve 778 are driven respectively one counter-clockwise and one clockwise rotation in adding operations and two such rotations in total and sub-total operations. The clutch dogs 771 and 772 in cooperation with the clutch disc 770 control the rotation of the shaft 566 in a manner presently to be described.

Pivotally mounted on the same studs that support the dogs 771 and 772 (Figs. 11 and 14) are clutch dogs 779 and 780 urged toward each other by a spring 781 into engagement with a segmental portion of a clutch disc 782 integral with a gear 783 loose on the shaft 566 and meshing with a gear 784 secured on the shaft 567. From the foregoing description it is evident that the drive of the shaft 567 is controlled by the dogs 779 and 780, in cooperation with the clutch disc 782.

A foot-shaped extension 783 (Figs. 11, 12, 13 and 14) of the dog 772 cooperates with control pawls 791, 792 and 793, and a foot-shaped extension 794 of the dog 780 cooperates with control pawls 795 and 796, all of said pawls being fulcrumed on a stud 797 secured in the frame 393. Normally the pawl 796 is in the path of the extension 794 of the dog 780, whereupon rotation of the gear 773 causes said dog to be disengaged from the segmental portion of the disc 782 to disable the drive of the shaft 567. Normally the pawls 791, 792 and 793 are out of the path of the extension 793 of the dog 772 and consequently during normal operation of the machine the shaft 566 is driven by the gear 773, and as this shaft controls the feeding, the punching and the ejecting of the record cards, it is apparent that a punched record card will be issued during such normal operations (see spaces K and L Fig. 6).

It will be remembered that the amount keys are used to set up the member's number which is punched in the record card during a member's number operation, and as the amount and other data are to be punched in the same card in a subsequent operation, it is necessary to disable the drive of the shaft 566 so that the record card will be retained in the punching unit until the subsequent operation. It is also necessary, during member's number operations, to render the shaft 567 operative so that the member's number connector bars 491 (Fig. 32) will be moved into cooperative relationship with the punch selecting racks, and so that the punching mechanism will function.

It will be recalled by referring to Figs. 11 and 24 that depressing the Member's Number key 203 shifts the control plate 336 and the link 322, connected thereto by the stud 338, forwardly. Forward movement of the link 322 rocks the arms 325 and 326 clockwise, causing a stud 798 in a downward extension 799 of said arm 326, in cooperation with the bifurcated upper end of a lever 800 fulcrumed on a stud 801 in the left frame 81, to rock said lever 800 counter-clockwise. Counter-clockwise movement of the lever 800, by means of the slotted lower end thereof in cooperation with a stud 802 in the upper end of a lever 803 pivoted on a stud 804 in the frame 81, rocks said lever 803 clockwise. The lower end of the lever 803 carries a stud 805 embraced by a slot in an arm 806 of a yoke 807 free on a stud 808 secured in the frame 393 (Fig. 37). A rearward extension 809 of the yoke 807 has a camming slot 810 through which extends a stud 811 in an upward extension of the pawl 796. Another arm 812 (Figs. 12 and 13) of the yoke 807 has a camming slot 813, which cooperates with a stud 814 in an upward extension of the pawl 792.

Clockwise movement of the lever 803 rocks the yoke 807 counter-clockwise, causing the camming slot 810, in cooperation with the stud 811, to rock the pawl 796 counter-clockwise (Fig. 14) out of the path of the extension 794 of the dog 780. Counter-clockwise movement of the yoke 807 causes the camming slot 813 in the arm 812, in cooperation with the stud 814, to rock the pawl 792 clockwise into the path of the extension 793 of the clutch dog 772. It is therefore obvious that depressing the Member's Number key 203 causes the clutch dog 772 to be disengaged from the segmental portion of the disc 770, upon rotation of the gear 773, and that the clutch dog 780 remains effective to drive the gears 783 and 784 and the shaft 567 to effect a member's number operation, in which the card feed is disabled (see spaces 11 and 12 Fig. 6).

The shaft 567 receives one clockwise rotation in member's number operations and during this rotation companion plate cams 815 and 816 (Figs. 28 and 37) secured thereon, in cooperation with their respective rollers 817 and 818, mounted on Y-shaped extensions of a yoke 819 pivoted on the shaft 566, rock said yoke first counter-clockwise (see space 9 Fig. 6). The yoke 819 has similar arms 820 and 821 bifurcated to embrace grooved portions of the bail 464 (see also Figs. 31 and 32), whereupon counter-clockwise movement of said yoke 819 raises the framework 462 and 463 which supports the connector bars, so that the connector bars 461 in the lower group are placed between the selecting racks and the punches 483. While the dwelling surfaces on the cams 815 and 816 cause the connector bar framework to remain in upward position, the racks 455 and 459 for the member's number (Figs. 28, 30 and 34) are positioned by the depressed amount keys in the manner explained earlier herein, after which the cam 565 (Figs. 26B and 37), secured on the shaft 567, in cooperation with the mechanism here shown and explained earlier herein, shifts the die assembly, including the plates 543 and 549, rearwardly to punch the member's number in the record card.

It will be noted that the cam 564 (spaces C and 12 Fig. 6) in cooperation with the roller 561, does not permit the die assembly to be shifted to its extreme forward or card-feeding position during a member's number operation and also that the shaft 566 is inoperative at this time and consequently the feed and ejecting rollers do not operate. Therefore the card remains in the throat 551 after the member's number has been punched therein. After the member's number has been punched, the cams 815 and 816 return the connector bar framework downwardly to normal position, as shown in Fig. 28.

Depressing the Member's Number key, through the transaction differential mechanism, positions the transaction punch selecting rack 481 (Figs. 30 and 34) so that the nose thereon is opposite a member's number connector bar 822 (Fig. 32) to punch an identifying hole for the transaction in the record card. At the end of the member's number operation the Member's Number key 203 is released and as a result the shaft 567 is rendered inoperative and the shaft 566 is rendered operative.

A member's number operation is always followed by an item-entering operation of the machine, during which the shaft 567 (Fig. 11) remains stationary and the shaft 566 controls the operation of the punching mechanism. After the amount and various other data have been punched in the record card, the card ejecting and feeding mechanism, controlled by the shaft 566, causes the punched record card to be ejected from the throat 551 and a new card to be fed therein in the manner explained hereinbefore.

Sometimes a member's number operation is followed by a multiple-item transaction, consisting of a plurality of item-entering operations, during which a plurality of items are listed one at a time, and a final item total operation in which the total of these items is recorded and registered. As it is desirable to punch only the total of multiple-item transactions in the record card, it is therefore necessary to disable the punching mechanism during the item-entering operations of said multiple-item transactions.

It will be recalled that multiple-item transactions are controlled by depressing the List key 200 (Figs. 11 and 21) which by means of the stud 366 therein, in cooperation with the arm 367, rocks the yoke 368 and the arm 370 thereof counter-clockwise. Counter-clockwise movement of the yoke 368 moves a stud 823 in an extension of the arm 370 from beneath the sole of a foot-shaped projection 824 of a lever 825 fulcrumed on the stud 804. This releases the lever 825 to the action of a spring 826 which immediately rocks said lever clockwise until a roller 827, carried thereby, contacts a camming surface 828 on the rearward end of a lever 829 free on a shaft 830 journaled in the frame 81 and the printer frame. Clockwise movement of the lever 825 (Figs. 11 and 12) causes a stud in the lower end thereof, similar to the stud 805, in cooperation with a slot in an arm 831 of a yoke 832 free on the stud 808, to rock said yoke counter-clockwise. Counter-clockwise movement of the yoke 832 causes a camming slot 833 in an arm 834 thereof in cooperation with a stud 835 on the upper end of the pawl 791 to rock said pawl clockwise into the path of the extension 790 of the clutch dog 772. Rotation of the gear 773 disengages the dog 772 from the segmental portion of the disc 770 to disable the drive of the shaft 566, and the pawl 796 (Figs. 12 and 14), which is normally in the path of the extension 794 of the clutch dog 780, disengages said dog from the segmental portion of the disc 782 to disable the drive of the shaft 567. From the foregoing description it should be clear that the punching mechanism does not function during item-entering operations of a multiple-item transaction.

Moving the mode of operation lever 122 (Figs. 1 and 18) from add position down to List Reset position, by means of the mechanism shown in Fig. 18 and described earlier herein, rocks the zero pawl throwout shaft 118 counter-clockwise, which through the mechanism shown in Fig. 9 conditions the machine for a two-cycle operation. Near the end of the first cycle of the List Reset operation the camming groove 141 in the cam 140 imparts additional counter-clockwise movement to the shaft 118, in the manner explained earlier herein, causing a slot in the rearward end of an arm 840 (Fig. 11), secured to the lever 348 by a stud 841, in cooperation with a stud 842 in the forward extension of the lever 829, to rock said lever clockwise.

Clockwise movement of the lever 829 causes a raised portion of the camming surface 828, in cooperation with the roller 827, to return the lever 825 counter-clockwise to normal position, as shown in Fig. 11. The lever 825 returns the yoke 832 clockwise to normal position to move the pawl 791 out of the path of the extension 790 of the clutch dog 772 to render the shaft 566 operative during the last cycle of the List Reset operation. Operation of the shaft 566 causes the punching mechanism to function, to punch the total of the multiple item transaction and other data in the record card, and to cause said record card to be ejected from the punching mechanism and a new card fed therein, as explained earlier herein. When the List key 200 is released, near the end of the second cycle of the List Reset operation, the yoke 368 (Fig. 11) is spring-returned clockwise to normal position, as here shown, to move the stud 823 into the path of the foot-shaped projection 824 to retain the pawl 791 out of the path of the extension 790 of the clutch dog 772.

*Selective control of the punching mechanism*

A feeler mechanism under control of the mode of operation lever 122 (Fig. 18) governs the functioning of the punching mechanism. As presently arranged, the punching mechanism is effective only when the mode of operation lever is in Add position or List Reset position. As previously explained, the mode of operation lever 122, by means of the link 282 and the arm 283, positions the shaft 196 and the segment 284 in proportion thereto. The positioning of the shaft 196 and the segment 284 is transmitted by said segment through a segment 843 on the shaft 407, and a gear 844 free on the shaft 409, to a control ring gear 845 rotatably supported on a disc 846 mounted on the rods 426, 432 and 433, (see also Fig. 34).

The control surface of the gear 845 cooperates with the pointed end of a feeler 847 slotted to fit loosely on a reduced portion of the sleeve 778 and carrying a roller 848 which cooperates with the periphery of a plate cam 849 secured on said sleeve 778. An arm 850 of a yoke 851, loose on the shaft 566, is pivotally connected to the lower end of the feeler 847 while another arm of said yoke has a camming slot 852 which engages a stud 853 in a control pawl 854 loose on a stud 855 secured in the frame 393 (Fig. 37). A spring 856, one end of which is connected to the arm of the yoke 851, urges said yoke counter-clockwise and the feeler 847 forwardly to normally maintain the roller 848 in contact with the periphery of the cam 849. It will be recalled that the gear 777 is driven clockwise by the gear 773 each machine operation, in unison with the main shaft 107 (Fig. 9), one rotation in adding operations and two rotations in total and sub-total operations. After the cam 849 has rotated 120 degrees (see spaces 1 and A of Fig. 6), the contour of the periphery thereof causes the feeler 847 to feel the control surface of the gear 845. If the mode of operation lever 122 is in Add or List Reset position a high portion 857 of the gear 845 will be in the path of the point of the feeler 847 and prevent downward movement of said feeler under influence of the cam 849 and the spring 856. In this case the yoke 851 will be retained in the position shown in Fig. 18 and the cam slot 852 will retain the tooth 858 of the pawl 854 out of the path of the extension 790 of the clutch dog 772, and consequently said clutch dog will be controlled by the pawls shown in Fig. 12.

If the mode of operation lever 122 is in other than Add or List Reset positions a low portion 859 of the control surface of the gear 845 will be positioned opposite the point of the feeler 847, permitting said feeler to move downwardly under the influence of the cam 849 and the spring 856. Downward movement of the feeler 847 rocks the yoke 851 counter-clockwise causing the camming slot 852, in cooperation with the stud 853, to rock the pawl 854 clockwise to move the tooth 858 into the path of the extension 790 of the clutch dog 772, before said extension has passed said tooth. As the extension 790 moves into engagement with the tooth 858 the dog 772 is disengaged from the segmental portion of the disc 770 to disable the drive of the shaft 566 after said shaft has completed approximately 163 degrees of movement (see space L Fig. 6). By referring to the time chart (Fig. 6) it will be seen that this disabling of the shaft 566 occurs before the cams 739, 564 and 574 on the shaft 566 that operate respectively the picker mechanism, the die assembly, and the stop bars for the record cards, have started to function. Consequently the card punching and feeding mechanism has been inactive prior to the time the drive of the shaft 566 was disabled, and of course, remain inactive while said shaft is disabled.

Secured on the right-hand end of the shafts 566 and 567, respectively, are discs 860 and 861 (Figs. 9 and 37) having V-shaped notches 862 and 863 therein, which in cooperation with rollers 864 and 865, supported respectively by similar levers 866 and 867 free on studs 868 and 869 in the frame 393 and urged toward each other by a spring 870 stretched there between, retain said shafts 566 and 567 in home positions, as here shown. When the pawl 854 (Fig. 18) disables the drive of the shaft 566, after said shaft has rotated approximately 163 degrees from home position, a notch 871 in the disc 860 (Fig. 9) in cooperation with the roller 864, retains the shaft 566 in moved position. In a succeeding operation, in which the high portion 857 of the control gear 845 blocks downward movement of the feeler 847, the pawl 854 is held out of the path of the dog 772 and consequently said dog is free to pick up the shaft 566 and complete the movement thereof to cause a card to be punched and issued. The cam 849 returns the feeler 847 upwardly to move the pawl 854 to ineffective position near the end of each rotation of the sleeve 778, and as said sleeve makes two clockwise rotations in total and sub-total recording operations, the feeler 847 makes two feeling movements to disable the drive of the shaft 566 during both cycles of a total or sub-total operation.

At the end of an operation in which the pawl 854 (Fig. 18) has rendered the drive of the shaft 566 inoperative, said shaft will remain approximately 163 degrees away from home position. Consequently in a succeeding operation in which the high portion 857 of the control gear 845 has been moved opposite the feeler 847 and retains the pawl 854 in ineffective position, as here shown, the pawls 791 or 792 (Figs. 11, 12 and 13) even though moved to effective position, as described above, would not hold the clutch dog 772 in ineffective position long enough to prevent said dog from picking up the disc 770 and the shaft 566, when in their 163-degree positions, and completing the rotation of said disc and said shaft, thereby effecting operation of the card punching and feeding mechanism.

In order to prevent such an occurrence, the pawls 791 and 792 have respectively, extensions 872 and 873 which cooperate with a stud 874 in a pitman 875. The forward end of the pitman 875 is bifurcated to embrace the stud 808 and the rearward end thereof is pivotally connected to an arm 876, connected by a hub 877, free on the stud 855, to a clutch dog control pawl 878. When either of said pawls 791 or 792 is moved clockwise to effective position, in the manner explained previously, the extension 872 or 873 thereof rocks the pawl 878 clockwise against the action of a spring 879, to move a tooth 880, of said pawl, into the path of the extension 790 of the clutch dog 772 (see also Fig. 37), to retain said clutch dog in ineffective position so that it will not pick up the disc 770 and the shaft 566 when they are in their 163-degree position.

*Control of punching mechanism by the on-and-off lever*

As previously explained, the On-and-Off lever 582 (Figs. 14 and 37) is secured on the shaft 492 and also secured on said shaft is an arm 881, the upper end of which is bifurcated to straddle a stud 882 in a downward extension of a lever 883 loose on the stud 888. A rearward extension of the lever 883 has therein a camming slot 884 through which extends a stud 885 in an upward portion of the pawl 795 (Figs. 12, 14 and 37). The pawl 795 is fixedly connected to the pawl 793 by a hub 886 rotatably supported by the stud 797, and consequently moves in unison with said pawl 795.

When the On-and-Off lever 502 is in "on" position as shown in Fig. 14, the camming slot 884, in cooperation with the stud 885, retains the pawls 795 and 793 in ineffective position, as here shown. Moving the On-and-Off lever 502 clockwise to "off" position rocks the lever 883 counter-clockwise, causing the camming slot 884 to move the pawls 795 and 793 (Figs. 13 and 14) into the path of the extensions 794 and 790, respectively, of the clutch dogs 780 and 772 to move said clutch dogs to ineffective position upon operation or rotation of the gears 773, to disable the drives of the shafts 566 and 567, to render the punching mechanism inoperative. When the pawl 795 is moved clockwise to effective position, an upward extension 887 thereof, in cooperation with the stud 874 (Figs. 11, 12 and 14), rocks the pawl 873 clockwise into the path of the extension 790 of the clutch dog 772 to prevent said clutch dog from engaging the segmental portion of the disc 770 in case said disc and the shaft 566 have been moved 163 degrees away from home position in a preceding operation, as explained earlier herein.

It will be recalled that when the On-and-Off lever 502 is in "off" position, the arm 709 (Figs. 14, 50, 51 and 52) in cooperation with the projection 710 of the yoke 698 retains said yoke in counter-clockwise position to hold the feeler pin 702 in ineffective position to prevent disabling of the switch 135 in the manner explained earlier herein, in case no card is in the throat 551.

*Aliner for punching mechanism*

An aliner mechanism is provided for alining the group of internal ring gears and their associated punch selecting racks, mounted on the left-hand ends of the rods 426, 432 and 433 (Fig. 34). It will be recalled by referring to Figs. 11 and 37 that the gear 773 drives the gear 777 and the sleeve 778 one clockwise revolution in adding operations and two clockwise revolutions in total and sub-total operations. The sleeve 778 (Figs. 28 and 37), which drives the feeler cam 849, has tenons on the left-hand end thereof which fit in clutch cuts in a sleeve 893 also loose on the shaft 567 and having connected to the left end thereof a cam 894. The cam 894 has a camming groove 895 which engages a roller 896 on the upper end of a pitman 897 bifurcated to straddle an undercut portion of a hub 898 secured on the shaft 567 and adapted to laterally position the sleeves 893 and 778 and the parts associated therewith, on the shaft 567. The lower end of the pitman 897 is slotted to receive a stud 899 in an extension of an arm 900, connected by a bail 901 to a similar arm, both of said arms being free on the rod 430. Secured on the bail 901 is an alining bar 902, which cooperates with alining teeth 903 in the left-hand group of internal-external gears, which position the punch selecting racks.

After the left-hand group of internal gears and their corresponding punch selecting racks have been positioned, in accordance with the depressed keys and the position of the manipulative levers, the cam 894 shifts the pitman 897 upwardly to rock the alining bar 902 into engagement with the teeth 903 to aline said internal gears and their corresponding punch selecting racks in set positions (see spaces 2 and B Fig. 6). After the punching mechanism has functioned, the alining bar 902 is disengaged from the teeth 903 and remains thus disengaged when the machine is at rest. A spring 904 (Fig. 28) forms a flexible connection between the pitman 897 and the arm 900 to compensate for any unevenness in the alinement of the teeth 903.

An undercut portion 1904 (Fig. 36) of the aliner bar 902, in cooperation with teeth in a plate 905 secured to the tens of days gear 521, said teeth corresponding to the four positions of said gear and its associated rack 522, alines said gear and said rack in set positions during operation of the punching mechanism.

*Mode of operation*

At the beginning or at the end of a business day, whichever is desirable, the store manager or some other person in authority unlocks and opens the closures 494 and 500, (Fig. 26B) removes the punched record cards from the tray 669, refills the supply magazine 711 with new record cards, sets up the date on the levers 484, 485 and 486 (Fig. 25), then closes and locks the closures 494 and 500. The On-and-Off lever, the department number levers and the register number levers remain locked, as it is rarely necessary to change the setting of these levers as long as the register remains in the same location.

In this case the On-and-Off lever 502 (Figs. 7, 8 and 25) is set in "On" position, the date levers are set to January 18, the dapartment number levers to 11, and the register number levers to 361. In single-item members' operations first the member's number is set up on the keys 148 and 149 (Fig. 1), the Member's Number key 203 depressed, the Clerk's key for the clerk handling this transaction depressed, and the machine released for the operation by depressing the motor bar 87. During the operation of the machine the member's number (333,333) is punched, in columns 10 to 15 inclusive of the card shown in Fig. 7, a hole is punched in row 9 showing that this is a member's number operation and the same data is printed upon the receipt shown in Fig. 5 and upon the detail strip 276 (Fig. 2).

Next the amount of the transaction £7 15s 6¼d is set up on the amount keys 148, the Cash key 202 depressed, the A Clerk's key 201 depressed, and the machine released for a single-item operation by depressing the motor bar 87. During operation of the machine, the amount is punched in columns 17 to 21 inclusive, of the record card (Fig. 7), the type of transaction is punched in row 9, the clerk's initial is punched in row 8, the date is punched in rows 1 and 2, the department number in rows 3 and 4, and the register number in rows 5, 6 and 7. The data punched on the record card is also printed on the single-item receipt shown in Fig. 5 and upon the detail strip 276 (Fig. 2).

In multiple-item member's number transactions, first the member's number is punched in the record card and printed upon the receipt shown in Fig. 3 in exactly the same manner as explained for single-item member's number operation. In the succeeding item-listing operations, depressing the List key 200 (Fig. 1) causes the punching mechanism to be disabled. Consequently the listing of the items will not be punched in the record card, but these items will be printed upon the receipt (Fig. 3) at the same time they are added in the listing totalizer. After all the items have been listed, the mode of operation lever 122 is moved from Adding to List Reset position, after which the machine is released for a list reset operation by depressing the motor bar 87.

During this operation of the machine the listing totalizer is reset, and moving the mode of operation lever 122 to List Reset position renders the mechanism effective that causes the punching mechanism to function in the last cycle of said list reset operation to punch the total of the multiple items in the proper column of the record card, and simultaneously print the total of said items on the receipt shown in Fig. 3. Simultaneously with the punching of the item total, holes representing the clerk's letter and the type of transaction are punched in their respective columns, and the date, department number and register number are punched in their respective columns of the record card and this same data is simultaneously printed on the multiple-item receipt shown in Fig. 3 and the detail strip 276 (Fig. 2).

The only difference between member transactions and non-member transactions is that in the latter it is unnecessary to perform a member's number operation prior to the item operation. In single-item non-member transactions the amount of the transaction, in this case £6 16s 8¾d (Figs. 4 and 8), is set up on the keys 148 (Fig. 1), the Non-Member key 202 depressed, the D Clerk's key 201 depressed, and the machine released for operation by depressing the motor bar 87. During operation of the machine the amount, the non-member symbol, the date, department number, and the register number, are punched in their respective columns of the record card (Fig. 8) and simultaneously printed upon a single-item non-member receipt (Fig. 4) and the detail strip 276 (Fig. 2).

It is to be understood that during member's number operations the mode of operation lever 122 (Fig. 1) is in Adding position and in all transactions during which data other than the member's number is punched in the record card and the record card ejected from the machine, it is necessary for the mode of operation lever 122 to be either in Adding position or List Reset position.

*First modified form*

Figs. 10 and 57 to 59 inclusive illustrate the first modified form of machine, which is similar in many respects to the preferred form just described. The first modified form of machine is adapted for use in Cooperative Society stores where said stores in a certain locality, are divided into two groups, for example, East side and West side groups, and the members, patronizing the respective stores are likewise designated as East side and West side members. Inasmuch as it is possible for an East member to make purchases in a West store, or for a West member to make purchases in an East store, it is necessary, as a matter of record, to punch the location of the store and the designation of the residence of the member upon the record card, and also print these data upon the issuing receipts.

The keyboard of the first modified form has a plurality of rows of amount keys 910, including a one-half pence key 911, a row of printing non-add keys 912, similar to the amount keys but which do not add into the totalizers, four transaction keys 913, a Member's Number key 914, four clerks' keys 915, a Group Total key 916, a List key 917, a motor bar 918, and a mode of operation lever 919. The portion of the keyboard just described and mechanism associated therewith, with the exception of the one-half pence key 911, is exactly the same as the keyboard of the preferred form shown in Fig. 1. The first bank of keys has an East key 920 and a West key 921, which during member's number operations selects corresponding printer wheels and punches to record the designation of the member's residence upon the detail strip, issuing receipt (not shown) and the punched card, shown in Fig. 59.

Referring to Fig. 58, the first modified form has a plurality of settable levers similar to those of the preferred form, for setting up various data to be punched in the record card, shown in Fig. 59. These settable levers include month, units of days and tens of days levers 922, 923 and 924, units and tens department number levers 925 and 926, an On-and-Off lever 927 for enabling or disabling the punching mechanism, and a units and a tens register number lever 928 and 929, all of said levers being similar to and functioning the same as corresponding levers of the preferred form, explained previously. In addition to the levers just described, there are units, tens and hundreds branch number levers 930, 931 and 932, and an East and West lever 933, the latter for causing the location of the store to be punched in the record cards. As the setting of the On-and-Off, department number, register number, branch number and East and West levers is more or less permanent, these levers are locked in set positions in the same manner as described for the preferred form.

It will be noted by observing Fig. 59 that the punch for the ½d key 911 is located in the 11 position of the tens of shillings or 19th row of the record card, instead of the ordinary method of punching the ½d in the sixth position of a fractional pence column, which would be located just to the right of the pence column 21 and conserves a vertical row of the index cards for some other use. The differential device for the ½d key 911 (Figs. 10 and 57) is connected to a tube 934, free on the shaft 196 and also connected to said tube 934 is a segment 935 which meshes with a segment 936 free on a stationary stud 937. Teeth in the lower portion of the segment 937 mesh with a segment 938 free on a stationary stud 939, and having teeth in a rearward extension thereof which mesh with an internal-external ring gear 945, the internal teeth of which bear upon a disc supported by the rods 426, 432 and 433, in exactly the same manner as explained for the preferred form. The internal teeth of the gear 945 mesh with a pinion on a square shaft 946 and a similar pinion on said shaft meshes with the internal teeth of a rack positioning gear 947, the external teeth of which mesh with the teeth of a fractional pence punch selecting rack 948, mounted in exactly the same manner as the punch selecting racks of the preferred form. The rack 948 has a nose 949, which in co-operation with a connector bar 950 selects a punch 951, located in the 11th position of the tens of shillings column of the record card.

Figure 10:
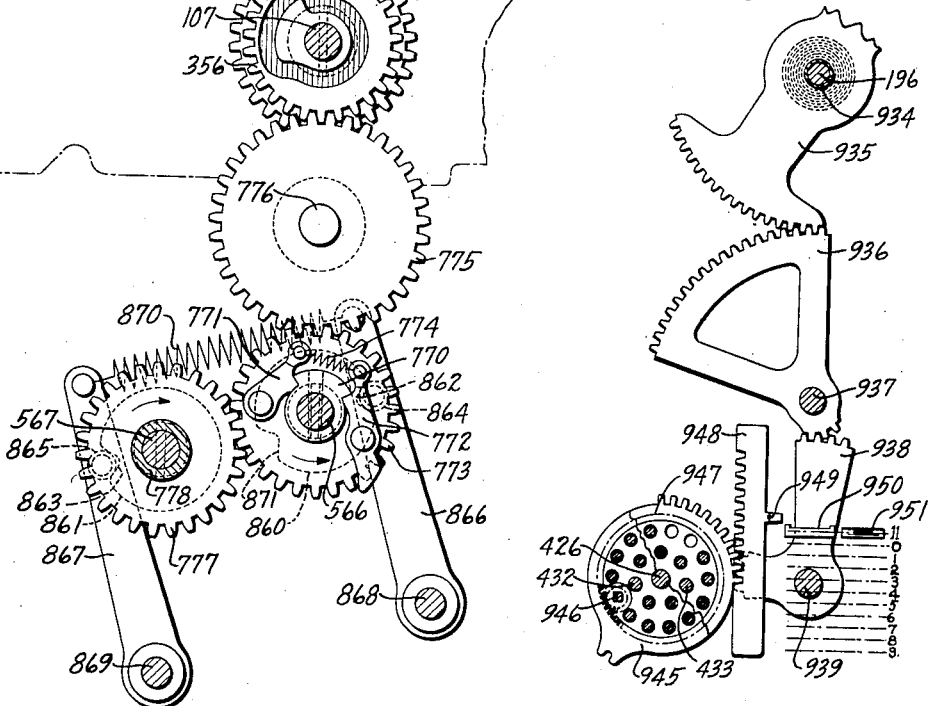
Fig. 10 is a modified form of mechanism for positioning the selector rack for the fractional pence denomination.

When the half-pence key is not depressed, the differential device therefor is broken in zero position and, through the train of mechanism shown in Fig. 10, positions the rack 948 so that the nose 949 is above the connector bar 950.

When the half-pence key is depressed, the differential device associated therewith, in cooperation with the mechanism shown in Fig. 10, positions the rack 948 so that the nose 949 thereof is opposite the connector bar 950 and during the operation of the machine the punch 951 functions to punch a hole corresponding to the half-pence key in the 11th position of the tens of shillings column. The half-pence rack 948 is located adjacent the tens of shillings rack (not shown) and the nose 949 is offset so that it is in alinement with the selector bar 950, which is in the same vertical row as the tens of shillings connector bar.

*Operation of the first modified form*

Assuming the store where this particular register is being used is located in the West side, at the beginning or at the end of a business day, the store manager or some other authorized person sets up the date, March 18, (Fig. 59) on the settable levers 922, 923, and 924, removes the punched record cards from the tray and refills the supply magazine with the new cards.

Assuming that an East side member makes a purchase in this West side store, first the operator sets up the member's number 123456 on the keys 910 and 912, depresses the Member's Number key 914, the proper Clerk's key 915, the East key 920, and releases the machine for operation by depressing the motor bar 918. During operation of the machine the member's number (123456) is punched in its proper field of the index card (Fig. 59), the designation for the customer's residence is punched in column 9, and the designation for the Member's Number key is punched in column 10. All the information punched in the record card during the member's number operation is simultaneously printed upon an issuing receipt, (not shown) and upon a detail strip, (not shown) which is retained by the store for its information. Next the amount of the transaction, £2 4s 8d, is set up on the amount keys 910, the Cash key 913 is depressed, the A Clerk's key 915 is depressed, and the machine again released for operation by depressing the motor bar 918.

During this operation of the machine the date, department number, location of the store, the number of the branch, the department number, and the register number, are punched in their proper fields on the record card. Also the amount, £2 4s and 8d, is punched in the amount field, the designation for the Cash key 913 is punched in row 10, and the designation for the Clerk's key A is punched in row 9. All the data punched in the record card during this single item transaction is simultaneously printed upon the issuing receipt and the detail strip. Other operations of the machine, including member's number multiple-item transactions, and non-member transactions are similar in every respect to corresponding transactions of the preferred form of machine explained previously.

*Second modified form*

In Figs. 60, 61 and 62, a second modified form of machine is shown, differing principally from the other two forms in that the amount keys are arranged for the decimal system of currency and the Member's Number key has been replaced by a Data key 952, which is used in much the same manner as the Member's Number key for punching various data in a corresponding field of the record card, shown in Fig. 61. The second modified form of machine has four rows of amount keys 953 and three rows of non-add keys 954, similar to the amount keys, are used for punching data in a corresponding field of the record card at the same time as the amount is being punched in its field. This machine also has four Transaction keys 955, four Clerks' keys 956, a No-Sale key 957, a List key 958, a motor bar 959, and a mode of operation lever 960. The present machine also has a plurality of settable levers, similar to those of the other forms, for setting up the date and the register number.

Depressing the Data key 952 conditions the machine for a data operation in which the amount keys 953 and the non-add keys 954 may be used to cause the desired data to be punched in columns 8 to 14 inclusive of the data field of the record card (Fig. 61). In transactions involving amounts, the amount keys 953 select corresponding punches to punch the amount of the transactions in columns 18 to 21 of the amount field; and the non-add keys 954 select corresponding punches to punch data, of any desired nature, in columns 15, 16 and 17 of the data field. In transactions involving amounts it is necessary to depress one of the Transaction keys 955 and one of the Clerks' keys 956 before the machine can be released for operation, and these keys select corresponding punches to punch a record of the depressed Transaction and Clerks' keys in the Transaction and Clerks' columns of the record card.

In the preferred and first modified forms, the mode of operation lever positions the mutilated control gear 845 (Fig. 18) which, in cooperation with its associated feeler mechanism, controls the operation of the punching mechanism. In the second modified form, the mode of operation lever 960 and the keys 956, 957 and 958 in the clerk's row, position corresponding mutilated control gears, which, in cooperation with a two-pronged feeler device, control the operation of the punching mechanism. The feeler mechanism for the second modified form is shown in Fig. 62, and the parts here shown, which correspond to similar parts in the preferred form, shown in Fig. 18, are given the same numbers as these parts.

The mode of operation lever 960, by means of mechanism exactly like that shown in Fig. 18, positions the control gear 845 in proportion thereto. As previously explained, the control gear 845 has a raised portion 857, which corresponds to the add and first reset or 1Z position of the mode of operation lever 960, and the control surface of said gear 845 cooperates with a prong 961 of a bipronged feeler 962 pivoted at 963 to the forward end of a pitman 964 slotted to embrace an undercut portion of the tube 778 and carrying a roller 965, which cooperates with the periphery of the plate cam 849, which, as previously explained, is integral with the sleeve 778. The pivot 963 is connected to the arm 850 of the yoke 851, which, as previously explained, has a cam slot 852 therein, which cooperates with a stud 853 in the control pawl 854 for the clutch dog 772 (Figs. 18 and 62). A spring 966 tensioned between the pitman 964 and the feeler 962 centralizes said feeler to retain the prongs thereof in a neutral position where they will not stumble on the control gears when said gears are being positioned.

The keys 956, 957 and 958 in the clerk's bank are similar to the corresponding keys of the clerk's bank of the preferred form shown in Fig. 21, and have a differential mechanism similar to the differential 205 which in exactly the same manner and by means of similar mechanism, positions a gear 967, loose on the shaft 409 corresponding to the gear 408 (Fig. 27) of the preferred form. The gear 967 meshes with the external teeth of a double gear 968, the internal teeth of which form a bearing on a disc supported by the rods 426, 432 and 433. The internal teeth of the gear 968 are connected to similar internal teeth of a control ring gear 969 by pinions 970 on the square shaft 9, and the internal teeth of said control gear 969 bear on the periphery of a disc 971 mounted on the rods 426, 432 and 433. The control gear 969 has a control surface 972, which cooperates with a prong 973 of the two-pronged feeler 962 and said control surface has a low portion 974 which corresponds to the No-Sale key 957.

As explained in connection with Fig. 18, the cam 849 makes one clockwise revolution in adding operations and two clockwise revolutions in total and sub-total operations. The high portion of the cam 849, (spaces 1 and A Fig. 6) in cooperation with the roller 965, holds the prongs 961 and 973 out of the path of their corresponding control gears 845 and 969 during the first 160 degrees of travel of said cam 849, to allow ample time for the gear 969 to be positioned under influence of the keys 956, 957 and 958. The gear 845 is positioned prior to operation of the machine by the manual movement of the mode of operation lever 960. After 160 degrees of movement of the cam 849, the high surface thereof moves out of contact with the roller 965, permitting the pitman 964 and the feeler 962, under influence of the spring 856, to move downwardly to cause the prongs 961 and 973 to feel the control surfaces of their corresponding control gears 845 and 969.

If both the prongs 961 and 973 contact high portions of the control surfaces of their respective control gears, the tooth 858 of the pawl 854 will be retained out of the path of the extension 790 of the clutch dog 772, and consequently the drive of the shaft 566 will not be disabled and the punching mechanism will function in the manner explained earlier herein. If, when the high portion of the cam 849 moves beyond the roller 965, either of the prongs 961 or 973 of the feeler 962 is opposite a low portion of the control surface of its corresponding control gear, the pitman 964 will be free to move downwardly under influence of the spring 856. Such downward movement of the pitman 964 will rock the yoke 851 counter-clockwise, causing the camming slot 852 therein, in cooperation with the stud 853, to rock the tooth 858 of the pawl 854 into the path of the extension 790 of the dog 772 to disengage said dog from the segmental portion of the clutch disc 770 to disable the drive of the shaft 566 after said shaft has traveled approximately 163 degrees in a counter-clockwise direction.

Summarizing briefly, when either of the control gears 845 or 969 is positioned so that a low surface thereon is opposite the corresponding prong of the feeler 962, the punching mechanism is rendered inoperative and when high portions of both of said control gears are opposite their corresponding prongs of the feeler 962, the punching mechanism is operative. In the present arrangement the control surfaces of the gears 845 and 969 are cut so that when the mode of operation lever 960 is in Add or 1Z position the punching mechanism is rendered operative. All other positions of the mode of operation lever render the punching mechanism inoperative. When the No-Sale key 957 is depressed, the punching mechanism is rendered inoperative irrespective of the position of the mode of operation lever 960, and the keys 956 and 958 in the clerk's bank, render the punching mechanism operative.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of record material perforating means associated with separate zones of record material to perforate data therein; manipulative means; a plurality of sets of devices controlled by said manipulative means to control said perforating means, the devices of the various sets being related to the perforating means for various zones; a plurality of means selectively cooperable with said devices and their related perforating means and effective, when cooperating, to determine which set of devices will control its perforating means; and means to control which of said plurality of cooperable means shall cooperate with the devices and the perforating means.

2. In a machine of the class described, the combination of record material perforating means; manipulative means; a plurality of sets of devices controlled by said manipulative means; means on said devices to control said perforating means; adjustable means intermediate the perforating means and the means on said devices and normally in cooperative relation with a certain set of said devices and a certain portion of said perforating means to effect a control of said certain portion of said perforating means by said certain set of devices under control of the manipulative means; and a special manipulative member to cause said adjustable means to be shifted to provide cooperative relation between the means on another set of devices and a certain other portion of the perforating means to effect a control of said other portion of said perforating means by the last mentioned set of devices.

3. In a machine of the class described, the combination of means to feed a record strip; means to print on said record strip; a device to control the feeding means to feed the strip variable distances; means to perforate a record card; common manipulative means for setting up data of different significance; mechanism controlled by said manipulative means to control said printing means to print data of different significance on the record strip and to control the perforating means to perforate data of different significance in various zones in the record card, said mechanism including means to selectively control the perforating means to enable various portions thereof to perforate said various zones of the record card with said different data in different machine operations; means to feed one record card into perforating position and simultaneously feed another card out of perforating position; means to disable the record card feeding means to cause a card to be retained in perforating position; and a common control means, operative in a machine operation in which data of a certain significance is to be printed on the strip and perforated in one of the zones in the record card in perforating position, to control said device whereby the record strip is fed a definite distance and to operate the disabling means to render the card feeding means ineffective during said operation so that the record card will be retained in perforating position to receive perforations of data of different significance in another zone thereof in a subsequent operation.

4. In a machine of the class described, the combination of means to record different kinds of data on a record strip; means to feed said strip one distance upon the recording of one kind of data and a different distance upon the recording of another kind of data; means to record said different kinds of data on other record material; common manipulative means to control the setting of said different kinds of data in both of said recording means; means operable whereby both of said recording means under control of the manipulative means record one kind of data upon the record strip and upon said record material, and causes the feeding means to feed said strip a certain distance according to the data recorded; a manipulative device operable to cause the common manipulative means to set up a different kind of data on both of said recording means, and simultaneously control the record strip feeding means to feed the strip a different distance and to prevent the second mentioned recording means from recording said different data on said other record material; and adjustable means operable to supersede the control of said manipulative device whereby said feeding means is operated to feed the record strip a distance equal to said certain distance and whereby the recording means for said record material is again rendered effective.

5. In a machine of the class described, the combination of means to record different kinds of data on a record strip; means to feed said strip one distance upon the recording of one kind of data and a different distance upon the recording of another kind of data; means to record said different kinds of data on other record material; common manipulative means to control the setting of said different kinds of data in both of said recording means; means operable whereby both of said recording means under control of the manipulative means record one kind of data upon the record strip and upon said record material, and cause the feeding means to feed said strip a certain distance according to the data recorded; and a manipulative device operable to cause the common manipulative means to set up a different kind of data on both of said recording means, and simultaneously control the record strip feeding means to feed the strip a different distance and to prevent the second mentioned recording means from recording said different data on said other record material.

6. In a machine of the class described, adapted to record on a record strip items, the total of the items, and special identifying data, and to record on other record material the total of the items and the special identifying data, the combination of recording means associated with the record strip; recording means associated with said other record material; means to feed the record strip variable distances depending upon the kind of data being recorded; common manipulative means to control both recording means to record said items, the total thereof, and said special identifying data; a manipulative member to cause both of said recording devices to record the special identifying data on the record strip and the record material under control of said common manipulative means, and to simultaneously control the record strip feeding means to feed the strip a certain distance; a manipulative device to cause the record strip recording means to record the items upon the record strip under control of said common manipulative means, to control said feeding means to feed said strip a different distance, and to simultaneously prevent said second mentioned recording means from recording said items upon said recording material; and adjustable means to supersede the control of said manipulative device to cause said feeding means to feed the record strip a distance equal to said certain distance and to cause the first mentioned recording means to record the total of the items on said strip, and to simultaneously render the second mentioned recording means effective to record the total on said record material.

7. In a machine of the class described, adapted to issue punched record cards, the combination of a plurality of sets of punches, each set of punches operable to perforate records in a different field of the record cards; means to select the punches; means selectively shiftable to effective and ineffective positions to variously connect the selecting means to one or the other sets of the punches; and means, effective in certain operations of the machine, to shift the connecting means in relation to the selecting means and the punches to render certain of the connecting means effective and others ineffective to vary the connection between said selecting means and said punches, to make perforations in the different fields of the cards.

8. In a machine of the class described, adapted to issue punched record cards, the combination of a plurality of punches for perforating records in the different fields of the cards; means, including key-controlled racks, to select the punches; a shiftable frame; a plurality of groups of connectors in the frame to connect the racks to corresponding punches; and means to shift the frame to move the different groups of connectors in relation to the racks and the punches to vary the connection therebetween, to perforate records in the different fields of the cards.

9. In a machine of the character described, adapted to issue punched record cards, the combination of a plurality of punches for perforating records in the different zones of the cards; means, including two sets of key-controlled racks, to select the punches; a group of connectors for each set of racks, to connect said racks to their corresponding punches; a shiftable frame supporting the groups of connectors; and means to shift the frame to move one group of connectors out of cooperative relationship with its racks and the corresponding punches, and to move the other group of connectors into cooperative relationship with its racks and the corresponding punches, to perforate records in the different zones of the cards.

10. In a machine of the character described, adapted to issue punched record cards, and having a single set of manipulative devices for setting up data to be punched in different zones of the cards, the combination of a plurality of punches for punching data in the cards; two sets of racks controlled by the single set of manipulative devices for selecting the punches; a group of connectors for each set of racks to connect said racks to their corresponding punches; a shiftable frame supporting the groups of connectors; and means to shift the frame to move one group of connectors out of cooperative relationship with its racks and the corresponding punches and to simultaneously move the other group of connectors into cooperative relationship with its racks and corresponding punches to punch the data set up on the single set of manipulative devices in the different zones of the cards.

11. In a machine of the class described, adapted to issue perforated record cards, and having a single set of manipulative devices for setting up data to be perforated in two fields of the record cards, the combination of two sets of selecting racks adapted to be positioned by the single set of manipulative devices; punches for the two sets of racks; a group of connectors for each set of racks, said connectors adapted to connect the racks to their corresponding punches; a shiftable frame supporting groups of connectors; means to shift the frame to bring either of the different groups of connectors into cooperative relationship with their respective sets of racks to punch data set up on the single set of manipulative devices in the two different fields of the record cards; and means, including a manipulative member, for rendering the shifting means effective.

12. In a combined cash register and card punching machine, adapted to issue punched record cards, the combination of a single complement of manipulative devices for setting up data to be punched in different zones of the record cards; a plurality of punches selected by the manipulative devices for perforating data in the different fields of the record cards; means to operate the punches; means cooperating with certain of the punches to cause the punches to perforate data set up on the manipulative devices in a certain field of the record card when the operating means operates; and means cooperating with other of the punches to cause these other punches to perforate data set up on the manipulative devices in another field of the record cards when the operating means operates in another operation of the machine.

13. In a combined cash register and card punching machine, adapted to issue punched record cards, the combination of a single complement of manipulative devices for setting up data to be perforated in different fields of the record cards; a plurality of punches selected by the manipulative devices for perforating data in the different fields of the record cards; means controlled by the manipulative devices for selecting the punches; normally effective means cooperating with the selecting means and certain of the punches to perforate data set up on the single complement of manipulative devices in a certain field of the record card in one operation of the machine; and means cooperating with the selecting means and the other of the punches to perforate data set up on the manipulative devices in another field of the record card in another operation of the machine.

14. In a machine of the class described, adapted to issue punched record cards, the combination of a single complement of manipulative devices for setting up data to be punched in different fields of the record cards; a plurality of punches selected by the manipulative devices for making perforations in different fields of the record cards; means controlled by the manipulative devices for selecting the punches; normally effective means cooperating with the selecting means and certain of the punches to perforate data set up on the manipulative devices in a certain field of the record card; means cooperating with the selecting means and other of the punches to perforate data set up on the manipulative devices in another field of the record card; and manually controlled means to render the last cooperating means effective, and the first cooperating means ineffective.

15. In a machine of the character described adapted to issue a punched record card, the combination of means to perforate records in two separate zones of the record card; a single set of manipulative devices for setting up data to be punched in the two separate zones of the record card; means controlled by said devices for controlling said perforating means, including normally operative elements to control the perforating means for one zone of the record card and normally inoperative elements to control the perforating means for the other of the two separate zones on the record card; means, including a normally operative shaft and mechanism operated thereby, to control the perforating means to cause data set up on the manipulative devices to be punched in said one of the two separate zones of the record card; means, including a normally inoperative shaft and mechanism operated thereby, when the shaft is operated, to render the normally operative elements inoperative and the normally inoperative elements operative and to control the record perforating means to cause data set up on the manipulative devices to be punched in said other of the two separate zones of the record card; and a manually controlled mechanism for simultaneously rendering the first shaft inoperative and the second shaft operative, so that the data will be punched in said other zone of the record card.

16. In a machine of the character described, adapted to issue punched record cards, the combination of a single set of manipulative devices for setting up data to be punched in two different fields of the record cards; a plurality of punches for punching records in both fields of the record cards; means to feed new record cards to the punches, said means also adapted to eject punched record cards; means to connect the single set of manipulative devices to the punches for one of the fields; means to connect the single set of manipulative devices to the punches for the other field; means to move the cards into engagement with the punches, to punch data therein; normally operative means to control the operation of the feeding and ejecting means and the moving means, whereupon record cards are fed to the punches, the moving means is operated, and the first connecting means are utilized, so that data set up on the manipulative devices is punched in one field of the record cards, and said cards ejected from the punches; normally inoperative means, said means when operated rendering the second connecting means effective and operating the moving means, whereupon, upon operation of the moving means with the second connecting means effective, data set up on the manipulative devices is punched in the other field of the record card, said card being retained in punching position; and a manually controlled mechanism for rendering the first controlling means inoperative and the second controlling means operative.

17. In a machine of the class described, adapted to issue a punched record card, the combination of a single set of manipulative devices for setting up data to be punched in two different fields of the record card; a plurality of punches for punching records in both fields of the record card; means to feed the record cards to the punches, said means also adapted to eject punched record cards; means to connect the single set of manipulative devices to the punches for one of the fields; means to connect the single set of manipulative devices to the punches for the other field; means to shift the first connecting means into effective position and the second connecting means out of effective position; means to move the cards into engagement with the punches to punch data therein; means to operate the means to shift the first connecting means to effective position and the moving means to cause data set up on the manipulative devices to be punched in said one of the two different fields of the record card, said card being retained in the machine; normally operative means to operate the feeding and ejecting means, and the moving means, so that the normally effective connecting means can be effective, to cause data set up on the single set of manipulative devices to be punched in the other of the two different fields of the record card, and said feeding and ejecting means can eject the punched card and feed a new card to the punching means; and means to govern the functioning of the two operating means to permit the issuing of a record card with perforations in one field, or the issuing of a record card with perforations in two fields.

18. In a combined cash register and card punching machine, adapted to issue punched record cards, the combination of a single set of manipulative devices adapted to set up amounts to be punched in one field of the record cards and to set up other data to be punched in another field of the record cards; a plurality of punches for punching the amount and the other data in their respective fields of the record cards; means normally effective to connect the single set of manipulative devices to the punches for the amount field; means normally ineffective but selectively rendered effective to connect the single set of manipulative devices to the punches for the data field; and means operated under control of a manipulative member, to render the normally effective connecting means ineffective and to simultaneously render the second mentioned connecting means effective.

19. In a combined cash register and card punching machine, adapted to issue a punched record card and having a single set of manipulative devices for setting up data and amounts to be punched in corresponding fields of said record card in successive operations of the machine, the combination of data selecting members, positioned under control of the manipulative devices; amount selecting members, positioned under control of the manipulative devices; a plurality of punches for punching the data and the amounts in their respective fields of the record card; normally ineffective means to connect the data selecting members to the punches for the data field; normally effective means to connect the amount selecting members to the punches for the amount field; and manually controlled means to render the first connecting means effective and to render the second connecting means ineffective to punch the data, set up on the manipulative devices, in the proper field of the record card in a first operation of the machine, said manually controlled means operable to render the second connecting means effective at the end of said first operation of the machine, whereupon a second operation of the machine causes the amount, set up on the manipulative devices, to be punched in the amount field of the record card.

20. In a machine of the class described, adapted to issue perforated record cards and having a plurality of manipulative devices for setting up data to be perforated in the record cards, the combination of means to perforate records in the record cards; means including two groups of elements to connect the manipulative devices to the perforating means; a shiftable framework supporting the two groups of elements and normally positioned so that one group of elements is in effective position, whereupon operation of the machine causes data set up on the manipulative devices to be punched in a particular field of the record cards; and means rendered effective, during a particular operation of the machine, to shift the framework to move the one group of elements out of effective position and to move the other group of elements into effective position, to cause data set up on the manipulative devices to be punched in another particular field of the record cards.

21. In a machine of the character described, adapted to issue perforated record cards and having a plurality of manipulative devices for setting up data to be perforated in the record cards, the combination of means to perforate records in the record cards; a plurality of selecting members positioned by the manipulative devices; two groups of connectors intermediate the selecting members and the perforating means; a shiftable framework supporting the two groups of connectors, said framework normally positioned so that one group of connectors is in effective position, whereupon operation of the machine causes data set up on the manipulative devices to be perforated in a certain field of the record cards; and means, effective during a particular operation of the machine, to shift the framework to move the one group of connectors out of effective position and to move the other group of connectors into effective position, to cause data set up on the manipulative devices to be perforated in another field of the record cards.

22. In a combined cash register and card punching machine adapted to issue a punched record card and having a single set of manipulative devices for setting up amounts to be punched in the amount field of the record card, during amount operations of the machine and for setting up other data to be punched in a data field of the record card during data operations of the machine, the combination of means, including a plurality of punches corresponding to the various fields of the record card, to perforate records in said cards; two sets of punch selecting members positioned under control of the single set of manipulative devices; two groups of connectors corresponding to the two sets of selecting members, to connect said selecting members to the punches; a shiftable framework supporting the two groups of connectors and normally positioning one set of connectors in proper relationship with the corresponding set of selecting members and the corresponding punches, whereupon an amount operation of the machine causes the amount set up on the manipulative devices to be punched in the amount field of the card; means to condition the machine for a data operation; and means rendered effective by the conditioning means to shift the framework to move the one group of connectors out of relationship with the corresponding set of selecting members and to move the other group of connectors into relationship with the corresponding set of selecting members and the corresponding punches, to cause the data set up on the manipulative devices to be punched in the data field of the record card.

23. In a machine of the character described, adapted to issue a punched record card, the combination of means to punch records in the card; means to eject the punched card and simultaneously advance a new card to the punching means; normally inoperative means to operate the punching means; means normally operative to operate the punching means and the ejecting and feeding means, to issue a punched record card; and means to render the second operating means inoperative and to render the first operating means operative to punch data in the card, since the first operating means does not drive the feeding and ejecting means, said card will be retained in the punching means so that additional data may be punched therein in a subsequent operation of the machine.

24. In a machine of the class described, adapted to issue a punched record card and having a single set of manipulative devices for setting up data to be punched in the record card, the combination of means to punch records in the card; means to eject the punched card and simultaneously feed a new card into the punching means; means to operate the punching means and the ejecting and feeding means; a second operating means for the punching means; means to drive the two operating means; means normally operative to connect the first operating means to the driving means to cause data set up on the manipulative devices to be punched in the record card, said card ejected and a new card advanced to the punching means; means normally inoperative to connect the second operating means to the driving means; and means to render the first connecting means inoperative and to render the second connecting means operative to cause data, set up on the manipulative devices, to be punched in the record card, said card being retained in the machine so that additional data may be punched therein in a subsequent operation of the machine.

25. In a machine of the class described, adapted to issue punched record cards and printed receipts, the combination of means to print records on the receipts; means to feed the receipt material in relation to the printing means; means to punch records in the cards; a plurality of manipulative devices to set up data to be punched in the cards and printed on the receipts; normally operative means to control the punching means, to cause data set up on the manipulative devices to be punched in a certain field of the record cards; normally inoperative means to control the punching means to cause data set up on the manipulative devices to be punched in another field of the record card; manipulative means to render the latter controling means operative and the former controlling means inoperative, said manipulative means also adapted to control the receipt feeding means to cause the receipt to be fed a predetermined amount.

26. In a machine of the class described, the combination of a set of punches; a set of manipulative devices; a member moved differentially under control of said device; a plurality of groups of connecting means, the connecting means being intermediate preselected ones of the punches and the differential member and arranged with a neutral position between the two groups; and a plurality of projecting means carried by said differential member, one of which is adapted to actuate any of the connecting means in one group and be moved into the neutral position when none of said connecting means are selected for actuation, another of said projecting means being adapted to actuate any of the connecting means in another group upon the operation of certain of said manipulative devices.

27. In a machine of the class described, the combination of a plurality of sets of record material perforating means; manipulative means to set up data of different significance to be perforated in said record material; differentially operable devices set under control of said manipulative means to select perforating means for operation; and shiftable means shiftable from operative position to inoperative position and vice versa to govern the control of the perforating means by said devices to enable the devices to control different sets of said perforating means to record data of different significance under control of the same manipulative means.

28. In a machine of the class described, the combination of perforating means having portions thereof operable to perforate data of different significance in different portions of record material; manipulative means for setting up data of different significance to be perforated in different operations of the machine; means controlled by said manipulative means to control said perforating means in accordance with the data to be perforated; changeable means to enable various portions of the perforating means to be controlled by the means controlled by the manipulative means and thereby determine the location of the record in the record material; and a manipulative member operable in an operation when the data is of a certain significance to control said changeable means to cause the record to be made in a certain portion of the record material.

29. In a machine of the class described, the combination of means to record data of different significance in different fields of record material; means to feed one piece of record material into recording position and to feed another piece of record material out of recording position; common manipulative data-controlling means to control the recording means; mechanism controlled by said manipulative means to control the recording means in accordance with the data which is to be recorded in the different fields of the record material; means to variously connect the mechanism to the recording means according to the significance of the data; and a device operated when data of a certain significance is to be recorded, to control the connecting means to cause said data to be recorded in the proper one of said fields, and to simultaneously prevent operation of the feeding means so as to enable data of other significance to be recorded in another field of said record material.

30. In a machine of the class described, the combination of manipulative means; a plurality of sets of devices controlled by said manipulative means; means related to said sets of devices and associated with different zones of a record material to perforate data therein; means on said devices to control the perforating means; and selectively effective means intermediate the means on said devices and the related perforating means, said intermediate means being rendered selectively effective or ineffective to thereby determine which set of devices shall control its related perforating means.

31. In a machine of the class described, the combination of means to perforate data of different significance in separate fields of record material; a single group of manipulative data-controlling means; means controlled by said manipulative means to select perforating means according to data; and means to connect the selective means selectively to the perforating means for the separate fields to enable the selecting means to control the perforation of data of different significance in said separate fields of said record material.

32. In a combined cash register and card punching machine, adapted to issue punched record cards, the combination of a single complement of manipulative devices for setting up data to be punched in the different zones of a record card; normally operative means to cause data set up on the manipulative devices to be punched in a certain field of the card; means, normally inoperative, for causing data to be punched in another field of said card; means normally operative to eject a punched card and feed a new card into the punching mechanism; and means, including a manipulative device to cause the normally operative means to be inoperative and the normally inoperative means to be operative to thereby cause data to be punched in said other field of the record card and the feeding of the card to be disabled so that the card remains in the position to which it was fed, to allow other data to be punched in said certain field of the card in a subsequent operation.

33. In a machine of the class described, adapted to issue a punched record card, the combination of a single set of manipulative devices for setting up certain data to be punched in one field of the record card, and for setting up other data to be punched in another field of the record card; a plurality of punches for punching records in both fields of the record card; normally operative means to connect the manipulative devices to the punches for one of the fields; means, normally inoperative, to connect the manipulative devices to the punches for the other field; means, including a normally operative shaft and mechanism operated thereby, to cause the punches to be operated in said one field under control of the normally operative connecting means; means, including a normally inoperative shaft and mechanism operated thereby, when the shaft is operated, to cause the normally operative connecting means to be inoperative and the normally inoperative connecting means to be operative to cause the punches to be operated in said other field under control of the second connecting means; and a manually controlled mechanism for rendering the first shaft inoperative and the second shaft operative, to prevent the normal operation of the punches to punch records in said one field and to enable the punches to perforate various data set up on the single set of manipulative devices in said other field of the record card.

34. In a combined cash register and card punching machine, the combination of means to punch and issue a record card; means including a shaft to operate the punching and issuing means; means to drive the shaft; a clutch to connect the shaft to the driving means; a positionable mode of operation member; an element positioned by the member and having control means thereon; a plurality of control devices, normally out of controlling position but adapted to be moved into controlling position; an element positioned under control of the devices and having control means thereon; and means, comprising a pivoted two-armed feeler contrivance having said arms cooperating with the elements, to control the clutch to render the shaft operative when the elements have been set with like control means on both elements engageable by the arms of the feeler whenever the mode of operation member is in certain positions and whenever any one of certain of the control devices is in controlling position.

35. In a combined cash register and card punching machine, the combination of means to punch and issue a record card; means, including a shaft to operate the punching and issuing means; means to drive the shaft; a clutch to connect the shaft to the driving means; a positionable mode of operation member; an element positioned by the member, said element having a control surface formed of high and low portions; a plurality of control devices; an element positioned by the control devices, said element having a control surface formed of high and low portions; a feeler contrivance comprising a pivoted two-armed lever having its arms cooperating with the control surfaces of the elements; and means associated with the feeler contrivance to disengage the clutch when the mode of operation member positions the element associated therewith, so that one arm of the lever comprising the feeler contrivance engages a low portion of the control surface thereof, said disengaging means also adapted to disengage the clutch when the control devices position the element associated therewith, so that the other arm of the lever comprising the feeler contrivance engages a low portion of the control surface thereof to render the shaft and the punching and issuing means inoperative and said clutch being unaffected by said disengaging means only when high portions of the control surfaces of both elements are simultaneously engageable by the two arms of the lever.

36. In a machine of the class described, a bank of control keys; a set of punches; a member differentially positioned under control of the keys; selecting means on said member; a plurality of connector means associated with preselected punches and intermediate the punches and the differential member so that the selecting means on the member can cooperate with the connecting means to select one of the preselected punches, certain of said connecting means being normally inoperative and others being normally operative to control further the selection of the punches by the member; and means to control which of the connecting means will be operative to thereby determine which one of the punches shall be operated under control of the single bank of keys.

GUNNAR NELSON.